(12) United States Patent
Ikeda

(10) Patent No.: US 11,039,172 B2
(45) Date of Patent: *Jun. 15, 2021

(54) IMAGE PROCESSING DEVICE AND IMAGE PROCESSING METHOD

(71) Applicant: Sony Corporation, Tokyo (JP)

(72) Inventor: Masaru Ikeda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/266,121

(22) Filed: Feb. 4, 2019

(65) Prior Publication Data

US 2019/0230383 A1 Jul. 25, 2019

Related U.S. Application Data

(63) Continuation of application No. 14/123,375, filed as application No. PCT/JP2012/063606 on May 28, 2012, now Pat. No. 10,291,937.

(30) Foreign Application Priority Data

| Jun. 28, 2011 | (JP) | 2011-143461 |
| Nov. 1, 2011 | (JP) | 2011-240550 |

(Continued)

(51) Int. Cl.
*H04N 19/80* (2014.01)
*H04N 19/117* (2014.01)
(Continued)

(52) U.S. Cl.
CPC ........... *H04N 19/80* (2014.11); *H04N 19/117* (2014.11); *H04N 19/124* (2014.11);
(Continued)

(58) Field of Classification Search
CPC ............. H04N 19/0089; H04N 19/117; H04N 19/136; H04N 19/182; H04N 19/42;
(Continued)

(56) References Cited

U.S. PATENT DOCUMENTS 7,167,522 B2 * 1/2007 Webb ................... H04N 19/174
375/240.29
2005/0276505 A1 12/2005 Raveendran
(Continued)

FOREIGN PATENT DOCUMENTS

| CN | 1767650 A | 5/2006 |
| EP | 1613095 A2 | 1/2006 |

(Continued)

OTHER PUBLICATIONS

Office Action dated Jun. 5, 2018 in Japanese Patent Application No. 2016-256508, 3 pages.
(Continued)

*Primary Examiner* — Christopher S Kelley
*Assistant Examiner* — Kathleen M Walsh
(74) *Attorney, Agent, or Firm* — Xsensus LLP

(57) ABSTRACT

The present technology relates to an image processing device and an image processing method which allow a deblocking filtering process to apply filtering appropriately. A pixel ($p0_i$) of which the value is 255 (solid line) before a deblocking process changes greatly to 159 (dot line) after a conventional deblocking process. Therefore, a clipping process having a clipping value of 10 is performed in strong filtering, whereby the pixel ($p0_i$) of which the value is 255 (solid line) before the deblocking process becomes 245 (bold line). Thus, a change in the pixel value occurring in the conventional technique can be suppressed as much as possible. This disclosure can be applied to an image processing device, for example.

20 Claims, 35 Drawing Sheets

(30) Foreign Application Priority Data

Nov. 7, 2011 (JP) ................................ 2011-243839
Jan. 19, 2012 (JP) ................................ 2012-009326

(51) Int. Cl.
| | |
|---|---|
| *H04N 19/136* | (2014.01) |
| *H04N 19/182* | (2014.01) |
| *H04N 19/82* | (2014.01) |
| *H04N 19/42* | (2014.01) |
| *H04N 19/124* | (2014.01) |

(52) U.S. Cl.
CPC ......... *H04N 19/136* (2014.11); *H04N 19/182* (2014.11); *H04N 19/42* (2014.11); *H04N 19/82* (2014.11)

(58) Field of Classification Search
CPC ...... H04N 19/80; H04N 19/82; H04N 19/124; H04N 19/00; H04N 19/119; H04N 19/13; H04N 19/176; H04N 19/18; H04N 19/186; H04N 19/30; H04N 19/85; H04N 19/86; H04N 21/4341; H04N 5/44513
USPC .................................................. 375/240.29
See application file for complete search history.

(56) References Cited

U.S. PATENT DOCUMENTS

| | | |
|---|---|---|
| 2006/0133504 A1 | 6/2006 | Jung |
| 2007/0189735 A1 | 8/2007 | Kawashima et al. |
| 2009/0052555 A1 | 2/2009 | Mak-Fan |
| 2011/0026611 A1 | 2/2011 | Kenji |
| 2012/0121188 A1 | 5/2012 | Kenji |
| 2013/0028531 A1 | 1/2013 | Sato |
| 2013/0051477 A1 | 2/2013 | Sasaki |
| 2013/0071039 A1 | 3/2013 | Sato |
| 2013/0216149 A1 | 8/2013 | Sato |
| 2013/0251032 A1 | 9/2013 | Tanaka |
| 2013/0251050 A1 | 9/2013 | Ikeda et al. |
| 2013/0259142 A1 | 10/2013 | Ikeda et al. |
| 2013/0294525 A1 | 11/2013 | Norkin et al. |
| 2013/0301739 A1 | 11/2013 | Sato |
| 2013/0301743 A1 | 11/2013 | Ikeda et al. |
| 2013/0301942 A1 | 11/2013 | Kondo |
| 2013/0322525 A1 | 12/2013 | Tanaka |
| 2013/0330012 A1 | 12/2013 | Sato |
| 2013/0343451 A1 | 12/2013 | Sato |
| 2014/0003510 A1 | 1/2014 | Lu et al. |
| 2014/0023150 A1 | 1/2014 | Kondo |
| 2014/0064362 A1 | 3/2014 | Sato |
| 2014/0072037 A1 | 3/2014 | Sato |
| 2014/0086322 A1 | 3/2014 | Takahashi et al. |
| 2014/0092958 A1 | 4/2014 | Sato |
| 2014/0105281 A1 | 4/2014 | Sato et al. |

FOREIGN PATENT DOCUMENTS

| | | |
|---|---|---|
| JP | 2004-328634 A | 11/2004 |
| JP | 2007-208476 A | 8/2007 |
| JP | 2008-533909 A | 8/2008 |
| KR | 10-2007-0011570 A | 1/2007 |
| KR | 20070011570 A | 1/2007 |
| KR | 10-2008-0005210 | 1/2008 |
| KR | 10-2008-0005210 A | 1/2008 |
| WO | 2004/084123 A1 | 9/2004 |
| WO | 2005/117447 A2 | 12/2005 |
| WO | 2008/084996 A1 | 7/2008 |

OTHER PUBLICATIONS

Extended European Search Report dated Mar. 16, 2018 in European Application No. 17205948. 7.
Extended European Search Report dated Mar. 16, 2018 in European Application No. 17205955.2.
Office Action dated Dec. 19, 2017 in Japanese Application No. 2016-256508.
Written Opinion and Search Report dated Feb. 6, 2018 in Singapore Application No. 10201404907Q.
Combined Chinese Office Action and Search Report dated Nov. 21, 2016 in Patent Application No. 201410279449.6 (with English Translation).
Combined Chinese Office Action and Search Report dated Sep. 5, 2016 in Patent Application No. 201280030471.6 (with English translation).
Extended European Search Report dated Jun. 17, 2016 in European Application No. 15186463.4.
Office Action dated Apr. 26, 2016 in Japanese Application No. 2013-522538.
Office Action dated Apr. 26, 2016 in Japanese Application No. 2015-038886.
Jicheng An et al., CE12 Subtest1: Improved Deblocking Filter, Joint Collaborative Team on Video Coding (JCT-VG) of ITU-T SG16 WP3 and ISO/IEC JTCI/SC29/WG11, 5th Meeting: Geneva, CH. Mar. 16-23, 2011 (8 pages).
Extended European Search Report dated Dec. 17, 2014 in the European Application No. 12804900.4.
Search Report dated Nov. 3, 2014 in the corresponding Singapore Application No. 201309532-8.
"Test Model under Consideration", Joint Collaborative Team on Video Coding (JCT-VC) of ITU-T SG16 WP3 and ISO/IEC TC1/SC29/WG11, 2nd Meeting, vol. JCTVC-B205, XP008168686, Jul. 1, 2010, 154 pages.
Matthias Narroschke, et al., "CE12.2: Results for parallel deblocking filter decisions", Panasonic Corporation, Joint Collaborative Team on Video Coding (JCT-VC) of ITU-T SG16 WP3 and ISO/IEC JTC1/SC29/WG11, 5th Meeting, No. JCTVC-E224, XP030008730, Mar. 10, 2011, 10 pages.
Masaru Ikeda, et al., "Non-CE1 O: Introduction of strong filter clipping in deblocking filter", Sony Corporation, Joint Collaborative Team on Video Coding (JCT-VC) of ITU-T SG16 WP3 and ISO/IEC JTC1/SC29/WG11, 8th Meeting, No. JCTVC-H0275, XP030111302, Jan. 20, 2012, 6 pages.
Thomas Wiegand, et al., "WD2: Working Draft 2 of High-Efficiency Video Coding", Joint Collaborative Team on Video Coding (JCT-VC) of ITU-T SG16 WP3 and ISO/IEC JTC1/SC29/WG11, 4th Meeting, Jan. 20-28, 2011, 308 pages.
Kemal Ugur, et al., "Appendix to Description of video coding technology proposal by Tandberg Nokia Ericsson" JCT-VC of ITU-T SG16 WP3 and ISO/IEC JTC1/SC29/WG11, vol. JCTVC-A119, Apr. 15-23, 2010.
Thomas Wiegand, et al., "WD2: Working Draft 2 of High-Efficiency Video Coding" JCT-VC of ITU-T SG16 WP3 and ISO/IEC JTC1/SC29/WG11, vol. JCTVC-D503, Jan. 20-28, 2011.
"Test Model under Consideration" JCT-VC of ITU-T SG16 WP3 and ISO/IEC JTC1/SC29/WG11, vol. JCTVC-B205, Jul. 21-28, 2010, 14 Pages.
Thomas Davies, et al., "Suggestion for a Test Model" JCT-VC of ITU-T SG16 WP3 and ISO/IEC JTC1/SC29/WG11, vol. JCTVC-A033, Apr. 15-23, 2010, 4 Pages.
"Test Model under Consideration", Joint Collaborative Team on Video Coding (JCT-VC) of ITU-T SG16 WP3 and ISO/IEC, 2nd Meeting: Geneva, CH, Jul. 21-28, 2010, 59 pp.
Chinese Office Action dated Jul. 2, 2019, issued in corresponding Chinese Patent Application No. 201710544405, 17 pp.
Chinese Office Action dated Aug. 2, 2019, issued in corresponding Chinese Patent Application No. 201710544421, 8 pp.
Korean Office Action dated Aug. 7, 2019, issued in corresponding Korean Patent Application No. 10-2019-7020753, 9 pp.
Korean Office Action dated Aug. 19, 2019, issued in corresponding Korean Patent Application No. 10-2019-7021650, 7 pp.
Korean Office Action dated Aug. 20, 2019, issued in corresponding Korean Patent Application No. 10-2019-7021962, 7 pp.
Korean Intellectual Property Office Notice of Preliminary Rejection issued in corresponding Korean Application No. 10-2013-7033700, dated Jan. 10, 2019, 7 pages (with English translation).

(56) References Cited

OTHER PUBLICATIONS

Notice of Allowance dated Jul. 22, 2020, in corresponding to Korean Application No. 10-2020-7005974, 2 pages.
'Test Model under Consideration', (JCTVC-B205), JCT-VC of ITU-T SG16 WP3 and ISO/IEC JTC1/SC29/WG11, 7 pages, 2nd Meeting: Geneva, CH, Sep. 16, 2010.
Masaru Ikeda, et al., 'Non-CE10: Introduction of strong filter clipping in deblocking filter', (JCTVC-H0275), JCT-VC of ITU-T SG16 WP3 and ISO/IEC JTC1/SC29/WG11, 10 pages, 5th Meeting: Geneva, CH, Jan. 31, 2012.
Matthias Narroschke, et al., 'CE12.2: Results for parallel deblocking filter decisions', (JCTVC-E224), JCT-VC of ITU-T SG16 WP3 and ISO/IEC JTC1/SC29/WG11, 189 pages, 5th Meeting: Geneva, CH, Mar. 14, 2011.

\* cited by examiner

FIG. 8

| | | | | BB | | | | |
|---|---|---|---|---|---|---|---|---|
| $p_{3,0}$ | $p_{2,0}$ | $p_{1,0}$ | $p_{0,0}$ | $q_{0,0}$ | $q_{1,0}$ | $q_{2,0}$ | $q_{3,0}$ |
| $p_{3,1}$ | $p_{2,1}$ | $p_{1,1}$ | $p_{0,1}$ | $q_{0,1}$ | $q_{1,1}$ | $q_{2,1}$ | $q_{3,1}$ |
| $p_{3,2}$ | $p_{2,2}$ | $p_{1,2}$ | $p_{0,2}$ | $q_{0,2}$ | $q_{1,2}$ | $q_{2,2}$ | $q_{3,2}$ |
| $p_{3,3}$ | $p_{2,3}$ | $p_{1,3}$ | $p_{0,3}$ | $q_{0,3}$ | $q_{1,3}$ | $q_{2,3}$ | $q_{3,3}$ |
| $p_{3,4}$ | $p_{2,4}$ | $p_{1,4}$ | $p_{0,4}$ | $q_{0,4}$ | $q_{1,4}$ | $q_{2,4}$ | $q_{3,4}$ |
| $p_{3,5}$ | $p_{2,5}$ | $p_{1,5}$ | $p_{0,5}$ | $q_{0,5}$ | $q_{1,5}$ | $q_{2,5}$ | $q_{3,5}$ |
| $p_{3,6}$ | $p_{2,6}$ | $p_{1,6}$ | $p_{0,6}$ | $q_{0,6}$ | $q_{1,6}$ | $q_{2,6}$ | $q_{3,6}$ |
| $p_{3,7}$ | $p_{2,7}$ | $p_{1,7}$ | $p_{0,7}$ | $q_{0,7}$ | $q_{1,7}$ | $q_{2,7}$ | $q_{3,7}$ |

$\underbrace{\qquad\qquad\qquad}_{BKa}$ $\underbrace{\qquad\qquad\qquad}_{BKb}$

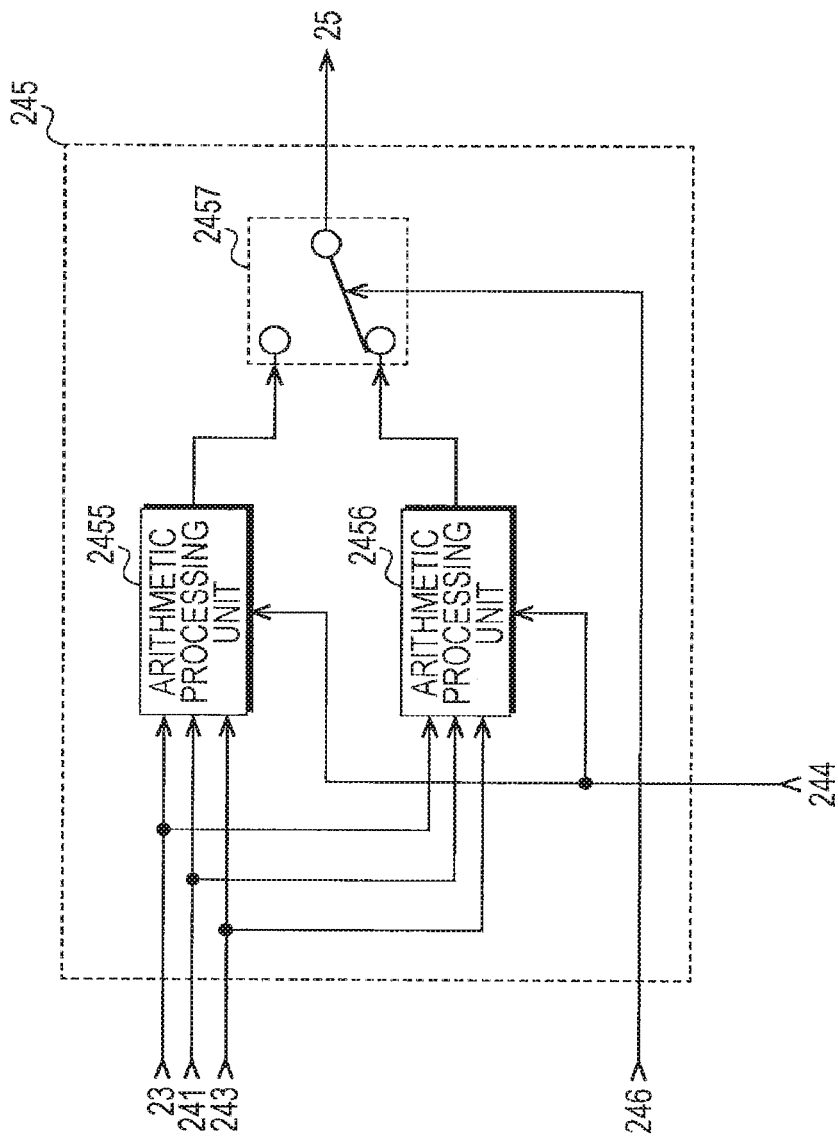

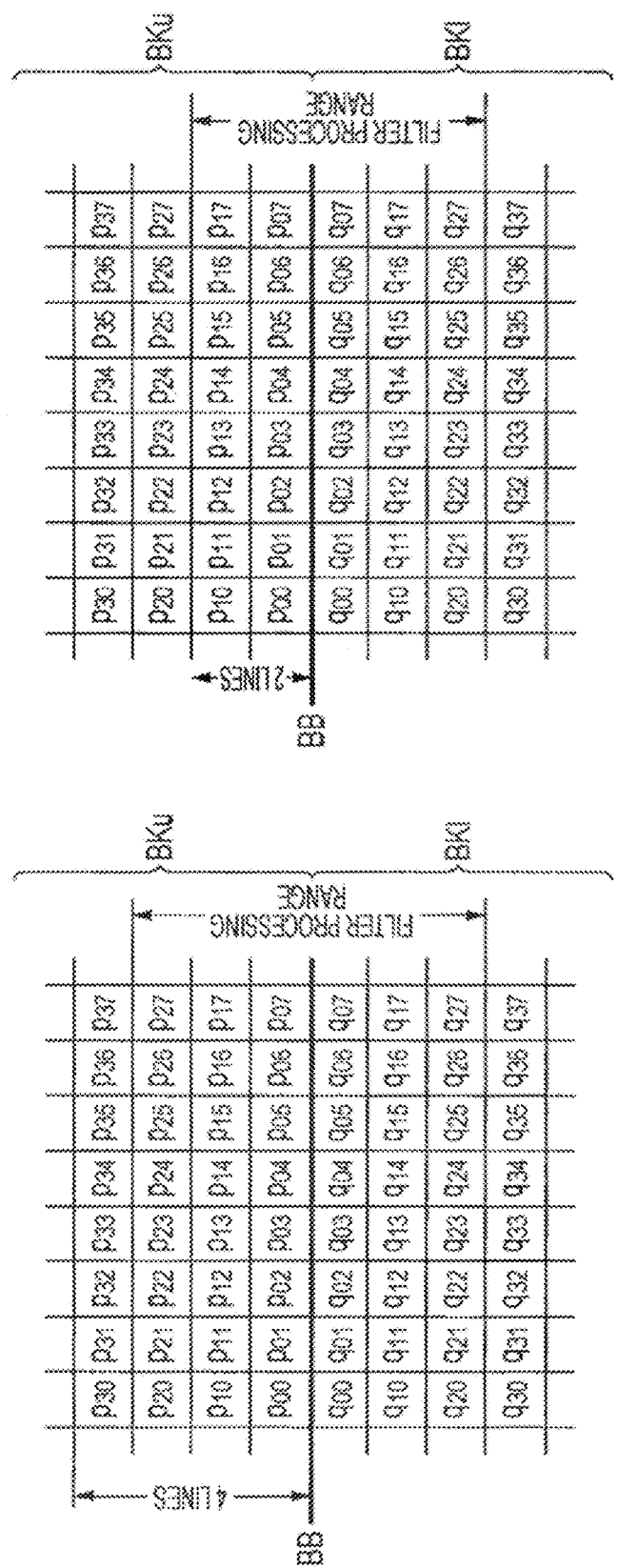

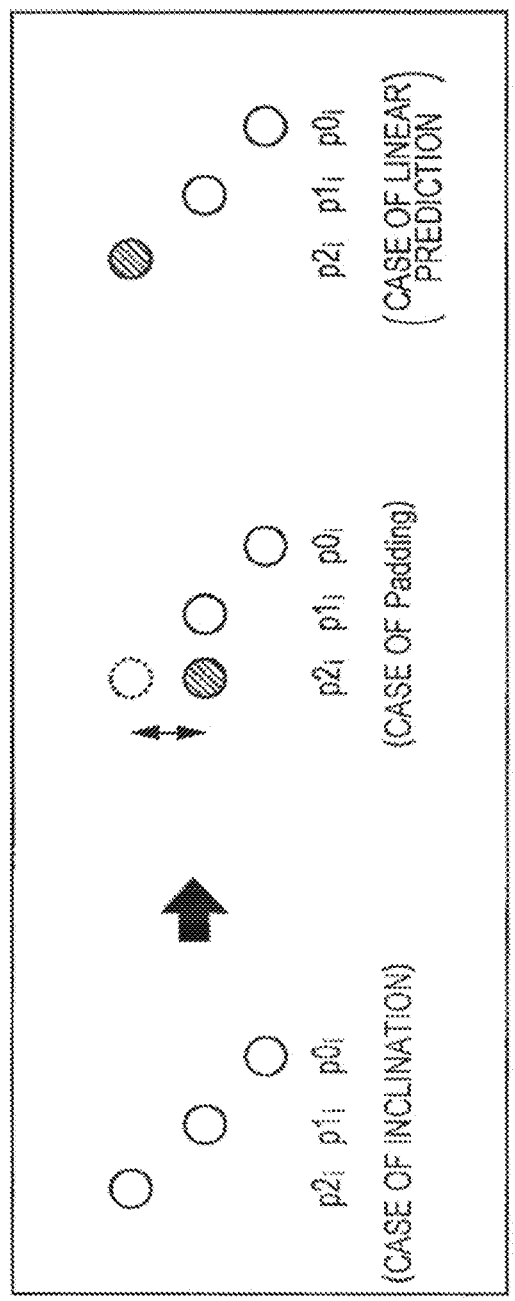

FIG. 20

| | AI_HE | | | | RA_HE | | | | LB_HE | | | | LP_HE | | | |
|---|---|---|---|---|---|---|---|---|---|---|---|---|---|---|---|---|
| | 22 | 27 | 32 | 37 | 22 | 27 | 32 | 37 | 22 | 27 | 32 | 37 | 22 | 27 | 32 | 37 |
| Class A | 16 | 25 | 23 | 29 | 12 | 19 | 19 | 18 | | | | | | | | 37 |
| Class B | 9 | 37 | 42 | 50 | 15 | 29 | 25 | 84 | 9 | 55 | 53 | 73 | 12 | 38 | 50 | 82 |
| Class C | 29 | 40 | 54 | 109 | 9 | 28 | 34 | 35 | 27 | 15 | 34 | 44 | 5 | 24 | 34 | 49 |
| Class D | 7 | 13 | 57 | 54 | 6 | 9 | 40 | 42 | 3 | 8 | 20 | 22 | 4 | 8 | 18 | 20 |
| Class E | 15 | 16 | 20 | 28 | | | | | 5 | 7 | 15 | 17 | 6 | 11 | 16 | 20 |
| Class F | 1901 | 1901 | 1901 | 1911 | 1781 | 1891 | 1911 | 1901 | 1911 | 1881 | 1891 | 1821 | 1911 | 1881 | 1811 | 1691 |

IMAGE PROCESSING DEVICE AND IMAGE PROCESSING METHOD

CROSS-REFERENCE TO RELATED APPLICATIONS

This application is a continuation of U.S. patent application Ser. No. 14/123,375, filed on Dec. 2, 2013, which is based on National Stage Application PCT/JP2012/063606, filed on May 28, 2012, which claims the benefit of priority of the Japanese Patent Applications No. 2012-009326, filed on Jan. 19, 2012, Japanese Patent Application No. 2011-243839, filed on Nov. 7, 2011, Japanese Patent Application No. 2011-240550, filed on Nov. 1, 2011, Japanese Patent Application No. 2011-143461, filed on Jun. 28, 2011, the entire disclosure of which is incorporated herein by reference.

TECHNICAL FIELD

This technique relates to an image processing device and an image processing method. Specifically, this technique allows a deblocking filtering process to apply filtering appropriately.

BACKGROUND ART

In recent years, devices, which handle image information as digital data, which, in such a case, aim to transmit and store information with a high efficiency, and which conform to a scheme, such as MPEG2 (International Organization for Standardization and International Electrotechnical Commission (ISO/IEC) 13818-2), for compressing image information using orthogonal transformation, such as discrete cosine transformation, and using motion compensation by utilizing redundancy that is unique to the image information have become widespread in both information distribution in broadcasting stations and information reception in ordinary homes. In addition, schemes called H.264 and MPEG4 Part10 (Advanced Video Coding (AVC) which require a larger amount of operation for coding and decoding but can realize a higher coding efficiency than MPEG2 or the like have been also used. Further, nowadays, standardization works for high efficiency video coding (HEVC) which is a next-generation image coding scheme are in progress so that compression, distribution, or the like of high-resolution images of 4000×2000 pixels which is four times that of high-vision images can be performed efficiently.

In the standardization works for high efficiency video coding (HEVC) which is a next-generation image coding scheme, JCTVC-A119 (see Non-Patent Document 1 below) proposes to apply a deblocking filter to each block having the size of 8×8 pixels or larger. In the method proposed in JCTVC-A119, by increasing a minimum unit block size to which a deblocking filter is to be applied, it is possible to execute a filtering process in parallel on a plurality of block boundaries in the same direction within one macroblock.

CITATION LIST

Non-Patent Document

Non-Patent Document 1: K. Ugur (Nokia), K. R. Andersson (LM Ericsson), A. Fuldseth (Tandberg Telecom), "JCTVC-A119: Video coding technology proposal by Tandberg, Nokia, and Ericsson," Documents of the first meeting of the Joint Collaborative Team on Video Coding (JCT-VC), Dresden, Germany, 15-23 Apr. 2010

SUMMARY OF THE INVENTION

Problems to be Solved by the Invention

However, in the conventional deblocking filtering process, filtering is not performed appropriately.

Therefore, an object of this technique is to allow a deblocking filtering process to apply filtering appropriately.

Solutions to Problems

An image processing device according to a first aspect of this technique includes: a decoding unit that decodes an encoded stream encoded in units each having a layer structure to generate an image; a filtering unit that applies a deblocking filter to a block boundary according to a strength of the deblocking filter applied to the block boundary which is a boundary between a block of the image generated by the decoding unit and an adjacent block adjacent to the block; and a controller that controls the filtering unit so that, when strong filtering is applied as the strength of the deblocking filter, a clipping process is applied to the deblocking filter with respect to luminance components of the image generated by the decoding unit.

The controller may apply the clipping process to values of parts that change when the deblocking filter is applied.

The controller applies the clipping process according to the following expressions:

$$p0_i = p0_i + \text{Clip}_{(-pv)-(pv)}((p2_i + 2*p1_i - 6*p0_i + 2*q0_i + q1_i + 4) >> 3);$$

$$q0_i = q0_i + \text{Clip}_{(-pv)-(pv)}((p1_i + 2*p0_i - 6*q0_i + 2*q0_i + q2_i + 4) >> 3);$$

$$p1_i = p1_i + \text{Clip}_{(-pv)-(pv)}((p2_i - 3*p1_i + p0_i + q0_i + 2) >> 2);$$

$$q1_i = q1_i + \text{Clip}_{(-pv)-(pv)}((p0_i + q0_i - 3*q1_i + q2_i + 2) >> 2);$$

$$p2_i = p2_i + \text{Clip}_{(-pv)-(pv)}((2*p2_i - 5*p2_i + p1_i + p0_i + q0_i + 4) >> 3);$$

$$q2_i = q2_i + \text{Clip}_{(-pv)-(pv)}((p0_i + q0_i + p1_i - 5*q2_i + 2*q3_i + 4) >> 3); \qquad \text{[Mathematical formula 37]}$$

where i=0, 7 and pv is a clipping value.

The controller may set a value that is integer multiples of parameters of the deblocking filter as the clipping value used when the clipping process is performed.

The controller may set a value that is twice the parameters of the deblocking filter as the clipping value used when the clipping process is performed.

The image processing device further includes: a filter strength determining unit that determines the strength of the deblocking filter applied to the block boundary, and the filtering unit may apply the deblocking filter to the block boundary according to the strength determined by the filter strength determining unit, and the controller may control the filtering unit so that, when the filter strength determining unit determines that strong filtering is to be applied, a clipping process is applied to the deblocking filter with respect to the luminance components of the image generated by the decoding unit.

The filter strength determining unit may determine the strength of the deblocking filter using a plurality of lines as processing units.

The filter strength determining unit may determine the strength of the deblocking filter using four lines as the processing units.

The image processing device further includes: a filtering necessity determining unit that determines whether the deblocking filter is to be applied to the block boundary using a plurality of lines as processing units, and the filter strength determining unit may determine the strength of the deblocking filter when the filtering necessity determining unit determines that the deblocking filter is to be applied.

An image processing method according to the first aspect of this technique allows an image processing device to execute: decoding an encoded stream encoded in units each having a layer structure to generate an image; applying a deblocking filter to a block boundary according to a strength of the deblocking filter applied to the block boundary which is a boundary between a block of the generated image and an adjacent block adjacent to the block; and controlling so that, when strong filtering is applied as the strength of the deblocking filter, a clipping process is applied to the deblocking filter with respect to luminance components of the generated image.

An image processing device according to a second aspect of this technique includes: a filtering unit that applies a deblocking filter to a block boundary according to a strength of the deblocking filter applied to the block boundary which is a boundary between a block of an image locally decoded when an image is encoded and an adjacent block adjacent to the block; a controller that controls the filtering unit so that, when strong filtering is applied as the strength of the deblocking filter, a clipping process is applied to the deblocking filter with respect to luminance components of the locally decoded image; and an encoding unit that encodes the image in units each having a layer structure using an image to which the deblocking filter is applied.

The controller may apply the clipping process to values of parts that change when the deblocking filter is applied.

The controller applies the clipping process according to the following expressions:

$$p0_i = p0_i + \text{Clip}_{(-pv)-(pv)}((p2_i + 2*p1_i - 6*p0_i + 2*q0_i + q1_i + 4) >> 3);$$

$$q0_i = q0_i + \text{Clip}_{(-pv)-(pv)}((p1_i + 2*p0_i - 6*q0_i + 2*q1_i + q2_i + 4) >> 3);$$

$$p1_i = p1_i + \text{Clip}_{(-pv)-(pv)}((p2_i - 3*p1_i + p0_i + q0_i + 2) >> 2);$$

$$q1_i = q1_i + \text{Clip}_{(-pv)-(pv)}((p0_i + q0_i - 3*q1_i + q2_i + 2) >> 2);$$

$$p2_i = p2_i + \text{Clip}_{(-pv)-(pv)}((2*p2_i - 5*p2_i + p1_i + p0_i + q0_i + 4) >> 3);$$

$$q2_i = q2_i + \text{Clip}_{(-pv)-(pv)}((p0_i + q0_i + p1_i - 5*q2_i + 2*q3_i + 4) >> 3);$$ [Mathematical formula 37]

where i=0, 7 and pv is a clipping value.

The controller may set a value that is integer multiples of parameters of the deblocking filter as the clipping value used when the clipping process is performed.

The controller may set a value that is twice the parameters of the deblocking filter as the clipping value used when the clipping process is performed.

The image processing device further includes: a filter strength determining unit that determines the strength of the deblocking filter applied to the block boundary, and the filtering unit may apply the deblocking filter to the block boundary according to the strength determined by the filter strength determining unit, and the controller may control the filtering unit so that, when the filter strength determining unit determines that strong filtering is to be applied, a clipping process is applied to the deblocking filter with respect to the luminance components of the image generated by the decoding unit.

The filter strength determining unit may determine the strength of the deblocking filter using a plurality of lines as processing units.

The filter strength determining unit may determine the strength of the deblocking filter using four lines as the processing units.

The image processing device further includes: a filtering necessity determining unit that determines whether the deblocking filter is to be applied to the block boundary using a plurality of lines as processing units, and the filter strength determining unit may determine the strength of the deblocking filter when the filtering necessity determining unit determines that the deblocking filter is to be applied.

An image processing method according to the second aspect of this technique allows an image processing device to execute: applying a deblocking filter to a block boundary according to a strength of the deblocking filter applied to the block boundary which is a boundary between a block of an image locally decoded when an image is encoded and an adjacent block adjacent to the block; controlling so that, when strong filtering is applied as the strength of the deblocking filter, a clipping process is applied to the deblocking filter with respect to luminance components of the locally decoded image; and encoding the image in units each having a layer structure using an image to which the deblocking filter is applied.

In a first aspect of the present technique, an encoded stream encoded in units each having a layer structure is decoded to generate an image; and a deblocking filter is applied to a block boundary according to a strength of the deblocking filter applied to the block boundary which is a boundary between a block of the generated image and an adjacent block adjacent to the block. Moreover, control is performed so that, when strong filtering is applied as the strength of the deblocking filter, a clipping process is applied to the deblocking filter with respect to luminance components of the generated image.

In a second aspect of the present technique, a deblocking filter is applied to a block boundary according to a strength of the deblocking filter applied to the block boundary which is a boundary between a block of an image locally decoded when an image is encoded and an adjacent block adjacent to the block. Moreover, control is performed so that, when strong filtering is applied as the strength of the deblocking filter, a clipping process is applied to the deblocking filter with respect to luminance components of the locally decoded image; and the image is encoded in units each having a layer structure using an image to which the deblocking filter is applied.

Effects of the Invention

According to this technique, it is possible to allow a deblocking filtering process to apply filtering appropriately.

BRIEF DESCRIPTION OF THE DRAWINGS

FIG. 8 is a diagram for describing a basic operation of a deblocking filtering unit.

FIG. 12 is a diagram illustrating the configuration of the filter operation unit.

FIGS. 14(A) and 14(B) are diagrams for describing the operation of the filter operation unit.

FIG. 18 is a diagram for describing the present technique (sixth embodiment).

FIG. 19 is a diagram illustrating pixels used in the deblocking filtering process of the present technique.

FIG. 20 is a diagram for describing pixel values that change due to conventional strong filtering.

MODE FOR CARRYING OUT THE INVENTION

Figure 1A:
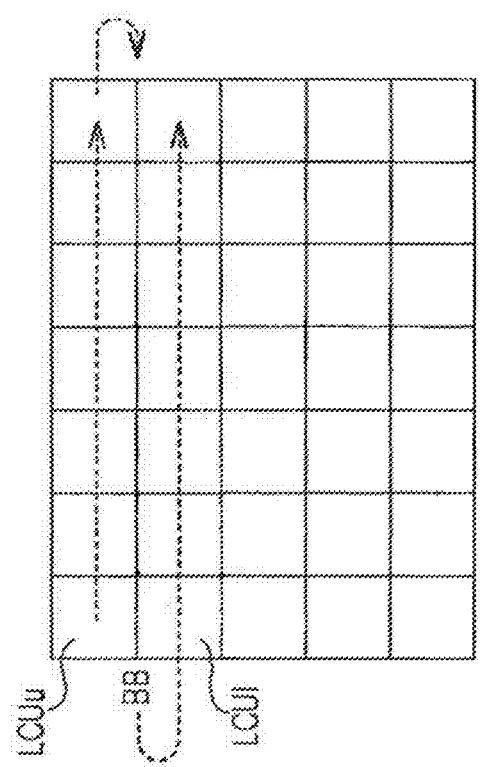
FIGS. 1(A) and 1(B) are diagrams for describing a conventional deblocking filtering process.

Hereinafter, modes for carrying out the present technique will be described. The description will be given in the following order:
1. Conventional art
2. Configuration when applied to image encoding device
3. Operation of image encoding device
4. Configuration when applied to image decoding device
5. Operation of image decoding device
6. Basic operation of deblocking filtering unit
7. First embodiment of deblocking filtering unit
8. Second embodiment of deblocking filtering unit
9. Third embodiment of deblocking filtering unit
10. Fourth embodiment of deblocking filtering unit
11. Fifth embodiment of deblocking filtering unit
12. Description of sixth to eighth embodiments
13. Sixth embodiment of deblocking filtering unit
14. Seventh embodiment of deblocking filtering unit
15. Eighth embodiment of deblocking filtering unit
16. Ninth Embodiment
17. Tenth embodiment (multi-view image encoding and decoding device)
18. Eleventh embodiment (layer image encoding and decoding device)
19. Application example 1. Conventional Art A conventional deblocking filtering process will be described with reference to FIGS. 1(A) and 1(B).

Figure 1B:
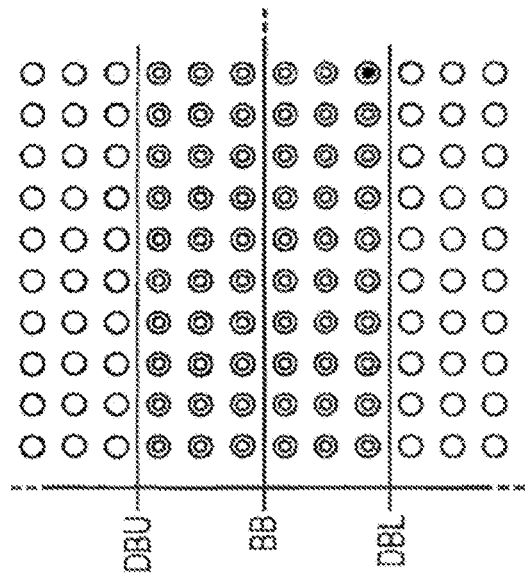

As illustrated in FIG. 1(A), for example, when a deblocking filtering process is performed in a raster order in respective largest coding units (LCUs), image data corresponding to a predetermined number of lines from an inter-block boundary BB, of LCUu which is an upper block is stored in a line memory, and a vertical filtering process is performed using the image data and image data of LCU1 which is a lower block obtained after the storing. For example, as illustrated in FIG. 1(B), when filter operation is performed using image data corresponding to four lines from the boundary BB while using image data of the upper and lower blocks each corresponding to three lines from the inter-block boundary BB as a processing range of the vertical filtering process, image data corresponding to four lines from the boundary BB, of LCUu which is the upper block is stored in the line memory. In the drawings, target pixels of the deblocking filter are depicted by double circles, and the upper and lower boundaries of the filter processing range of the deblocking filter are indicated by "DBU" and "DBL," respectively.

In this manner, since image data corresponding to a predetermined number of lines from the inter-block boundary BB is stored in the line memory so as to be used for the filter operation, if the number of pixels in the horizontal direction increases, the memory capacity of the line memory increases.

2. Configuration when Applied to Image Encoding Device

Figure 2:
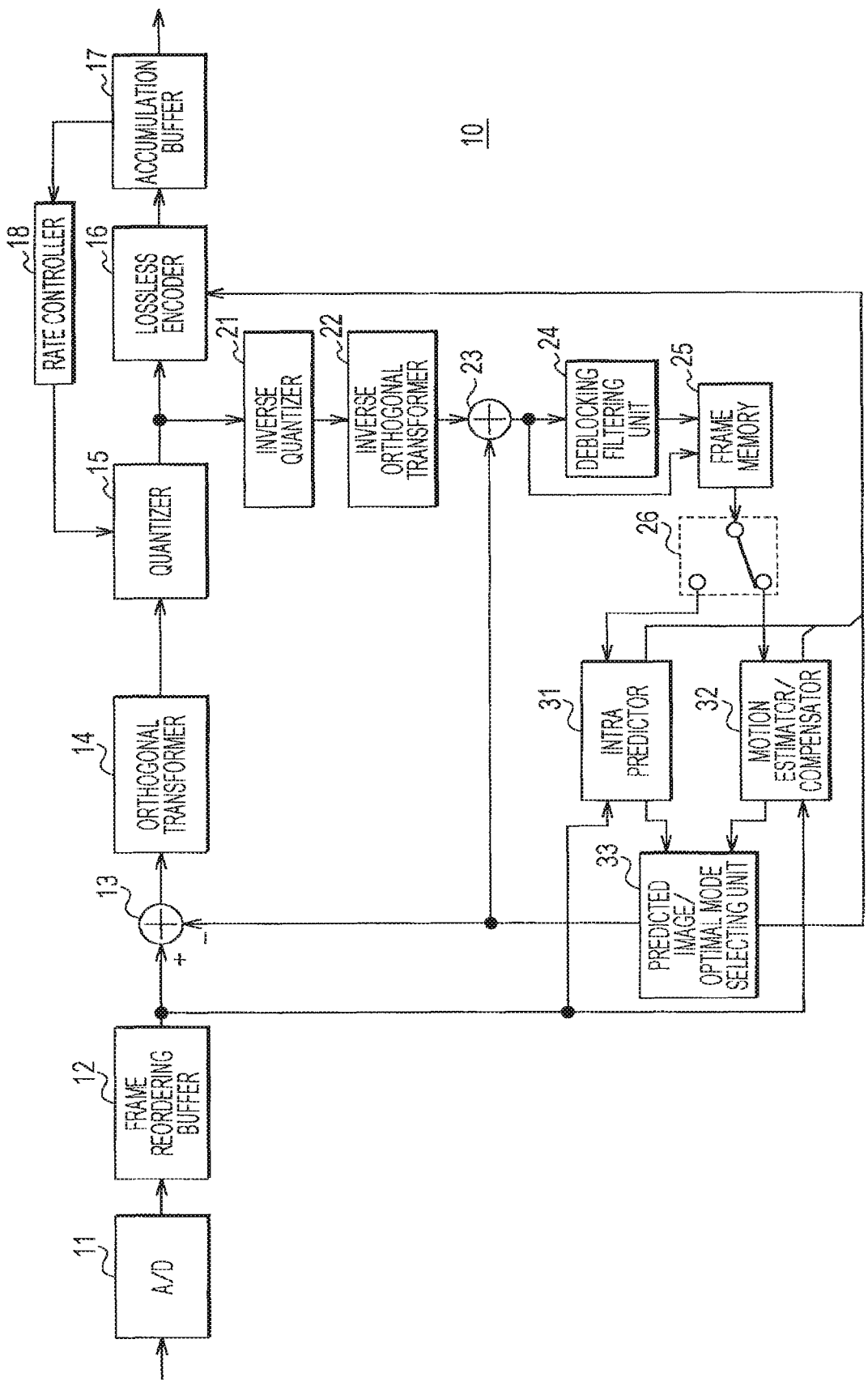
FIG. 2 is a diagram illustrating a configuration when applied to an image encoding device.

FIG. 2 illustrates a configuration when the image processing device of the present technique is applied to an image encoding device. An image encoding device 10 includes an analog/digital converter (A/D converter) 11, a frame reordering buffer 12, a subtractor 13, an orthogonal transformer 14, a quantizer 15, a lossless encoder 16, an accumulation buffer 17, and a rate controller 18. The image encoding device 10 further includes an inverse quantizer 21, an inverse orthogonal transformer 22, an adder 23, a deblocking filtering unit 24, a frame memory 25, a selector 26, an intra predictor 31, a motion estimator/compensator 32, and a predicted image/optimal mode selecting unit 33.

The A/D converter 11 converts an analog image signal into digital image data and outputs the digital image data to the frame reordering buffer 12.

The frame reordering buffer 12 reorders the frames of the image data output from the A/D converter 11. The frame reordering buffer 12 performs the frame reorder according to a GOP (group of pictures) structure related to an encoding process and outputs the reorderd image data to the subtractor 13, the intra predictor 31, and the motion estimator/compensator 32.

The subtractor 13 is supplied with the image data output from the frame reordering buffer 12 and predicted image data selected by the predicted image/optimal mode selecting unit 33 described later. The subtractor 13 calculates prediction error data which is a difference between the image data output from the frame reordering buffer 12 and the predicted image data supplied from the predicted image/optimal mode selecting unit 33 and outputs the prediction error data to the orthogonal transformer 14.

The orthogonal transformer 14 performs an orthogonal transform process such as discrete cosine transform (DCT) or Karhunen-Loeve transform with respect to the prediction error data output from the subtractor 13. The orthogonal transformer 14 outputs transform coefficient data obtained by performing the orthogonal transform process to the quantizer 15.

The quantizer 15 is supplied with the transform coefficient data output from the orthogonal transformer 14 and a rate control signal from the rate controller 18 described later. The quantizer 15 quantizes the transform coefficient data and outputs the quantized data to the lossless encoder 16 and the inverse quantizer 21. Moreover, the quantizer 15 switches a quantization parameter (quantization scale) based on the rate control signal from the rate controller 18 to change a bit rate of the quantized data.

The lossless encoder 16 is supplied with the quantized data output from the quantizer 15 and prediction mode information from the intra predictor 31, the motion estimator/compensator 32, and the predicted image/optimal mode selecting unit 33 described later. The prediction mode information includes a macroblock type that allows a predicted block size to be identified, a prediction mode, motion vector information, reference picture information, and the like according to intra-prediction or inter-prediction. The lossless encoder 16 performs a lossless encoding process such as, for example, variable-length encoding or arithmetic encoding on the quantized data to generate an encoded stream and outputs the encoded stream to the accumulation buffer 17. Moreover, the lossless encoder 16 losslessly encodes the prediction mode information to add the encoded prediction mode information to the header information of the encoded stream.

The accumulation buffer 17 accumulates the encoded streams from the lossless encoder 16. Moreover, the accumulation buffer 17 outputs the accumulated encoded streams at a transfer rate corresponding to a transmission line.

The rate controller 18 monitors a free space of the accumulation buffer 17, generates a rate control signal according to the free space, and outputs the rate control signal to the quantizer 15. The rate controller 18 acquires information indicating the free space from the accumulation buffer 17, for example. The rate controller 18 decreases the bit rate of the quantized data using the rate control signal when the free space decreases. Moreover, the rate controller 18 increases the bit rate of the quantized data using the rate control signal when the free space of the accumulation buffer 17 is sufficiently large.

The inverse quantizer 21 performs an inverse quantization process on the quantized data supplied from the quantizer 15. The inverse quantizer 21 outputs transform coefficient data obtained by performing the inverse quantization process to the inverse orthogonal transformer 22.

The inverse orthogonal transformer 22 outputs data obtained by performing an orthogonal transform process on the transform coefficient data supplied from the inverse quantizer 21 to the adder 23.

The adder 23 adds the data supplied from the inverse orthogonal transformer 22 and the predicted image data supplied from the predicted image/optimal mode selecting unit 33 to generate decoded image data and outputs the decoded image data to the deblocking filtering unit 24 and the frame memory 25.

The deblocking filtering unit 24 performs a filtering process for reducing block distortion occurring during image encoding. The deblocking filtering unit 24 performs a filtering process to remove block distortion from the decoded image data supplied from the adder 23 and outputs the image data having been subjected to the filtering process to the frame memory 25. Moreover, the deblocking filtering unit 24 controls an image range used for a filter operation in a block positioned on the upper side of a boundary according to a boundary detected by performing inter-block boundary detection in a vertical direction. In this manner, by controlling the image range used for filter operation, the deblocking filtering unit 24 allows a vertical filtering process to be performed even when a memory capacity of the line memory that stores image data is reduced. The details thereof will be described later.

The frame memory 25 maintains the decoded image data supplied from the adder 23 and the decoded image data having been subjected to the filtering process, supplied from the deblocking filtering unit 24 as image data of a reference image.

The selector 26 supplies the reference image data before the filtering process, read from the frame memory 25 to the intra predictor 31 in order to perform intra-prediction. Moreover, the selector 26 supplies the reference image data having been subjected to the filtering process, read from the frame memory 25 to the motion estimator/compensator 32 in order to perform inter-prediction.

The intra predictor 31 performs an intra-prediction process in all candidate intra-prediction modes using the image data of an encoding target image output from the frame reordering buffer 12 and the reference image data before the filtering process, read from the frame memory 25. Further, the intra predictor 31 calculates a cost function value for each intra-prediction mode and selects an intra-prediction mode in which the calculated cost function value is the smallest (that is, an intra-prediction mode in which best encoding efficiency is obtained) as an optimal intra-prediction mode. The intra predictor 31 outputs predicted image data generated in the optimal intra-prediction mode, the prediction mode information on the optimal intra-prediction mode, and a cost function value in the optimal intra-prediction mode to the predicted image/optimal mode selecting unit 33. Moreover, the intra predictor 31 outputs the prediction mode information on the intra-prediction mode in the intra-prediction process in the respective intra-prediction modes to the lossless encoder 16 in order to obtain a generated code amount used in calculation of the cost function value as described later.

The motion estimator/compensator 32 performs a motion estimation/compensation process in all predicted block sizes corresponding to macroblocks. The motion estimator/compensator 32 detects a motion vector using the reference image data having been subjected to the filtering process, read from the frame memory 25 with respect to each of the encoding target images of the respective predicted block sizes, read from the frame reordering buffer 12. Further, the motion estimator/compensator 32 performs a motion compensation process on the decoded image based on the detected motion vector to generate a predicted image. Moreover, the motion estimator/compensator 32 calculates a cost function value for each predicted block size and selects a predicted block size in which the calculated cost function value is the smallest (that is, a predicted block size in which best encoding efficiency is obtained) as an optimal inter-prediction mode. The motion estimator/compensator 32 outputs the predicted image data generated in the optimal inter-prediction mode, the prediction mode information on the optimal inter-prediction mode, and the cost function value in the optimal inter-prediction mode to the predicted image/optimal mode selecting unit 33. Moreover, the motion estimator/compensator 32 outputs the prediction mode information on the inter-prediction mode in the inter-prediction process in the respective predicted block sizes to the lossless encoder 16 in order to obtain a generated code amount used in calculation of the cost function value. The motion estimator/compensator 32 also performs the prediction in a skipped macroblock mode and a direct mode as the inter-prediction mode.

The predicted image/optimal mode selecting unit 33 compares the cost function value supplied from the intra predictor 31 and the cost function value supplied from the motion estimator/compensator 32 in respective macroblock units and selects a mode in which the cost function value is the smaller as an optimal mode in which best encoding efficiency is obtained. Moreover, the predicted image/optimal mode selecting unit 33 outputs predicted image data generated in the optimal mode to the subtractor 13 and the adder 23. Further, the predicted image/optimal mode selecting unit 33 outputs the prediction mode information of the optimal mode to the lossless encoder 16. The predicted image/optimal mode selecting unit 33 may perform the intra-prediction or the inter-prediction in respective slice units.

An encoding unit in the claims includes the intra predictor 31 that generates predicted image data, the motion estimator/compensator 32, the predicted image/optimal mode selecting unit 33, the subtractor 13, the orthogonal transformer 14, the quantizer 15, the lossless encoder 16, and the like.

3. Operation of Image Encoding Device

Figure 3:
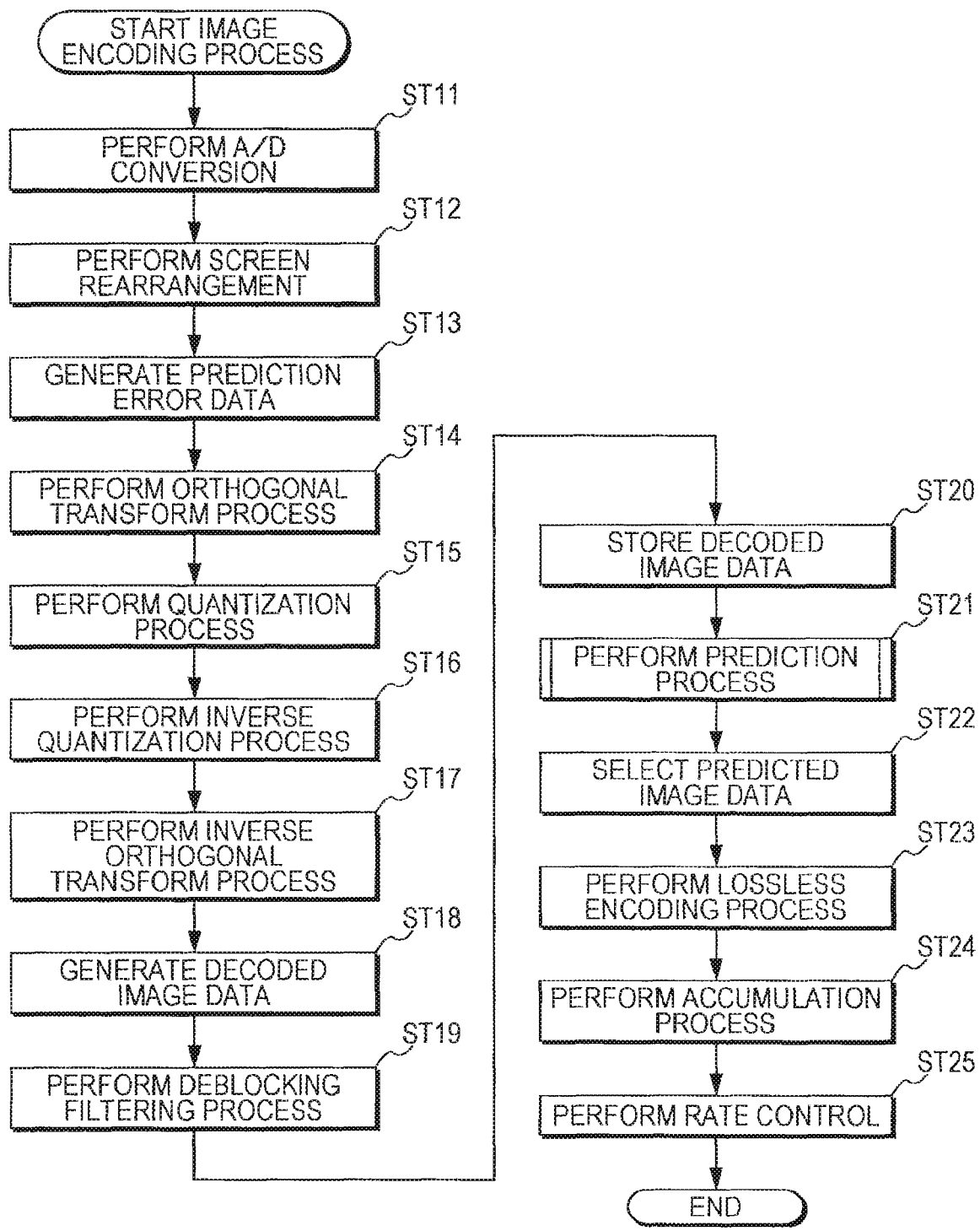
FIG. 3 is a flowchart illustrating an image encoding operation.

FIG. 3 is a flowchart illustrating the operation of an image encoding process. In step ST11, the A/D converter 11 performs A/D conversion on an input image signal.

In step ST12, the frame reordering buffer 12 performs screen reorder. The frame reordering buffer 12 stores the image data supplied from the A/D converter 11 and reorders the respective pictures so that the pictures arranged in the display order are reorderd in the encoding order.

In step ST13, the subtractor 13 generates prediction error data. The subtractor 13 calculates a difference between the image data of the images reorderd in step ST12 and the predicted image data selected by the predicted image/optimal mode selecting unit 33 to generate prediction error data. The prediction error data has a data amount that is smaller than that of the original image data. Thus, it is possible to compress the data amount as compared to when the image is encoded as it is. When the predicted image/optimal mode selecting unit 33 selects the predicted image supplied from the intra predictor 31 and the predicted image from the motion estimator/compensator 32 in respective slice units, the intra-prediction is performed in the slice in which the predicted image supplied from the intra predictor 31 is selected. Moreover, the inter-prediction is performed in the slice in which the predicted image from the motion estimator/compensator 32 is selected.

In step ST14, the orthogonal transformer 14 performs an orthogonal transform process. The orthogonal transformer 14 performs orthogonal transform on the prediction error data supplied from the subtractor 13. Specifically, orthogonal transform such as discrete cosine transform or Karhunen-Loeve transform is performed on the prediction error data, and transform coefficient data is output.

In step ST15, the quantizer 15 performs a quantization process. The quantizer 15 quantizes the transform coefficient data. When the quantization is performed, rate control is performed as will be described in the process of step ST25.

In step ST16, the inverse quantizer 21 performs an inverse quantization process. The inverse quantizer 21 performs inverse quantization on the transform coefficient data quantized by the quantizer 15 according to a property corresponding to the property of the quantizer 15.

In step ST17, the inverse orthogonal transformer 22 performs an orthogonal transform process. The inverse orthogonal transformer 22 performs inverse orthogonal transform on the transform coefficient data inverse-quantized by the inverse quantizer 21 according to a property corresponding to the property of the orthogonal transformer 14.

In step ST18, the adder 23 generates decoded image data. The adder 23 adds the predicted image data supplied from the predicted image/optimal mode selecting unit 33 and the data after the inverse orthogonal transform at the position corresponding to the predicted image to generate decoded image data.

In step ST19, the deblocking filtering unit 24 performs a deblocking filtering process. The deblocking filtering unit 24 performs filtering on the decoded image data output from the adder 23 to remove block distortion. Moreover, the deblocking filtering unit 24 is configured to perform a vertical filtering process even when the memory capacity of the line memory that stores the image data is reduced. Specifically, the deblocking filtering unit 24 controls the image range used for a filter operation in a block positioned on the upper side of a boundary according to a boundary detected by performing inter-block boundary detection in the vertical direction.

In step ST20, the frame memory 25 stores decoded image data. The frame memory 25 stores the decoded image data before the deblocking filtering process.

In step ST21, the intra predictor 31 and the motion estimator/compensator 32 perform prediction processes. That is, the intra predictor 31 performs an intra-prediction process in the intra-prediction mode and the motion estimator/compensator 32 performs a motion estimation/compensation process in the inter-prediction mode. By this process, the prediction processes are performed in all candidate prediction modes, and the cost function values in all candidate prediction modes are calculated. The optimal intra-prediction mode and the optimal inter-prediction mode are selected based on the calculated cost function values, and the predicted image generated in the selected prediction mode and the cost function and the prediction mode information are supplied to the predicted image/optimal mode selecting unit 33.

In step ST22, the predicted image/optimal mode selecting unit 33 selects predicted image data. The predicted image/optimal mode selecting unit 33 determines an optimal mode in which best encoding efficiency is obtained based on the respective cost function values output from the intra predictor 31 and the motion estimator/compensator 32. Further, the predicted image/optimal mode selecting unit 33 selects the predicted image data in the determined optimal mode and supplies the predicted image data to the subtractor 13 and the adder 23. The predicted image is used for the operation in steps ST13 and ST18 as described above.

In step ST23, the lossless encoder 16 performs a lossless encoding process. The lossless encoder 16 performs lossless encoding on the quantized data output from the quantizer 15. That is, lossless encoding such as variable-length encoding or arithmetic encoding is performed on the quantized data whereby the quantized data is compressed. In this case, in step ST22 described above, the prediction mode information (for example, including the macroblock type, the prediction mode, the motion vector information, the reference picture information, and the like) input to the lossless encoder 16 is also subjected to lossless encoding. Further, lossless encoding data of the prediction mode information is added to the header information of the encoded stream generated by losslessly encoding the quantized data.

In step ST24, the accumulation buffer 17 performs an accumulation process to accumulate the encoded stream. The encoded stream accumulated in the accumulation buffer 17 is appropriately read and is transmitted to a decoding side via a transmission line.

In step ST25, the rate controller 18 performs rate control. The rate controller 18 controls the rate of the quantization operation of the quantizer 15 so that an overflow or an underflow does not occur in the accumulation buffer 17 when the accumulation buffer 17 accumulates the encoded stream.

Next, the prediction process in step ST21 of FIG. 3 will be described. The intra predictor 31 performs an intra-prediction process. The intra predictor 31 performs intra-prediction on the image of a current block in all candidate intra-prediction modes. The image data of a reference image referenced in the intra-prediction is not subjected to the filtering process of the deblocking filtering unit 24, but the reference image data stored in the frame memory 25 is used. Although the details of the intra-prediction process are described later, by this process, intra-prediction is performed in all candidate intra-prediction modes, and the cost function values in all candidate intra-prediction modes are calculated. Moreover, one intra-prediction mode in which best encoding efficiency is obtained is selected from all intra-prediction modes based on the calculated cost function values. The motion estimator/compensator 32 performs an inter-prediction process. The motion estimator/compensator 32 performs an inter-prediction process in all candidate inter-prediction modes (all predicted block sizes) using the reference image data having been subjected to the filtering process, stored in the frame memory 25. Although the details of the inter-prediction process are described later, by this process, the prediction process is performed in all candidate inter-prediction modes, and the cost function values in all candidate inter-prediction modes are calculated. Moreover, one inter-prediction mode in which best encoding efficiency is obtained is selected from all inter-prediction modes based on the calculated cost function values.

Figure 4:
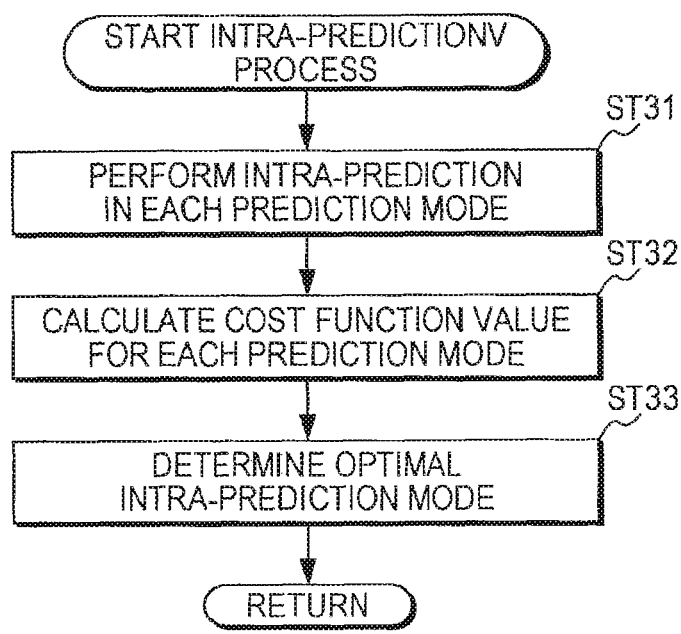
FIG. 4 is a flowchart illustrating an intra-prediction process.

The intra-prediction process will be described with reference to the flowchart of FIG. 4. In step ST31, the intra predictor 31 performs intra-prediction in the respective prediction modes. The intra predictor 31 generates predicted image data in each intra-prediction mode using the decoded image data before the filtering process, stored in the frame memory 25.

In step ST32, the intra predictor 31 calculates the cost function values of the respective prediction modes. For example, the lossless encoding process is performed tentatively in all candidate prediction modes, the cost function value expressed by Expression (1) below is calculated in the respective prediction modes.

$$\text{Cost}(\text{Mode} \in Q) = D + \lambda \cdot R \quad (1)$$

Here, "$\Omega$" represents a universal set of candidate prediction modes for encoding blocks and macroblocks. "D" represents differential energy (distortion) between a decoded image and an input image when encoding is performed in a prediction mode. "R" represents a generated code amount including orthogonal transform coefficients, prediction mode information, and the like, and "$\lambda$" represents the Lagrange multiplier given as a function of a quantization parameter QP.

Moreover, with respect to all candidate prediction modes, the predicted images are generated and header bits such as motion vector information and prediction mode information are calculated, and the cost function value expressed by Expression (2) below is calculated in the respective prediction modes.

$$\text{Cost}(\text{Mode} \in \Omega) = D + \text{QPtoQuant}(QP) \cdot \text{Header\_Bit} \quad (2)$$

Here, "$\Omega$" represents a universal set of candidate prediction modes for encoding blocks and macroblocks. "D" represents differential energy (distortion) between a decoded image and an input image when encoding is performed in a prediction mode. "Header_Bit" is a header bit of a prediction mode, and "QPtoQuant" is a function given as a function of a quantization parameter QP.

In step ST33, the intra predictor 31 determines an optimal intra-prediction mode. The intra predictor 31 selects one intra-prediction mode in which the calculated cost function value is the smallest based on the cost function values calculated in step ST32 and determines the intra-prediction mode as the optimal intra-prediction mode.

Figure 5:
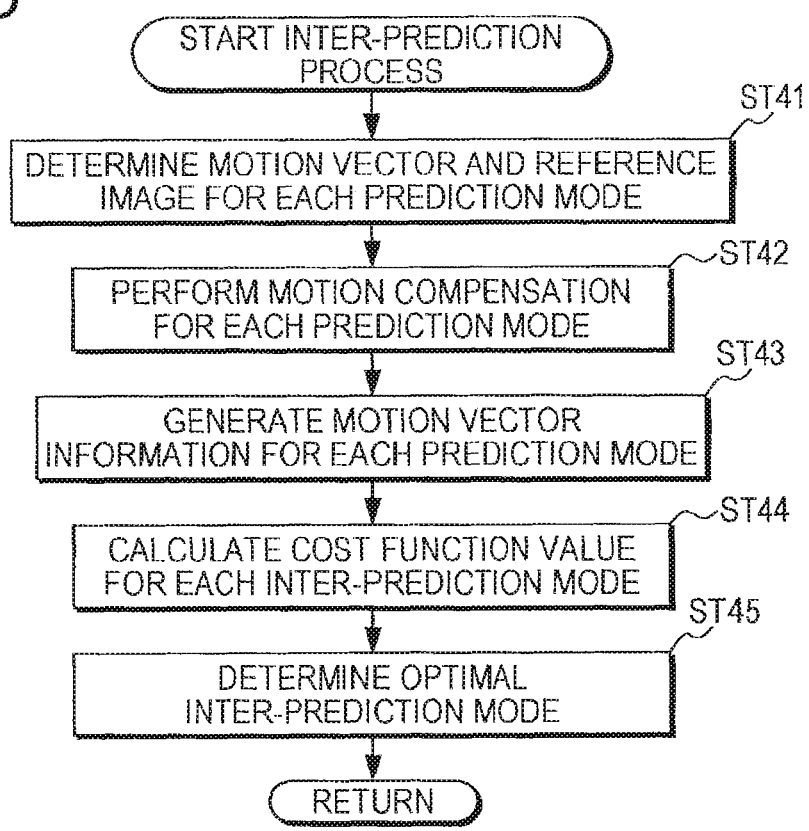
FIG. 5 is a flowchart illustrating an inter-prediction process.

Next, the inter-prediction process will be described with reference to the flowchart of FIG. 5. In step ST41, the motion estimator/compensator 32 determines a motion vector and a reference image in the respective prediction modes. That is, the motion estimator/compensator 32 determines the motion vector and the reference image of a current block of the respective prediction modes.

In step ST42, the motion estimator/compensator 32 performs motion compensation in the respective prediction modes. The motion estimator/compensator 32 performs motion compensation on the reference image based on the motion vector determined in step ST41 in the respective prediction modes (respective predicted block sizes) and generates predicted image data in the respective prediction modes.

In step ST43, the motion estimator/compensator 32 generates motion vector information in the respective prediction modes. The motion estimator/compensator 32 generates motion vector information included in the encoded stream with respect to the motion vectors determined in the respective prediction modes. For example, a predicted motion vector is determined using median prediction and motion vector information indicating a difference between the motion vector detected by motion estimation and the predicted motion vector is generated. The motion vector information generated in this manner is also used in calculation of the cost function value in the next step ST44, and when the corresponding predicted image is ultimately selected by the predicted image/optimal mode selecting unit 33, the motion vector information is included in the prediction mode information and output to the lossless encoder 16.

In step ST44, the motion estimator/compensator 32 calculates the cost function value in the respective inter-prediction modes. The motion estimator/compensator 32 calculates the cost function value using Expression (1) or (2) described above.

In step ST45, the motion estimator/compensator 32 determines an optimal inter-prediction mode. The motion estimator/compensator 32 selects one prediction mode in which the calculated cost function value is the smallest based on the cost function values calculated in step ST44.

4. Configuration when Applied to Image Decoding Device

The encoded stream generated by encoding an input image is supplied to an image decoding device via a predetermined transmission line, a recording medium, or the like and is decoded.

Figure 6:
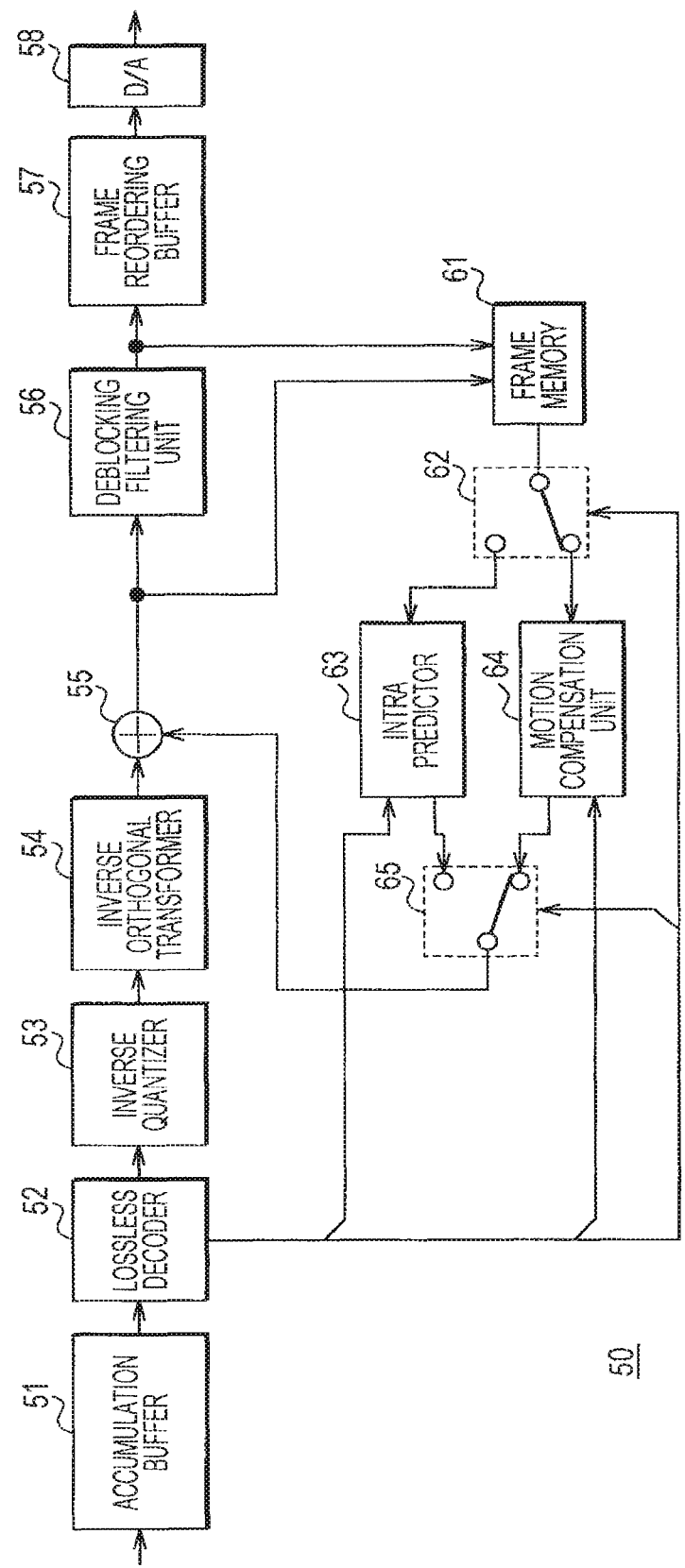
FIG. 6 is a diagram illustrating a configuration when applied to an image decoding device.

FIG. 6 illustrates the configuration of an image decoding device. An image decoding device 50 includes an accumulation buffer 51, a lossless decoder 52, an inverse quantizer 53, an inverse orthogonal transformer 54, an adder 55, a deblocking filtering unit 56, a frame reordering buffer 57, and a D/A converter 58. The image decoding device 50 further includes a frame memory 61, selectors 62 and 65, an intra predictor 63, and a motion compensation unit 64.

The accumulation buffer 51 accumulates encoded streams transmitted thereto. The lossless decoder 52 decodes the encoded streams supplied from the accumulation buffer 51 according to a scheme corresponding to the encoding scheme of the lossless encoder 16 of FIG. 2. Moreover, the lossless decoder 52 outputs prediction mode information obtained by decoding the header information of the encoded streams to the intra predictor 63 and the motion compensation unit 64.

The inverse quantizer 53 performs inverse quantization on the quantized data decoded by the lossless decoder 52 according to a scheme corresponding to the quantization scheme of the quantizer 15 of FIG. 2. The inverse orthogonal transformer 54 performs inverse orthogonal transform on the output of the inverse quantizer 53 according to a scheme corresponding to the orthogonal transform scheme of the orthogonal transformer 14 of FIG. 2 and outputs the output to the adder 55.

The adder 55 adds the data after the inverse orthogonal transform and the predicted image data supplied from the selector 65 to generate decoded image data and outputs the decoded image data to the deblocking filtering unit 56 and the frame memory 61.

The deblocking filtering unit 56 performs a filtering process on the decoded image data supplied from the adder 55 similarly to the deblocking filtering unit 24 of FIG. 2 to remove block distortion and outputs the decoded image data to the frame reordering buffer 57 and the frame memory 61.

The frame reordering buffer 57 performs screen reorder. That is, the frames reorderd from the encoding order used in the frame reordering buffer 12 of FIG. 2 are reorderd in the original display order and are output to the D/A converter 58.

The D/A converter 58 performs D/A conversion on the image data supplied from the frame reordering buffer 57 and outputs the image data to a display (not illustrated) to thereby display images.

The frame memory 61 maintains the decoded image data before the filtering process, supplied from the adder 55 and the decoded image data having been subjected to the filtering process, supplied from the deblocking filtering unit 56 as image data of a reference image.

The selector 62 supplies the reference image data before the filtering process, read from the frame memory 61 to the intra predictor 63 when a predicted block having been subjected to intra-prediction is decoded based on the prediction mode information supplied from the lossless decoder 52. Moreover, the selector 26 supplies the reference image data having been subjected to the filtering process, read from the frame memory 61 to the motion compensation unit 64 when a predicted block having been subjected to inter-prediction is decoded based on the prediction mode information supplied from the lossless decoder 52.

The intra predictor 63 generates predicted images based on the prediction mode information supplied from the lossless decoder 52 and outputs the generated predicted image data to the selector 65.

The motion compensation unit 64 performs motion compensation based on the prediction mode information supplied from the lossless decoder 52 to generate predicted image data and outputs the predicted image data to the selector 65. That is, the motion compensation unit 64 performs motion compensation using a motion vector based on the motion vector information with respect to the reference image indicated by the reference frame information based on the motion vector information and the reference frame information included in the prediction mode information to generate predicted image data.

The selector 65 supplies the predicted image data generated by the intra predictor 63 to the adder 55. Moreover, the selector 65 supplies the predicted image data generated by the motion compensation unit 64 to the adder 55.

A decoding unit in the claims includes the lossless decoder 52, the inverse quantizer 53, the inverse orthogonal transformer 54, the adder 55, the intra predictor 63, the motion compensation unit 64, and the like.

5. Operation of Image Decoding Device

Figure 7:
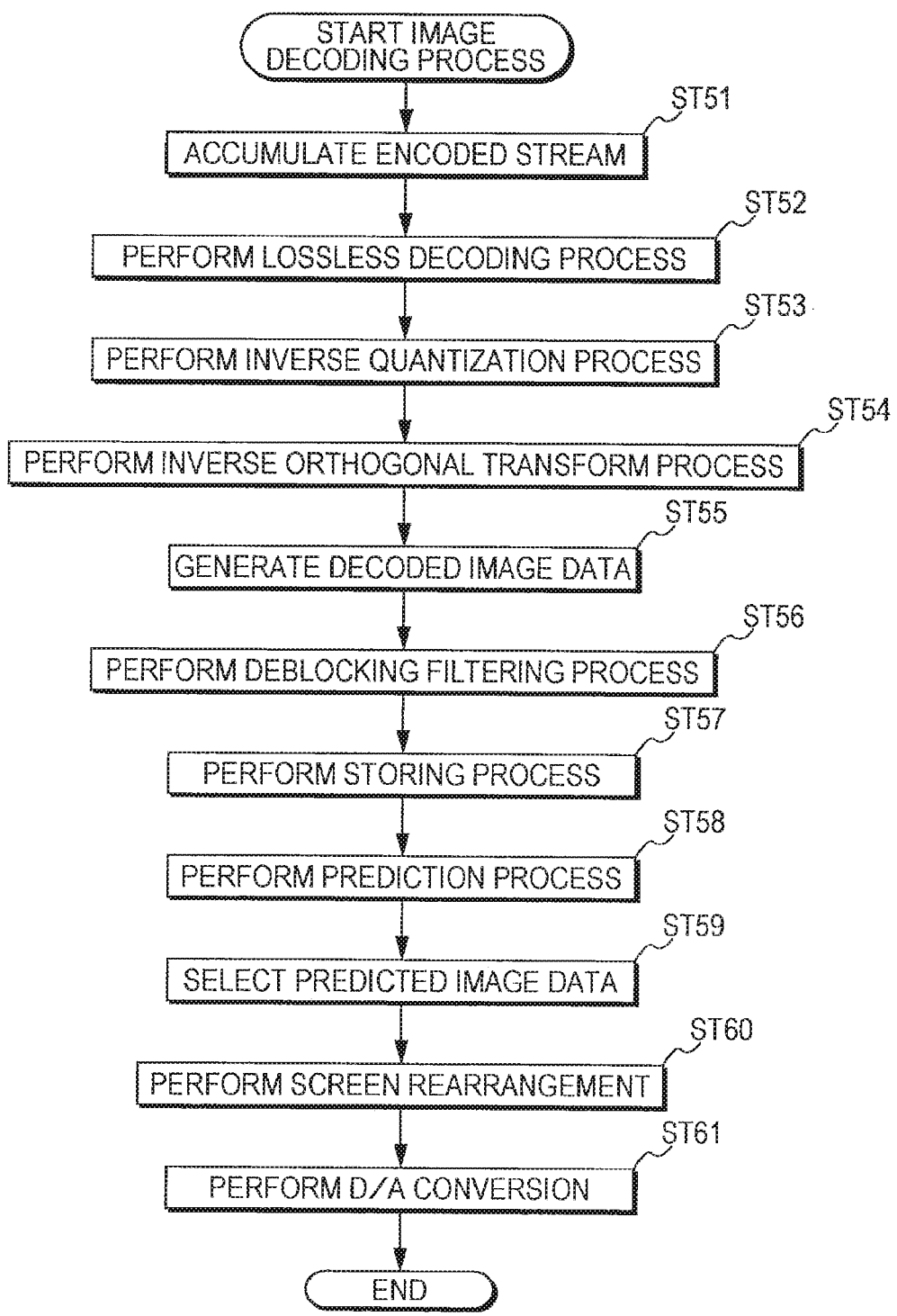
FIG. 7 is a flowchart illustrating an image decoding operation.

Next, an image processing device performed by the image decoding device 50 will be described with reference to the flowchart of FIG. 7.

In step ST51, the accumulation buffer 51 accumulates encoded streams transferred thereto. In step ST52, the lossless decoder 52 performs a lossless decoding process. The lossless decoder 52 decodes the encoded streams supplied from the accumulation buffer 51. That is, the quantized data of the respective pictures encoded by the lossless encoder 16 of FIG. 2 is obtained. Moreover, the lossless decoder 52 performs lossless decoding on the prediction mode information included in the header information of the encoded stream to obtain prediction mode information and supplies the prediction mode information to the deblocking filtering unit 56 and the selectors 62 and 65. Further, the lossless decoder 52 outputs the prediction mode information to the intra predictor 63 when the prediction mode information is information on the intra-prediction mode. In addition, the lossless decoder 52 outputs the prediction mode information to the motion compensation unit 64 when the prediction mode information is information on the inter-prediction mode.

In step ST53, the inverse quantizer 53 performs an inverse quantization process. The inverse quantizer 53 performs inverse quantization on the quantized data decoded by the lossless decoder 52 according to a property corresponding to the property of the quantizer 15 of FIG. 2.

In step ST54, the inverse orthogonal transformer 54 performs an orthogonal transform process. The inverse orthogonal transformer 54 performs inverse orthogonal transform on the transform coefficient data inverse-quantized by the inverse quantizer 53 according to a property corresponding to the property of the orthogonal transformer 14 of FIG. 2.

In step ST55, the adder 55 generates decoded image data. The adder 55 adds the data obtained by performing the orthogonal transform process and the predicted image data selected in step ST59 described later to generate the decoded image data. In this manner, the original image is decoded.

In step ST56, the deblocking filtering unit 56 performs a deblocking filtering process. The deblocking filtering unit 56 performs a filtering process on the decoded image data output by the adder 55 to remove block distortion included in the decoded image.

In step ST57, the frame memory 61 stores the decoded image data.

In step ST58, the intra predictor 63 and the motion compensation unit 64 perform a prediction process. The intra predictor 63 and the motion compensation unit 64 perform the prediction process on the prediction mode information supplied from the lossless decoder 52.

That is, when the prediction mode information of the intra-prediction is supplied from the lossless decoder 52, the intra predictor 63 performs an intra-prediction process based on the prediction mode information to generate the predicted image data. Moreover, when the prediction mode information of the inter-prediction is supplied from the lossless decoder 52, the motion compensation unit 64 performs motion compensation based on the prediction mode information to generate the predicted image data.

In step ST59, the selector 65 selects predicted image data. That is, the selector 65 selects the predicted image supplied from the intra predictor 63 and the predicted image data generated by the motion compensation unit 64 and supplies the predicted image and the predicted image data to the adder 55 so as to be added to the output of the inverse orthogonal transformer 54 in step ST55 as described above.

In step ST60, the frame reordering buffer 57 performs screen reorder. That is, the frame reordering buffer 57 reorders the frames so that the frames reorderd in the encoding order used in the frame reordering buffer 12 of the image encoding device 10 of FIG. 2 are reorderd in the original display order.

In step ST61, the D/A converter 58 performs D/A conversion on the image data from the frame reordering buffer 57. This image is output to a display (not illustrated) and the image is displayed.

6. Basic Operation of Deblocking Filtering Unit

In general, a deblocking filtering process according to an image encoding scheme such as H.264/AVC or HEVC involves determining whether filtering is necessary or not and performing a filtering process with respect to an inter-block boundary in which filtering is determined to be necessary.

The inter-block boundary includes boundaries (that is, horizontally adjacent inter-block boundaries (hereinafter referred to as "vertical boundaries") detected by performing inter-block boundary detection in the horizontal direction. Moreover, the inter-block boundary includes inter-block boundaries (that is, vertically adjacent inter-block boundaries (hereinafter referred to as "line boundaries") detected by performing inter-block boundary detection in the vertical direction.

FIG. 8 is an explanatory diagram illustrating an example of pixels in two blocks BKa and BKb adjacent with a boundary interposed. In this example, although a vertical boundary is used as an example, the same can be applied to a line boundary. In the example of FIG. 8, image data of pixels in the block BKa is represented by symbol "pi,j." Here, "i" is a column index of pixel and "j" is a row index of pixel. Moreover, a smallest unit of the encoding process is a block of 8×8 pixels, and column indexes "i" of 0, 1, 2, and 3 are assigned sequentially (from left to right) from the column close to the vertical boundary. Row indexes "j" of 0, 1, 2, . . . , and 7 are assigned from top to bottom. The left half of the block BKa is omitted in the drawing. On the other hand, image data of pixels in the block BKb is represented by symbol "qk,j." Here, "k" is a column index of pixel and "j" is a row index of pixel. The column indexes "k" of 0, 1, 2, and 3 are assigned sequentially (from left to right) from the column close to the vertical boundary. The right half of the block BKb is also omitted in the drawing.

When it is determined that a deblocking filter is to be applied to a boundary and the boundary is a vertical boundary, for example, a filtering process is performed on the pixels on the left and right sides of the boundary. As for luminance components, a filter having strong filter strength and a filter having weak filter strength are switched according to the value of image data.

[Luminance Component Filtering]

In selecting of strength, whether the conditions of Expressions (3) to (5) are satisfied is determined for each line (or each column). A strong filter is selected when all conditions of Expressions (3) to (5) are satisfied, and a weak filter is selected when the conditions of any one of the expressions are not satisfied.

[Mathematical formula 1]

$$d < (\beta >> 2) \qquad (3)$$

$$|p_3 - p_0| + |q_0 - q_3| < (\beta >> 3) \qquad (4)$$

$$|p_0 - q_0| < ((5 * t_C + 1) >> 1) \qquad (5)$$

In Expression (3), "d" is a value calculated based on Expression (6). Moreover, "β" in Expressions (4) and (5) and "tc" in Expression (5) are values that are set based on a quantization parameter Q as indicated in Table 1. Additionally, in expressions (4) and (5), because the expressions assume a common row index or common column index for all pixel values, image data of pixels represented by symbol "$P_i$" where "i" is a column index of a pixel when the row is constant, or $P_j$, where "j" is the row index of a pixel when the column is constant.

[Mathematical formula 2]

$$d=|p_{2,2}-2*p_{1,2}+p_{0,2}|+|q_{2,2}-2*q_{1,2}+q_{0,2}|+|p_{2,5}-2*p_{1,5}+p_{0,5}|+|q_{2,5}-2*q_{1,5}+q_{0,5}| \quad (6)$$

TABLE 1

| | Q | | | | | | | | | | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 |
| β | 0 | 0 | 0 | 0 | 0 | 0 | 0 | 0 | 0 | 0 | 0 | 0 | 0 | 0 | 0 | 0 | 6 | 7 | 8 |
| $t_c$ | 0 | 0 | 0 | 0 | 0 | 0 | 0 | 0 | 0 | 0 | 0 | 0 | 0 | 0 | 0 | 0 | 0 | 0 | 1 |

| | Q | | | | | | | | | | | | | | | | | | |
|---|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_c$ | 1 | 1 | 1 | 1 | 1 | 1 | 1 | 1 | 2 | 2 | 2 | 2 | 3 | 3 | 3 | 3 | 4 | 4 | 4 |

| | Q | | | | | | | | | | | | | | | | | |
|---|---|---|---|---|---|---|---|---|---|---|---|---|---|---|---|---|---|---|
| | 38 | 39 | 40 | 41 | 42 | 43 | 44 | 45 | 46 | 47 | 48 | 49 | 50 | 51 | 52 | 53 | 54 | 55 |
| β | 38 | 40 | 42 | 44 | 46 | 48 | 50 | 52 | 54 | 56 | 58 | 60 | 62 | 64 | 64 | 64 | 64 | 64 |
| $t_c$ | 5 | 5 | 6 | 6 | 7 | 8 | 9 | 9 | 10 | 10 | 11 | 11 | 12 | 12 | 13 | 13 | 14 | 14 |

In weak filtering, the luminance components of the respective pixels in a filter processing range are calculated by performing the operations of Expressions (7) to (11).

[Mathematical formula 3]

$$p_1'=\text{Clip1}_Y(p_1+\Delta/2) \quad (7)$$

$$p_0'=\text{Clip1}_Y(p_0+\Delta) \quad (8)$$

$$q_0'=\text{Clip1}_Y(q_0-\Delta) \quad (9)$$

$$q_1'=\text{Clip1}_Y(q_1-\Delta/2) \quad (10)$$

$$\Delta=\text{Clip3}(-t_C,t_C,(13*(q_0-p_0)+4*(q_1-p_1)-5*(q_2-p_0)+16)>>5) \quad (11)$$

In strong filtering, the luminance components of the respective pixels in a filter processing range are calculated by performing the operations of Expressions (12) to (18).

[Mathematical formula 4]

$$p_2'=\text{Clip1}_Y((2p_3+3p_2+p_1+p_0+q_0+4)>>3) \quad (12)$$

$$p_1'=\text{Clip1}_Y((p_2+p_1+p_0+q_0+2)>>2) \quad (13)$$

$$p_0'=\text{Clip1}_Y((p_2+2*p_1+2*p_0+2*q_0+q_1+4)>>3) \quad (14)$$

$$p_0'=\text{Clip1}_Y((p_1+2*p_1+2*p_0+2*q_0+q_1+4)>>3) \quad (15)$$

$$q_0'=\text{Clip1}_Y((p_1+2*p_0+2*q_0+2*q_1+q_2+4)>>3) \quad (16)$$

$$q_1'=\text{Clip1}_Y((p_0+q_0+q_1+q_2+2)>>2) \quad (17)$$

$$q_2'=\text{Clip1}_Y((p_0+q_0+q_1+3*q_2+2*q_3+4)>>3) \quad (18)$$

Moreover, in filtering of chrominance components, the chrominance components of the respective pixels in a filter processing range are calculated by performing the operations of Expressions (19) to (21).

[Mathematical formula 5]

$$p_0'=\text{Clip1}_C(p_0+\Delta) \quad (19)$$

$$q_0'=\text{Clip1}_C(q_0-\Delta) \quad (20)$$

$$\Delta=\text{Clip3}(-t_C,t_C,((((q_0-p_0)<<2)+p_1-q_1+4)>>3)) \quad (21)$$

In the above expressions, "Clip1Y" and "Clip1c" represent operations of Expressions (22) and (23), and "Clip3(x, y,z)" in Expressions (22) and (23) represents a value determined by Expression (24).

[Mathematical formula 6]

$$\text{Clip1}_Y(x) = \text{Clip3}(0, (1<< \text{BitDepth}_Y) - 1, x) \quad (22)$$

$$\text{Clip1}_C(x) = \text{Clip3}(0, (1<< \text{BitDepth}_C) - 1, x) \quad (23)$$

$$\text{Clip3}(x, y, z) = \begin{cases} x & ; \ z < x \\ y & ; \ z > y \\ z & ; \ \text{otherwise} \end{cases} \quad (24)$$

Moreover, as for the line boundary, the operation performed for each line using the pixels in the horizontal direction at the vertical boundary is performed for each column using the pixels in the vertical direction, and the filtering process is performed.

In the deblocking filtering process, a process that requires a line memory is the vertical filtering process, and hereinafter, a reduction in the memory capacity of the line memory in the vertical filtering process will be described in detail. Since the deblocking filtering unit 24 of the image encoding device 10 has the same configuration and performs the same operation as those of the deblocking filtering unit 56 of the image decoding device 50, the deblocking filtering unit 24 only will be described.

7. First Embodiment of Deblocking Filtering Unit

Figure 9:
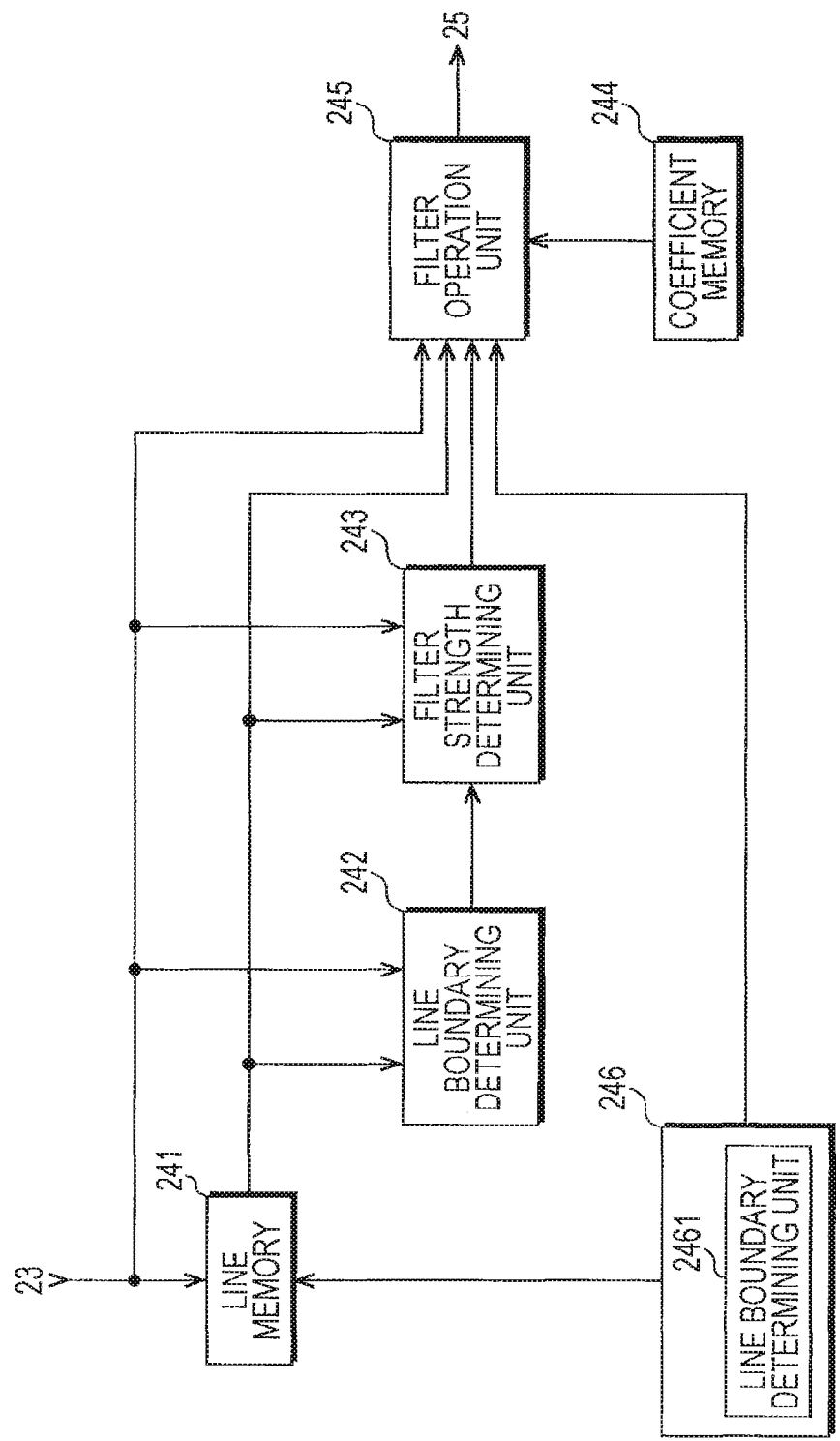
FIG. 9 is a diagram illustrating the configuration of a first embodiment of the deblocking filtering unit.

FIG. 9 illustrates the configuration of a first embodiment of the deblocking filtering unit. The deblocking filtering unit 24 includes a line memory 241, a line boundary detecting unit 242, a filter strength determining unit 243, a coefficient memory 244, a filter operation unit 245, and a filter controller 246.

The line memory 241 stores image data supplied from the adder 23 based on a control signal from the filter controller 246. Moreover, the line memory 241 reads the image data stored therein and outputs the read image data to the line boundary detecting unit 242, the filter strength determining unit 243, and the filter operation unit 245.

The line boundary detecting unit 242 detects a line boundary in which the vertical filtering process is performed. The line boundary detecting unit 242 performs the filtering necessity determining process for each block using the image data supplied from the adder 23 and the image data read from the line memory 241 and detects a line boundary in which the vertical filtering process is performed. The line boundary detecting unit 242 outputs the detection results to the filter strength determining unit 243.

The filter strength determining unit 243 determines the filter strength as described above. The filter strength determining unit 243 determines whether the vertical filtering process is to be performed in a strong filtering mode or a weak filtering mode using the image data of two blocks adjacent with the line boundary interposed in which the vertical filtering process is performed, and outputs the determination results to the filter operation unit 245.

The coefficient memory 244 stores filter coefficients used in the filtering operation of the deblocking filtering process.

The filter operation unit 245 performs a filtering operation with the filter strength determined by the filter strength determining unit 243 using the image data supplied from the adder 23, the image data stored in the line memory 241, and the filter coefficients read from the coefficient memory 244. The filter operation unit 245 outputs the image data having been subjected to the vertical filtering process to the frame memory 25. Moreover, the filter operation unit 245 controls an image range used in the filtering operation in a block that is positioned on the upper side of the line boundary based on the block boundary determination result supplied from the filter controller 246.

The filter controller 246 controls the line memory 241 so as to store image data corresponding to a predetermined number of lines on the lower side in the block. Moreover, the filter controller 246 reads the image data stored in the line memory 241. Further, the filter controller 246 includes a line boundary determining unit 2461. The line boundary determining unit 2461 determines whether a boundary is a line boundary (for example, inter-LCU line boundary) in respective block units in which the process is sequentially performed in a raster scan direction and outputs the determination results to the filter operation unit 245. The filter operation unit 245 performs controls such that the vertical filtering process can be performed even when the memory capacity of the line memory is reduced.

Figure 10:
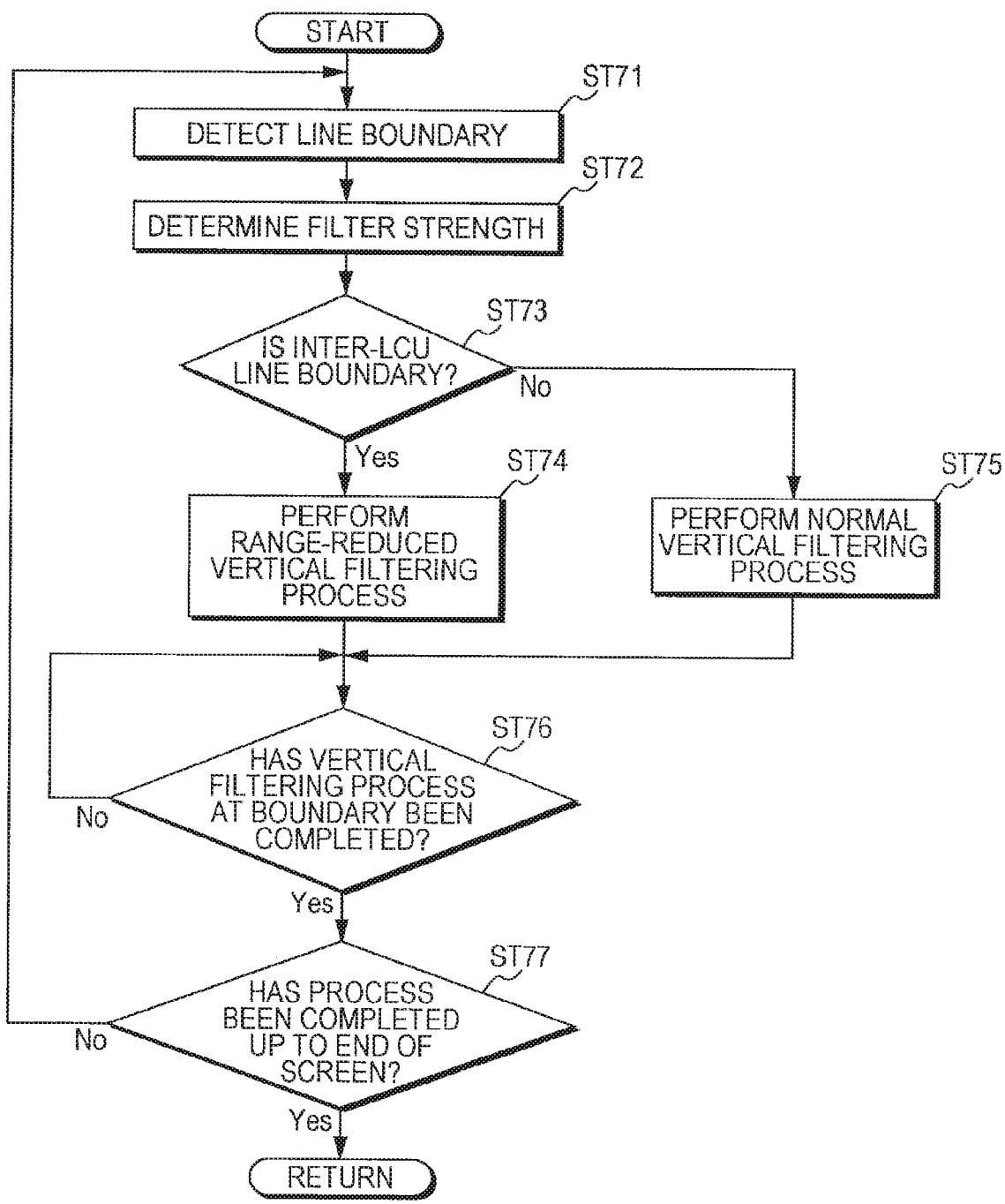
FIG. 10 is a flowchart illustrating the operation of the first embodiment of the deblocking filtering unit.

FIG. 10 illustrates the operation of the first embodiment of the deblocking filtering unit. In step ST71, the deblocking filtering unit 24 detects a line boundary. The deblocking filtering unit 24 detects a line boundary in which the vertical filtering process is performed.

In step ST72, the deblocking filtering unit 24 determines a filter strength. The deblocking filtering unit 24 determines whether a strong filtering mode or a weak filtering mode will be used for the line boundary in which the vertical filtering process is performed.

In step ST73, the deblocking filtering unit 24 determines whether the boundary in which the vertical filtering process is performed is an inter-LCU line boundary. The deblocking filtering unit 24 proceeds to step ST74 when the boundary in which the vertical filtering process is performed is the inter-LCU line boundary and proceeds to step ST75 when the boundary is not the inter-LCU line boundary.

In step ST74, the deblocking filtering unit 24 performs a range-reduced vertical filtering process. The deblocking filtering unit 24 performs the vertical filtering process while reducing the image range used for the filtering operation of the upper adjacent LCU and the flow proceeds to step ST76.

In step ST75, the deblocking filtering unit 24 performs a normal vertical filtering process. The deblocking filtering unit 24 performs the vertical filtering process using predetermined taps and coefficients without reducing the image range used for the filtering operation and the flow proceeds to step ST76.

In step ST76, the deblocking filtering unit 24 determines whether the vertical filtering process at the boundary has been completed. When the vertical filtering process for the respective columns of the boundary has not been completed, the deblocking filtering unit 24 returns to step ST76 and performs the process for the next column. Moreover, when the vertical filtering process for the respective columns of the boundary has been completed, the flow proceeds to step ST77.

In step ST77, the deblocking filtering unit 24 determines whether the process has been completed up to the end of the screen. When the process has not been completed up to the end of the screen, the deblocking filtering unit 24 returns to step ST71, detects a new boundary and performs the vertical filtering process. When the process has been completed up to the end of the screen, the deblocking filtering unit 24 ends the process for 11 screens.

[Configuration and Operation of Filter Operation Unit]

Figure 11:
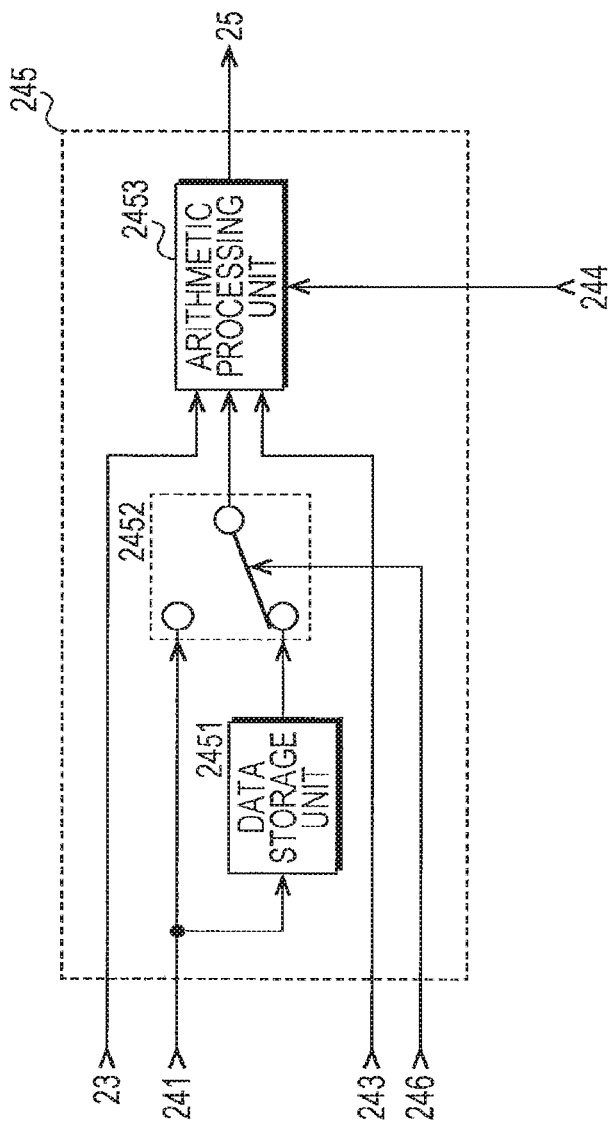
FIG. 11 is a diagram illustrating the configuration of a filter operation unit.

FIGS. 11 and 12 illustrate the configuration of the filter operation unit. When a tap-changeable vertical filtering process is performed, the filter operation unit 245 changes the image data of a tap or changes the number of taps such that the vertical filtering process can be performed even when the number of lines that store image data is reduced. FIG. 11 illustrates the configuration of a filter operation unit when a vertical filtering process is performed while changing the image data of a tap. Moreover, FIG. 12 illustrates the configuration of a filter operation unit when a vertical filtering process is performed while changing the number of taps.

In FIG. 11, the filter operation unit 245 includes a data storage unit 2451, a data selecting unit 2452, and an arithmetic processing unit 2453.

When the memory capacity of a line memory is reduced, the data storage unit 2451 stores image data to be used for a tap at the position of the reduced line. The data storage unit 2451 outputs the image data stored therein to the data selecting unit 2452 as the image data of a tap at the position of the reduced line.

The data selecting unit 2452 selects one of the image data stored in the data storage unit 2451 and the image data stored in the line memory and outputs the selected image data to the arithmetic processing unit 2453.

The arithmetic processing unit 2453 performs an arithmetic process using the image data supplied from the adder 23 and the data selecting unit 2452 and the filter coefficients read from the coefficient memory 244 to generate image data after the vertical filtering process and outputs the image data to the frame memory 25.

In FIG. 12, the filter operation unit 245 includes an arithmetic processing unit 2455 and an arithmetic processing unit 2456.

The arithmetic processing unit 2455 performs an arithmetic process with a predetermined number of taps and outputs image data after the vertical filtering process to the data selecting unit 2457.

The arithmetic processing unit 2456 performs an arithmetic process without using the image data of the reduced line by reducing the number of taps according to a reduction in the memory capacity of the line memory and outputs the image data after the vertical filtering process to the data selecting unit 2457.

The data selecting unit 2457 selects the image data depending on whether the boundary is an inter-LCU line boundary. When the boundary is not the boundary between LCUs, the data selecting unit 2457 selects the image data output from the arithmetic processing unit 2455. Moreover, when the boundary is the inter-LCU line boundary, the data selecting unit 2457 selects the image data output from the arithmetic processing unit 2456.

Figures 13A, 13B:
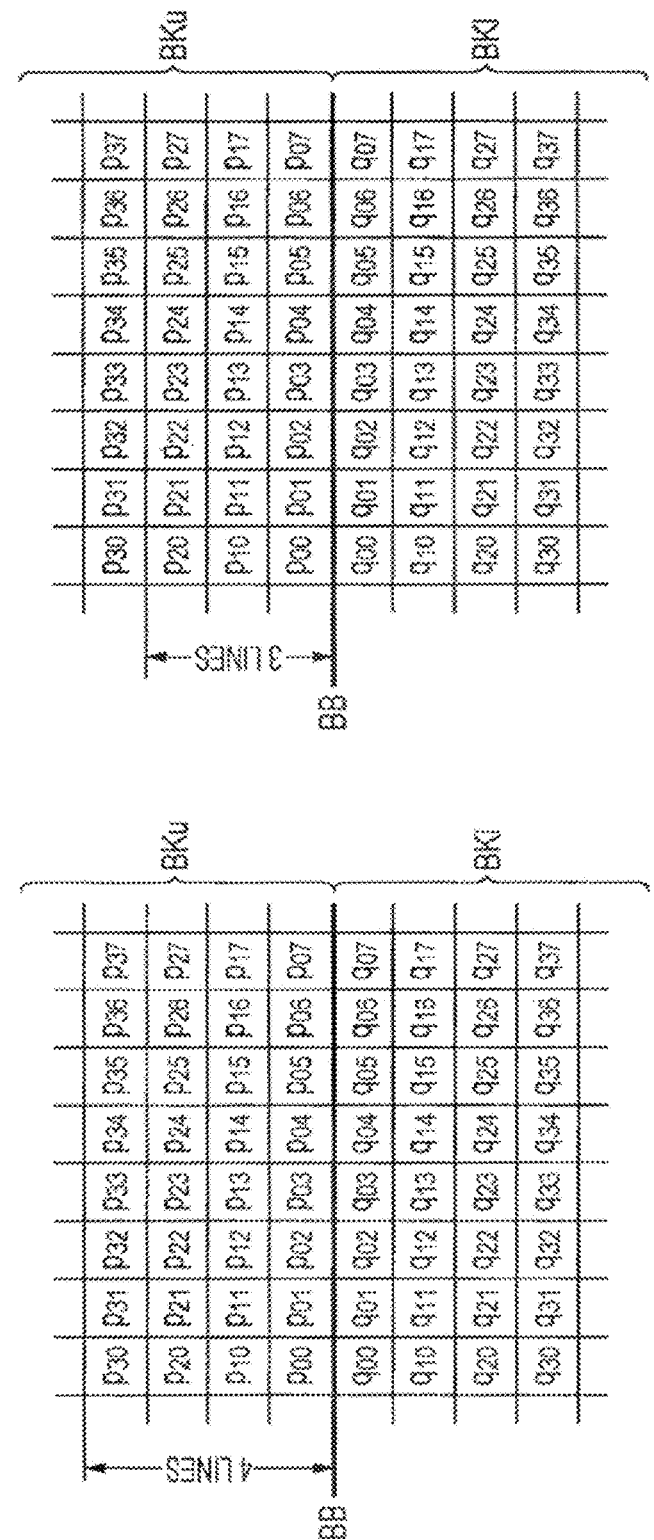
FIGS. 13(A) and 13(B) are diagrams for describing the operation of the filter operation unit.

FIGS. 13(A) and 13(B) are diagrams for describing the operation of the filter operation unit 245. The drawings illustrate the image data of respective pixels of two adjacent blocks BKu and BKl. Here, the filtering operation is performed using three pixels each from a boundary (line boundary) BB as a filter processing range of the vertical filtering process and four pixels each from the boundary BB as a tap. When it is determined that the filtering is to be performed in a strong filtering mode, the operations of Expressions (12) to (18) described above are performed for each column by the arithmetic processing units 2453 and 2455. Moreover, when it is determined that the filtering is to be performed in a weak filtering mode, the operations of Expressions (7) to (10) described above are performed for each column by the arithmetic processing units 2453 and 2455.

When the deblocking filtering process is performed in a raster order in respective LCU units, it is determined that the vertical filtering process is performed in a strong filtering mode, and the operations of Expressions (12) to (18) described above are performed. Thus, as illustrated in FIG. 13(A), the image data of the block BKu on the upper side of the boundary BB corresponding to four lines from the boundary BB needs to be stored in the line memory.

Here, the filter operation unit 245 controls the image range used for the filtering operation in the block positioned on the upper side of the boundary BB whereby the vertical filtering process can be performed even when the memory capacity of the line memory is reduced. For example, as illustrated in FIG. 13(B), image data corresponding to three lines from the boundary BB is stored, and the vertical filtering process is performed using the stored image data. That is, the arithmetic processing unit 2453 illustrated in FIG. 11 performs the operation of Expression (25). Moreover, the arithmetic processing unit 2456 illustrated in FIG. 12 performs the operation of Expression (26), and the data selecting unit 2457 selects the image data from the arithmetic processing unit 2456 and outputs the image data. In Expressions (25) and (26), "i" indicates a column index of pixel, and when the filtering process is performed in units of blocks of 8×8 pixels, "i=0 to 7."

[Mathematical formula 7]

$$p_{2i}' = \text{Clip1}_Y((2*p_{2i} + 3*p_{1i} + p_{0i} + q_{0i} + 4) >> 3) \quad (25)$$

$$p_{2i}' = \text{Clip1}_Y((5*p_{2i} + p_{1i} + p_{01} + 4) >> 3) \quad (26)$$

The arithmetic processing unit 2453 copies the pixels in the upper block BKu on the upper end of the filter processing range in the upward direction and uses the same. That is, by using the image data p2 of the pixels at the upper end of the filter processing range stored in the data storage unit 2451 as the image data p3, the image data p2i' after the filtering process is calculated by the operation of Expression (25).

The arithmetic processing unit 2456 reduces the number of taps and calculates the image data p2i' after the filtering process by the operation of Expression (26) using the coefficients changes with the reduction in the number of taps. In this case, the coefficients are changed such that the coefficient of the image data p2 is changed from "3" to "5" so as to correspond to copying of the upper end pixels in the tap range.

When the boundary BB is not the inter-LCU line boundary, since it is not necessary to use the image data of the line memory 241, the same filtering operation as the conventional operation is performed without narrowing the image range used for the filtering operation. That is, the arithmetic processing unit 2453 illustrated in FIG. 11 performs the same filtering operation as the conventional operation. Moreover, the arithmetic processing unit 2455 illustrated in FIG. 12 performs the same filtering operation as the conventional operation and the data selecting unit 2457 selects and outputs the image data from the arithmetic processing unit 2455.

In this manner, when the boundary is a line boundary of blocks in which the process is sequentially performed in a raster scan order, by controlling the image range used for the filtering operation, even when the memory capacity of the line memory is reduced, the deblocking filtering process can be performed in the same manner as before the reduction. Moreover, for example, one line of image of 4K=2K corresponds to two lines of image of 2K=1K. Further, in the H.264/AVC scheme, a line memory corresponding to four lines is included, and the memory capacity corresponding to one line of image of 4K=2K corresponds to 50% of the memory capacity of the H.264/AVC scheme. Thus, the effect of reducing the memory capacity in a high-resolution image is improved.

8. Second Embodiment of Deblocking Filtering Unit

A second embodiment of the deblocking filtering unit is different from the first embodiment in that the operations of the arithmetic processing unit 2453 and the arithmetic processing unit 2456 are different from those of the first embodiment.

In strong filtering, when the boundary BB is the inter-LCU line boundary, and the operations of Expressions (12) to (18) described above are performed, as illustrated in FIG. 13(A), the image data of the block BKu on the upper side of the boundary BB corresponding to four lines from the boundary BB needs to be stored in the line memory.

Here, the filter operation unit 245 controls the image range used for the filtering operation in the block positioned on the upper side of the boundary BB whereby the vertical filtering process can be performed even when the memory capacity of the line memory is reduced. For example, as illustrated in FIG. 13(B), image data corresponding to three lines from the boundary BB is stored, and the vertical filtering process is performed using the stored image data. That is, the arithmetic processing unit 2453 illustrated in FIG. 11 performs the operation of Expression (27). Moreover, the arithmetic processing unit 2456 illustrated in FIG. 12 performs the operation of Expression (28), and the data selecting unit 2457 selects the image data from the arithmetic processing unit 2456 and outputs the image data. In Expressions (27) and (28), "i" indicates a column index of pixel, and when the filtering process is performed in units of blocks of 8×8 pixels, "i=0 to 7."

[Mathematical formula 8]

$$p_{2i}'=\text{Clip1}_Y((2*p_{2i}+3*p_{2i}+p_{1i}+q_{0i}+4)>>3) \qquad (27)$$

$$p_{2i}'=\text{Clip1}_Y((3*p_{2i}+3p_{1i}+p_{0i}+q_{0i}+4)>>3) \qquad (28)$$

The arithmetic processing unit 2453 performs mirror copying about the pixels in the upper block BKu on the upper end of the filter processing range. That is, by storing the image data p1 in the data storage unit 2451, mirror-copying the image data p1 about the upper end pixels in the filter processing range to use the image data p1 as the image data p3, the image data p2i' after the filtering process is calculated by the operation of Expression (27).

The arithmetic processing unit 2456 reduces the number of taps and calculates the image data p2i' after the filtering process by the operation of Expression (28) using the coefficients changes with the reduction in the number of taps. In this case, the coefficients are changed such that the coefficient of the image data p1 is changed from "2" to "3" so as to correspond to mirror-copying about the upper end pixels in the filter processing range.

When the boundary BB is not the inter-LCU line boundary, since it is not necessary to use the image data of the line memory 241, the same filtering operation as the conventional operation is performed without narrowing the image range used for the filtering operation. That is, the arithmetic processing unit 2453 illustrated in FIG. 11 performs the same filtering operation as the conventional operation. Moreover, the arithmetic processing unit 2455 illustrated in FIG. 12 performs the same filtering operation as the conventional operation and the data selecting unit 2457 selects and outputs the image data from the arithmetic processing unit 2455.

In this manner, when the boundary is a line boundary of blocks in which the process is sequentially performed in a raster scan order, by controlling the image range used for the filtering operation, similarly to the first embodiment, even when the memory capacity is reduced, the deblocking filtering process can be performed.

9. Third Embodiment of Deblocking Filtering Unit

A third embodiment of the deblocking filtering unit is different from the first and second embodiments in that the operations of the arithmetic processing unit 2453 and the arithmetic processing unit 2456 are different from those of the first embodiment.

FIGS. 14(A) and 14(B) are diagrams for describing the operation of the filter operation unit 245. The drawings illustrate the image data of respective pixels of two adjacent blocks BKu and BKl. Here, the filtering operation is performed using three pixels each from a boundary (line boundary) BB as a filter processing range of the vertical filtering process and four pixels each from the boundary BB as a tap. When it is determined that the filtering is to be performed in a strong filtering mode, the operations of Expressions (12) to (18) described above are performed for each column by the arithmetic processing units 2453 and 2455. Moreover, when it is determined that the filtering is to be performed in a weak filtering mode, the operations of Expressions (7) to (10) described above are performed for each column by the arithmetic processing units 2453 and 2455.

When the deblocking filtering process is performed in a raster order in respective LCU units, it is determined that the vertical filtering process is performed in a strong filtering mode, and the operations of Expressions (12) to (18) described above are performed. Thus, as illustrated in FIG. 14(A), the image data of the block BKu on the upper side of the boundary BB corresponding to four lines from the boundary BB needs to be stored in the line memory.

Here, the filter operation unit 245 controls the filter processing range and the image range used for the filtering operation in the block positioned on the upper side of the boundary BB whereby the vertical filtering process can be performed even when the memory capacity of the line memory is reduced. For example, as illustrated in FIG. 14(B), the filter processing range in the upper block BKu is set to a range of two pixels from the boundary BB, and the image data corresponding to two lines from the boundary BB is stored. Further, the vertical filtering process is performed using the stored image data similarly to the first embodiment. That is, the arithmetic processing unit 2453 illustrated in FIG. 11 performs the operations of Expressions (29) and (30). Moreover, the arithmetic processing unit 2456 illustrated in FIG. 12 performs the operations of Expressions (31) and (32), and the data selecting unit 2457 selects the image data from the arithmetic processing unit 2456 and outputs the image data. In Expressions (29) to (32), "i" indicates a column index of pixel, and when the filtering process is performed in units of blocks of 8×8 pixels, "i=0 to 7."

[Mathematical formula 9]

$$p_{1i}'=\text{Clip1}_Y((p_{1i}+p_{1i}p_{0i}+q_{0i}+2)>>2) \qquad (29)$$

$$p_{0i}'=\text{Clip1}_Y((p_{1i}+2*p_{1i}+2*p_{0i}+2*q_{0i}+q_{1i}+4)>>3) \qquad (30)$$

$$p_{1i}'=\text{Clip1}_Y((2*p_{1i}+p_{0i}+q_{0i}+2)>>2) \qquad (31)$$

$$p_{0i}'=\text{Clip1}_Y((3*p_{1i}+2*p_{0i}+2*q_{0i}+q_{1i}+4)>>3) \qquad (32)$$

The arithmetic processing unit 2453 copies the pixels in the upper block BKu on the upper end of the filter processing range in the upward direction and uses the same. That is, by using the image data p1 of the pixels at the upper end of the filter processing range stored in the data storage unit 2451 as the image data p2, the image data p1i' and p0i' after the filtering process is calculated by the operations of Expressions (29) and (30).

The arithmetic processing unit 2456 reduces the number of taps and calculates the image data p1i' and p0i' after the filtering process by the operations of Expressions (31) and (32) using the coefficients changes with the reduction in the number of taps. In this case, the coefficients are changed such that the coefficient of the image data p1 in Expression (31) is changed from "1" to "2" and the image data p1 in Expression (32) is changed from "2" to "3" so as to correspond to copying of the upper end pixels in the tap range.

When the boundary BB is not the inter-LCU line boundary, since it is not necessary to use the image data of the line memory 241, the same filtering operation as the conventional operation is performed without narrowing the image range used for the filtering operation. That is, the arithmetic processing unit 2453 illustrated in FIG. 11 performs the same filtering operation as the conventional operation. Moreover, the arithmetic processing unit 2455 illustrated in FIG. 12 performs the same filtering operation as the conventional operation and the data selecting unit 2457 selects and outputs the image data from the arithmetic processing unit 2455.

In this manner, when the boundary is a line boundary of blocks in which the process is sequentially performed in a raster scan order, by controlling the filter processing range and the image range used for the filtering operation, even when the memory capacity is reduced, the deblocking filtering process can be performed in the same manner as before the reduction. Moreover, it is possible to reduce the memory capacity much more.

10. Fourth Embodiment of Deblocking Filtering Unit

A fourth embodiment of the deblocking filtering unit is different from the first embodiment in that the operations of the arithmetic processing unit 2453 and the arithmetic processing unit 2456 are different from those of the third embodiment.

In strong filtering, when the boundary BB is the inter-LCU line boundary, and the operations of Expressions (12) to (18) described above are performed, as illustrated in FIG. 14(A), the image data of the block BKu on the upper side of the boundary BB corresponding to four lines from the boundary BB needs to be stored in the line memory.

Here, the filter operation unit 245 controls the filter processing range and the image range used for the filtering operation in the block positioned on the upper side of the boundary BB whereby the vertical filtering process can be performed even when the memory capacity of the line memory is reduced. For example, as illustrated in FIG. 14(B), the filter processing range in the upper block BKu is set to a range of two pixels from the boundary BB, and the image data corresponding to two lines from the boundary BB is stored. Further, the vertical filtering process is performed using the stored image data similarly to the second embodiment. That is, the arithmetic processing unit 2453 illustrated in FIG. 11 performs the operations of Expressions (33) and (34). Moreover, the arithmetic processing unit 2456 illustrated in FIG. 12 performs the operations of Expressions (35) and (36), and the data selecting unit 2457 selects the image data from the arithmetic processing unit 2456 and outputs the image data. In Expressions (33) to (36), "i" indicates a column index of pixel, and when the filtering process is performed in units of blocks of 8×8 pixels, "i=0 to 7."

[Mathematical formula 10]

$$p_{1i}'=\text{Clip1}_Y((p_{0i}+p_{1i}+p_{0i}+q_{0i}+2)>>2) \quad (33)$$

$$p_{0i}'=\text{Clip1}_Y((p_{0i}+2*p_{1i}+2*p_{0i}+2*q_{0i}+q_{1i}+4)>>3) \quad (34)$$

$$p_{1i}'=\text{Clip1}_Y((p_{1i}+2*p_{0i}+q_{0i}+2)>>2) \quad (35)$$

$$p_{0i}'=\text{Clip1}_Y((2*p_{1i}+3*p_{0i}+2*q_{0i}+q_{1i}+4)>>3) \quad (36)$$

The arithmetic processing unit 2453 performs mirror copying about the pixels in the upper block BKu on the upper end of the filter processing range. That is, by storing the image data p0 in the data storage unit 2451, mirror-copying the image data p0 about the upper end pixels in the filter processing range to use the image data p0 as the image data p2, the image data p1i' and p0i' after the filtering process is calculated by the operations of Expressions (33) and (34).

The arithmetic processing unit 2456 reduces the number of taps and calculates the image data p1i' and p0i' after the filtering process by the operations of Expressions (35) and (36) using the coefficients changes with the reduction in the number of taps. In this case, the coefficients are changed such that the coefficient of the image data p0 in Expression (35) is changed from "1" to "2" and the image data p0 in Expression (36) is changed from "2" to "3" so as to correspond to mirror-copying about the upper end pixels in the filter processing range.

When the boundary BB is not the inter-LCU line boundary, since it is not necessary to use the image data of the line memory 241, the same filtering operation as the conventional operation is performed without narrowing the image range used for the filtering operation. That is, the arithmetic processing unit 2453 illustrated in FIG. 11 performs the same filtering operation as the conventional operation. Moreover, the arithmetic processing unit 2455 illustrated in FIG. 12 performs the same filtering operation as the conventional operation and the data selecting unit 2457 selects and outputs the image data from the arithmetic processing unit 2455.

In this manner, when the boundary is a line boundary of blocks in which the process is sequentially performed in a raster scan order, by controlling the filter processing range and the image range used for the filtering operation, even when the memory capacity is reduced, the deblocking filtering process can be performed in the same manner as before the reduction. Moreover, it is possible to reduce the memory capacity much more.

11. Fifth Embodiment of Deblocking Filtering Unit

The deblocking filtering unit described above controls the image range used for the filtering operation in a block positioned on the upper side of a boundary and controls the filter processing range depending on whether the boundary BB is an inter-LCU line boundary. Next, in a fifth embodiment, a case where a mode where the image range is controlled when the boundary BB is the inter-LCU line boundary and a mode where the image range is controlled regardless of whether the boundary BB is the inter-LCU line boundary are provided will be described.

Figure 15:
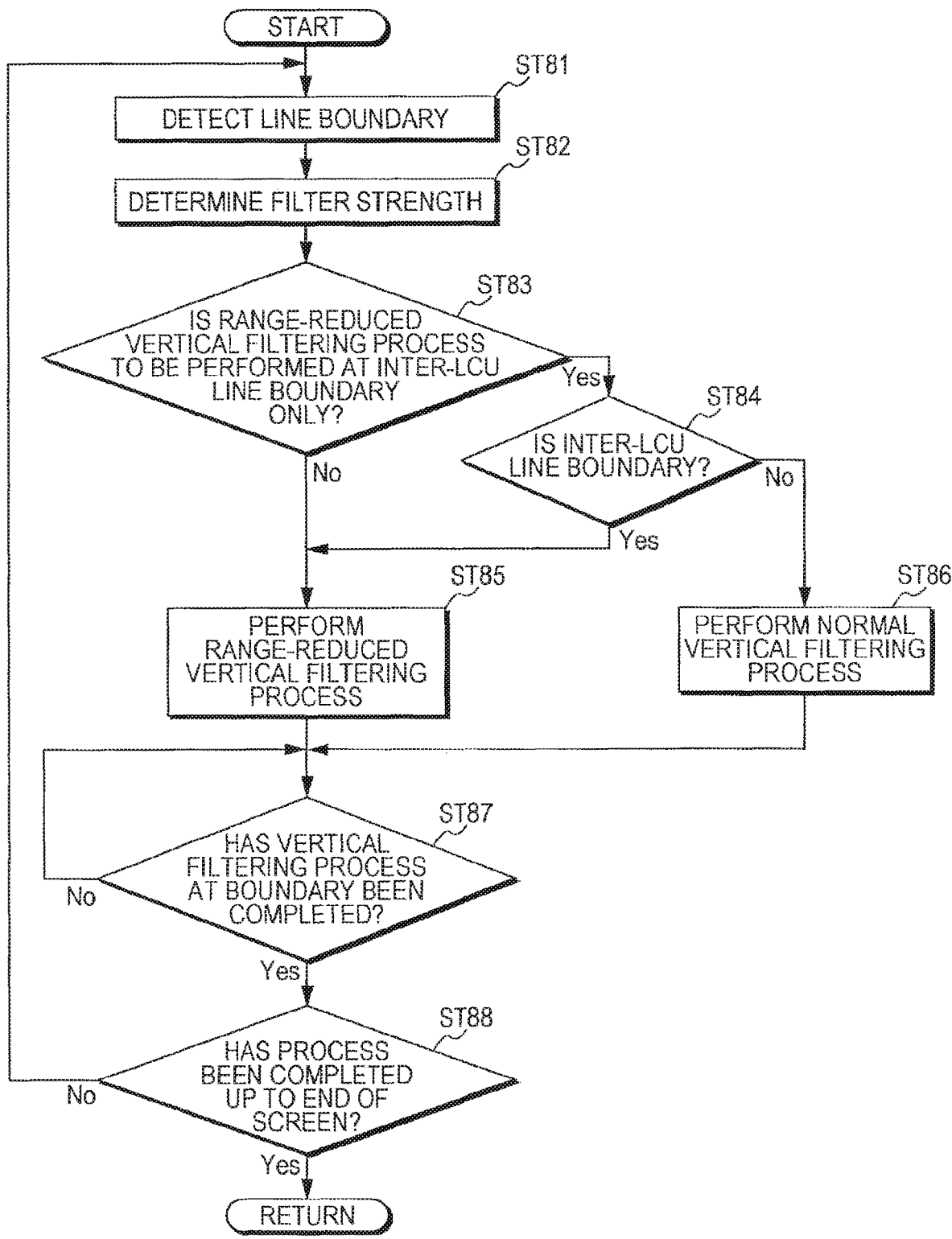
FIG. 15 is a flowchart illustrating the operation of a fifth embodiment.

FIG. 15 is a flowchart illustrating the operation of the fifth embodiment. In step ST81, the deblocking filtering unit 24 detects a line boundary. The deblocking filtering unit 24 detects a line boundary in which the vertical filtering process is performed.

In step ST82, the deblocking filtering unit 24 determines a filter strength. The deblocking filtering unit 24 determines whether a strong filtering mode or a weak filtering mode will be used for the line boundary in which the vertical filtering process is performed.

In step ST83, the deblocking filtering unit 24 determines whether a range-reduced vertical filtering process is to be performed with respect to the inter-LCU line boundary only (that is, whether a vertical filtering process is to be performed by reducing the image range used for the filtering operation). When it is determined that the range-reduced vertical filtering process is to be performed with respect to the line boundary of blocks smaller than the size of LCU as well as the inter-LCU line boundary, the deblocking filtering unit 24 proceeds to step ST84. Moreover, when it is determined that the range-reduced vertical filtering process is to be performed with respect to the inter-LCU line boundary only, the deblocking filtering unit 24 proceeds to step ST85.

The deblocking filtering unit 24 determines whether the range-reduced vertical filtering process is to be performed with respect to the inter-LCU line boundary only based on the quantization parameters set in units of frames, for example. When the quantization parameter is small, better image quality is obtained as compared to when the quantization parameter is large. Thus, when the quantization parameter is larger than a predetermined threshold value, the deblocking filtering unit 24 determines that the vertical filtering process is to be performed in a mode where image quality is improved by performing the range-reduced vertical filtering process with respect to the inter-LCU line boundary only and performing a normal vertical filtering process with respect to a line boundary of blocks smaller than the size of LCU, and proceeds to step ST84. Moreover, when the quantization parameter is equal to or smaller than the predetermined threshold value, the deblocking filtering unit 24 determines that the vertical filtering process is to be performed in a mode where control is made easy by performing the range-reduced vertical filtering process with respect to the line boundary between blocks smaller than the size of LCU as well as the inter-LCU line boundary, and proceeds to step ST85.

In step ST84, the deblocking filtering unit 24 determines whether a boundary in which the vertical filtering process is performed is an inter-LCU line boundary. The deblocking filtering unit 24 proceeds to step ST85 when the boundary in which the vertical filtering process is performed is the inter-LCU line boundary and proceeds to step ST86 when the boundary is a line boundary of blocks smaller than the size of LCU.

In step ST85, the deblocking filtering unit 24 performs a range-reduced vertical filtering process. The deblocking filtering unit 24 performs the vertical filtering process while reducing the image range used for the filtering operation of the upper adjacent LCU and proceeds to step ST87. In the range-reduced vertical filtering process, the filtering range may be reduced.

In step ST86, the deblocking filtering unit 24 performs a normal vertical filtering process. The deblocking filtering unit 24 performs the vertical filtering process without reducing the image range used for the filtering operation and proceeds to step ST87.

In step ST87, the deblocking filtering unit 24 determines whether the vertical filtering process at the boundary has been completed. When the vertical filtering process for the respective columns of the boundary has not been completed, the deblocking filtering unit 24 returns to step ST87 and performs the process for the next column. Moreover, when the vertical filtering process for the respective columns of the boundary has been completed, the flow proceeds to step ST88.

In step ST88, the deblocking filtering unit 24 determines whether the process has been completed up to the end of the screen. When the process has not been completed up to the end of the screen, the deblocking filtering unit 24 returns to step ST81, detects a new boundary and performs the vertical filtering process. When the process has been completed up to the end of the screen, the deblocking filtering unit 24 ends the process for one screen.

When such a process is performed, it is possible to reduce the memory capacity of the line memory. When the range-reduced vertical filtering process is performed with respect to other line boundaries as well as the inter-LCU line boundary, switching of filtering processes is not required and control is made easy. Moreover, when the range-reduced vertical filtering process is performed with respect to the inter-LCU line boundary only, better image quality can be obtained.

12. Description of Sixth to Eighth Embodiments

[Description of Conventional Technique]

In the above description, an example in which the image data of a tap in the image range is copied or mirror-copied and used as image data of the tap that is outside the image range due to the narrowing of the image range used for the filtering operation has been described. Here, in the present specification, copying is synonymous with padding.

As in the present technique, a method of performing a filtering process using padding in the line boundary of LCUs only has been proposed in JCTVC-F053.

Figures 16, 17:
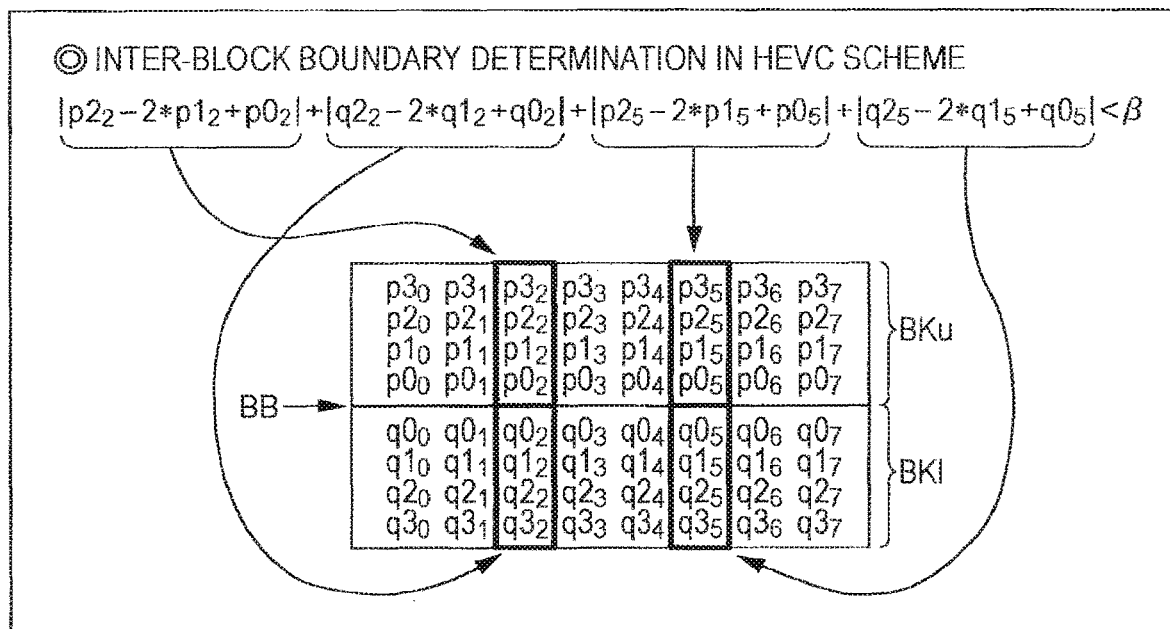
FIG. 16 is a diagram for describing a conventional deblocking filtering process.
FIG. 17 is a diagram for describing the present technique (sixth embodiment).

Referring to FIG. 16, a filtering process of a strong filter and a filtering process using padding for luminance signals in the HEVC scheme will be described.

FIG. 16 is an explanatory diagram illustrating an example of pixels in two blocks BKu and BKl that are adjacent vertically with a line boundary interposed. In the example of FIG. 16, image data of pixels in the block BKu is represented by symbol "$pj_i$." Here, "j" is a row index of pixel and "i" is column index of pixel. Moreover, a smallest unit of the encoding process is a block of 8×8 pixels, and row indexes "j" of 0, 1, 2, and 3 are assigned sequentially (from top to bottom) from the row close to the line boundary BB. Column indexes "i" of 0, 1, 2, . . . , and 7 are assigned from left to right of the block. The upper half of the block BKu is omitted in the drawing. On the other hand, image data of pixels in the block BKl is represented by symbol "$qk_i$." Here, "k" is a row index of pixel and "i" is a column index of pixel. The row indexes "k" of 0, 1, 2, and 3 are assigned sequentially (from top to bottom) from the row close to the line boundary BB. The lower half of the block BKl is also omitted in the drawing.

In the strong filtering of the luminance signal in the HEVC scheme, the luminance components of the respective pixels in the filter processing range are calculated by performing the operations of Expressions (37) to (42). Expressions (37) to (42) correspond to Expressions (14), (16), (13), (17), (12), and (18), respectively.

[Mathematical formula 11]

$$p0_i = \text{Clip}_{0\text{-}255}((p2_i+2*p1_i+2*p0_i+2*q0_i+q1_i+4)>>3); \quad i=0,7 \quad (37)$$

$$q0_i = \text{Clip}_{0\text{-}255}((p1_i+2*p0_i+2*q0_i+2*q1_i+q2_i+4)>>3); \quad i=0,7 \quad (38)$$

$$p1_i = \text{Clip}_{0\text{-}255}((p2_i+p1_i+p0_i+q0_i+2)>>2); i=0,7 \quad (39)$$

$$q1_i = \text{Clip}_{0\text{-}255}((p0_i+q0_i+q1_i+q2_i+2)>>2); i=0,7 \quad (40)$$

$$p2_i = \text{Clip}_{0\text{-}255}((2*p3_i+3*p2_i+p1_i+p0_i+q0_i+4)>>3); i=0,7 \quad (41)$$

$$q2_i = \text{Clip}_{0\text{-}255}((p0_i+q0_i+q1_i+3*q2_i+2*q3_i+4)>>3); i=0,7 \quad (42)$$

Here, "$\text{Clip}_{0\text{-}255}$" indicates a clipping process of rounding a value up to "O" when the value is "0" or smaller and rounding a value down to "255" when the value is "255" or larger. The same is applied to the following expressions.

In contrast, in the conventional proposal described above, the filtering process is performed using padding with R2W2 reduction although the filtering process is performed at the line boundary of LCUs only. Here, R2W2 represents that filtering process is applied to two pixels on the inter-LCU line boundary by referring to two pixels on the inter-LCU line boundary.

In the strong filtering of luminance signals in the conventional proposal, the luminance components of the respective pixels in the filter processing range are calculated by performing the operations of Expressions (43) to (47).

[Mathematical formula 12]

$$p0_i = \text{Clip}_{0\text{-}255}((p1_i + *p1_i + 2*p0_i + 2*q0_i + q1_i + 4) >> 3); \quad i=0,7 \quad (43)$$

$$q0_i = \text{Clip}_{0\text{-}255}((p1_i + 2*p0_i + 2*q0_i + 2*q1_i + q2_i + 4) >> 3); \quad i=0,7 \quad (44)$$

$$p1_i = \text{Clip}_{0\text{-}255}((p1_i + p1_i + p0_i + q0_i + 2) >> 2); i=0,7 \quad (45)$$

$$q1_i = \text{Clip}_{0\text{-}255}((p0_i + q0_i + q1_i + q2_i + 2) >> 2); i=0,7 \quad (46)$$

$$q2_i = \text{Clip}_{0\text{-}255}((p0_i + q0_i + q1_i + 3*q2_i + 2*q3_i + 4) >> 3); \quad i=0,7 \quad (47)$$

Here, Expression (43) of the strong filtering in the conventional proposal is different in that "$p2_i$" in Expression (37) of the strong filtering of the HEVC scheme is changed to "$p1_i$." Expression (45) of the strong filtering in the conventional proposal is different in that "$p2_i$" in Expression (39) of the strong filtering of the HEVC scheme is changed to "$p1_i$." The strong filtering in the conventional proposal is different in that an expression corresponding to Expression (41) of the strong filtering of the HEVC scheme is deleted.

Expressions (44), (46), and (47) of the strong filtering in the conventional proposal are the same as Expressions (38), (40), and (42), respectively, of the strong filtering of the HEVC scheme.

That is, in the conventional proposal, since the pixel "$p2_i$" on the third row from the line boundary BB of the block Bku is not referred to, the pixel "$p1_i$" on a row immediately below the third row of the same column is padded and used instead.

Moreover, the filtering process is not applied to the pixel "$p2_0$" on the third row from the line boundary BB of the block Bku. Therefore, in the strong filtering of the conventional proposal, an expression corresponding to Expression (41) of the strong filtering of the HEVC scheme is deleted.

By doing so, in the conventional proposal, the memory capacity of the line memory is suppressed from becoming larger than that of the HEVC scheme.

However, in the case of 4 k images, since it is necessary to have a large line memory, it is requested to further reduce the line memory in the deblocking process. Moreover, in reducing the line memory, it is requested to maintain a better block noise reduction function of the deblocking process than the method of the conventional proposal.

Here, in inter-block boundary determination in the HEVC scheme, as indicated by Expression (48) below, a waveform having a constant inclination on both sides of a line boundary is subjected to the process. Therefore, in the present technique, the deblocking process at the inter-LCU line boundary is performed using the inclination of the waveform used in the inter-block boundary determination, which will be described in detail below.

[Mathematical formula 13]

$$|p2_2 - 2*p1_2 + p0_2| + |q2_2 - 2*q1_2 + q0_2| + |p2_5 - 2*p1_5 + p0_5| + |q2_5 - 2*q1_5 + q0_5| < \beta \quad (48)$$

[Description of Present Technique (Linear Approximation)]

In the example of FIG. 17, an inter-block boundary determination expression used in the HEVC scheme, of Expression (48) is illustrated.

As illustrated in FIG. 17, the first term on the left side of Expression (48) is an expression for determining a pixel on the third column from the left side of the block Bku and can be expressed by a difference of differences (second-order difference) (that is, a second-order differential having a constant inclination.

$$p2_2 - 2*p1_2 + p0_2 = (p2_2 - p1_2) - (p1_2 - p0_2)$$

The second to fourth terms on the left side of Expression (48) are an expression for determining a pixel on the sixth column from the left side of the block Bku, an expression for determining a pixel on the third column from the left side of the block Bkl, and an expression for determining a pixel on the sixth column from the left side of the block Bkl, respectively. The same can be said for the second to fourth terms on the left side of Expression (48).

As above, in the inter-block boundary determination in the HEVC scheme, since the waveform having a constant inclination is subjected to the process, the deblocking process at the inter-LCU line boundary uses the inclination of the waveform used in the inter-block boundary determination.

In the conventional technique, as for pixels that could not be referred to, the deblocking process at the inter-LCU line boundary uses padding. In contrast, in the present technique, as for pixels that could not be referred to, the deblocking process at the inter-LCU line boundary performs linear approximation using the inclination of the waveform.

That is, in the deblocking process at the inter-LCU line boundary in the present technique, Expression (49) below of linear approximation is used.

[Mathematical formula 14]

$$p2_i = p1_i + (p2_i - p1_i) \approx p1_i + (p1_i - p0_i) = 2*p1_i - p0_i \quad (49)$$

As illustrated in FIG. 18, when the pixel values of $p2_i$, $p1_i$, and $p0_i$ have an inclination, the pixel value of $p2_i$ could not be referred to in the conventional R2W2-based padding. Thus, although the pixel value of $p1_i$ immediately below the pixel $p2_i$ is padded and used instead of the pixel value of $p2_i$ as indicated by the hatched circle, since the actual pixel value of $p2_i$ is at the position of the dot circle, an error occurs.

In contrast, in the R2W2-based linear prediction of the present technique, since the pixel value of $p2_i$ could not be referred to, a pixel value (=the same pixel value as the actual pixel value) predicted by linear prediction from the inclination based on the pixel values of $p1_i$ and $p0_i$ is used as the pixel value of $p2_i$ as indicated by the hatched circle.

By doing so, when pixel values have an inclination, the present technique does not incur more errors than the conventional padding method. Thus, although the R2W2-based technique is used, it is possible to reduce the line memory while maintaining the block noise reduction function of the deblocking process.

Moreover, for example, one line of image of 4K×2K corresponds to two lines of image of 2K×1K. Further, in the H.264/AVC scheme, a line memory corresponding to four lines is included, and the memory capacity corresponding to one line of image of 4K×2K corresponds to 50% of the memory capacity of the H.264/AVC scheme. Thus, the effect of reducing the memory capacity in a high-resolution image is improved.

When the pixel values of $p2_i$, $p1_i$, and $p0_i$ do not have an inclination, substantially the same result is obtained as when the pixel value of $p1_i$ immediately below the pixel $p2_i$ is used. In this case, although the R2W2-based technique is used, it is possible to reduce the line memory while maintaining the block noise reduction function of the deblocking process.

[Filtering Process for R2W2 Case]

Next, the filtering process of luminance signals for the R2W2 case will be described. Here, R2 represents the number of pixels referred to and W2 represents the number of pixels to which the filtering process is applied. That is, R2W2 represents that the filtering process is applied to two pixels on the inter-LCU line boundary by referring to two pixels on the inter-LCU line boundary as illustrated in FIG. 19.

In the example of FIG. 19, it is illustrated that pixels on the third and fourth columns from the line boundary BB in the block BKu in FIG. 16 could not be referred to.

As illustrated again for comparison, in the strong filtering of the luminance signal in the HEVC scheme, the luminance components of the respective pixels in the filter processing range are calculated by performing the operations of Expressions (50) to (55). Expressions (50) to (55) correspond to Expressions (37) to (42), respectively.

[Mathematical formula 15]

$$p0_i = \text{Clip}_{0-255}((p2_i + 2 \cdot p1_i + 2 \cdot p0_i + 2 \cdot q0_i + q1_i + 4) >> 3); \quad i=0,7 \tag{50}$$

$$q0_i = \text{Clip}_{0-255}((p1_i + 2 \cdot p0_i + 2 \cdot q0_i + 2 \cdot q1_i + q2_i + 4) >> 3); \quad i=0,7 \tag{51}$$

$$p1_i = \text{Clip}_{0-255}((p2_i + p1_i + p0_i + q0_i + 2) >> 2); i=0,7 \tag{52}$$

$$q1_i = \text{Clip}_{0-255}((p0_i + q0_i + q1_i + q2_i + 2) >> 2); i=0,7 \tag{53}$$

$$p2_i = \text{Clip}_{0-255}((2 \cdot p3_i + 3 \cdot p2_i + p1_i + p0_i + q0_i + 4) >> 3); \quad i=0,7 \tag{54}$$

$$q2_i = \text{Clip}_{0-255}((p0_i + q0_i + q1_i + 3 \cdot q2_i + 2 \cdot q3_i + 4) >> 3); \quad i=0,7 \tag{55}$$

In contrast, in the strong filtering of the luminance signal in the R2W2 case of the present technique, the luminance components of the respective pixels in the filter processing range are calculated by performing the operations of Expressions (56) to (60).

[Mathematical formula 16]

$$p0_i = \text{Clip}_{0-255}((4 \cdot p1_i + p0_i + 2 \cdot q0_i + q1_i + 4) >> 3); i=0,7 \tag{56}$$

$$q0_i = \text{Clip}_{0-255}((p1_i + 2 \cdot p0_i + 2 \cdot q0_i + 2 \cdot q1_i + q2_i + 4) >> 3); \quad i=0,7 \tag{57}$$

$$p1_i = \text{Clip}_{0-255}((3 \cdot p1_i + q0_i + 2) >> 2); i=0,7 \tag{58}$$

$$q1_i = \text{Clip}_{0-255}((p0_i + q0_i + q1_i + q2_i + 2) >> 2); i=0,7 \tag{59}$$

$$q2_i = \text{Clip}_{0-255}((p0_i + q1_i + 3 \cdot q2_i + 2 \cdot q3_i + 4) >> 3); i=0,7 \tag{60}$$

Here, Expression (56) of the strong filtering of the R2W2 case is different in that "$p2_i + 2 \cdot p1_i + 2 \cdot p0_i$" in Expression (50) of the strong filtering of the HEVC scheme is changed to "$4 \cdot p1_i + p0_i$" according to Expression (49) of linear approximation.

Expression (58) of the strong filtering of the R2W2 case is different in that "$p2_i + 2 \cdot p1_i + p0_i$" in Expression (52) of the strong filtering of the HEVC scheme is changed to "$3 \cdot p1_i$" according to Expression (49) of linear approximation.

The strong filtering of the R2W2 case is different in that an expression corresponding to Expression (54) of the strong filtering of the HEVC scheme is deleted.

That is, in the R2W2 case of the present technique, since the pixel "$p2_i$" on the third row from the line boundary BB of the block Bku is not referred to, Expression (49) of linear approximation is substituted and used instead.

Moreover, the filtering process is not applied to the pixel "$p2_0$" on the third row from the line boundary BB of the block Bku. Therefore, in the strong filtering of the R2W2 case, an expression corresponding to Expression (54) of the strong filtering of the HEVC scheme is deleted.

Next, a weak filtering determination expression for luminance signals at a line boundary and weak filtering will be described.

First, in the weak filtering determination expression for luminance signals in the HEVC scheme and the weak filtering, the luminance components of the respective pixels in the filter processing range are calculated by performing the operations of Expressions (61) to (63). The first terms of Expressions (61) to (63) are weak filtering determination expressions.

[Mathematical formula 17]

$$\text{if}(\text{abs}(\text{delta}) < \text{iThrCut}), \text{delta} = (9 \cdot (q0_i - p0_i) - 3 \cdot (q1_i - p1_i))$$

$$p0_i = \text{Clip}_{0-255}(p0_i + \text{Clip}_{(-tc)-tc}(\text{delta})); i=0,7$$

$$q0_i = \text{Clip}_{0-255}(q0_i - \text{Clip}_{(-tc)-tc}(\text{delta})); i=0,7 \tag{61}$$

$$\text{if}(\text{abs}((p2_2 - 2 \cdot p1_2 + p0_2) + \text{abs}(p2_5 - 2 \cdot p1_5 + p0_5) < \text{iSideThreshold}))$$

$$p1_i = \text{Clip}_{0-255}(p1_i + \text{Clip}_{(-tc2)-tc2}((((p2_i + p0_i + 1) >> 1) - p1_i + \text{delta}) >> 1)); i=0,7 \tag{62}$$

$$\text{if}(\text{abs}((q2_2 - 2 \cdot q1_2 + q0_2) + \text{abs}(q2_5 - 2 \cdot q1_5 + q0_5) < \text{iSideThreshold}))$$

$$q1_i = \text{Clip}_{0-255}(q1_i + \text{Clip}_{(-tc2)-tc2}((((q2_i + q0_i + 1) >> 1) - q1_i + \text{delta}) >> 1)); i=0,7 \tag{63}$$

Here, as described above, "$\text{Clip}_{0-255}$" indicates a clipping process of rounding a value up to "0" when the value is "0" or smaller and rounding a value down to "255" when the value is "255" or larger. Moreover, $\text{Clip}_{(-tc)-tc}$ indicates a clipping process of rounding a value up to "-tc" when the value is "-tc" or smaller and rounding a value down to "tc" when the value is "tc" or larger. The "tc2" clipping is the same. The same is applied to the following expressions. Here, "tc" is a value set based on the parameter Q as indicated in Table 1.

In contrast, in the weak filtering determination expression for luminance signals in the R2W2 case and the weak filtering, the luminance components of the respective pixels in the filter processing range are calculated by performing the operations of Expressions (64) to (66). The first terms of Expressions (64) to (66) are weak filtering determination expressions.

[Mathematical formula 18]

$$\text{if}(\text{abs}(\text{delta}) < \text{iThrCut}), \text{delta} = (9 \cdot (q0_i - p0) - 3 \cdot (q1_i - p1_i))$$

$$p0_i = \text{Clip}_{0-255}(p0_i + \text{Clip}_{(-tc)-tc}(\text{delta})); i=0,7$$

$$q0_i = \text{Clip}_{0-255}(q0_i + \text{Clip}_{(-tc)-tc}(\text{delta})); i=0,7 \tag{64}$$

$$\text{if}(\text{abs}(0 - (p1_2 - p0_2)) + \text{abs}(0 - (p1_5 - p0_5)) < \text{iSideThreshold}))$$

$$p1_i=\text{Clip}_{0-255}(p1_i+\text{Clip}_{(-tc)-tc}((((p1_i+p1_i+1)>>1)-p1_i+\text{delta})>>1));i=0,7 \quad (65)$$

if(abs($(q2_2-2*q1_2+q0_2)$)+abs($(q2_5-2*q1_5+q0_5)$)<iSideThreshold))

$$q1_i=\text{Clip}_{0-255}(q1_i+\text{Clip}_{(-tc)-tc}((((q2_i+q0_i+1)>>1)-q1_i+\text{delta})>>1));i=0,7 \quad (66)$$

Here, an expression within the tc2 clipping of the second term which is a weak filtering expression within Expression (65) of the R2W2 case is different from an expression within the tc2 clipping of the second term in Expression (62) of the HEVC scheme according to Expression (49) of linear approximation. That is, the expression "$((((p2_i+p0_i+1)>>1)-p1_i+\text{delta})>>1)$" within the tc2 clipping of the second term of the HEVC scheme is changed to the expression "$((((p1_i+p1_i+1)>>1)-p1_i+\text{delta})>>1)$" within the tc2 clipping of the second term.

Moreover, an expression within the if clause of the first term which is a weak filtering determination expression within Expression (65) of the R2W2 case is different from an expression within the if clause of the first term in Expression (62) of the HEVC scheme. That is, the expression "abs($p2_2-2*p1_2+p0_2$)+abs($p2_5-2*p1_5+p0_5$)" within the if clause of the first term of the HEVC scheme is changed to the expression "abs($0-(p1_2-p0_2)$)+abs($0-(p1_5-p0_5)$)" within the if clause of the first term.

That is, in the first term of Expression (65), a pixel immediately below a current pixel is padded as indicated in Expression (67) below rather than linearly approximating the same. In other words, "0" in the expression "abs($0-(p1_2-p0_2)$)" represents "$0=p2_2-p1_2$" and "0" in the expression "abs($0-(p1_5-p0_5)$)" represents "$0=p2_5-p1_5$"

[Mathematical formula 19]

$$p2_i = p1_i \quad (67)$$

This is because as for inclination determination in the filtering determination expression, the use of linear approximation allows to ignore determination which actually cannot be ignored. Thus, in the inclination determination of the weak filtering determination expression, a pixel immediately below a current pixel is padded as indicated in Expression (67). The same can be said for the strong filtering determination expression and the inter-block boundary determination expression described below.

Next, an inter-block boundary determination expression and a strong filtering determination expression for luminance signals at a line boundary will be described.

First, an inter-block boundary determination expression for luminance signals in the HEVC scheme is expressed by Expression (68) below and a strong filtering determination expression is expressed by Expression (69) below.

[Mathematical formula 20]

if(abs($(p2_2-2*p1_2+p0_2)$)+abs($(p2_5-2*p1_5+p0_5)$)+abs($(q2_2-2*q1_2+q0_2)$)+abs($(q2_5-2*q1_5+q0_5)$)<β) (68)

[Mathematical formula 21]

$d<(β>>2),d=\text{abs}((p2_2-2*p1_2+p0_2))+\text{abs}(p2_5-2*p1_5+p0_5)+\text{abs}((q2_2-2*q1_2+q0_2))+\text{abs}(q2_5-2*q1_5+q0_5)$ and(|$p3_i-p0_i$|+|$q0_i-q3_i$|)<(β>>3)

and |$p0_i-q0_i$|<((5*$t_c$+1)>>1) (69)

In contrast, an inter-block boundary determination expression in the R2W2 case of the present technique is expressed by Expression (70) below and a strong filtering determination expression is expressed by Expression (71) below.

[Mathematical formula 22]

if(abs($0-(p1_2-p0_2)$)+abs($0-(p1_5-p0_5)$)+abs($(q2_2-2*q1_2+q0_2)$)+abs($(q2_5-2*q1_5+q0_5)$)<β) (70)

[Mathematical formula 23]

$d<(β>>2),d=\text{abs}(0-(p1_2-p0_2))+\text{abs}(0-(p1_5-p0_5))+\text{abs}((q2_2-2*q1_2+q0_2))+\text{abs}(q2_5-2*q1_5+q0_5)$ and (|$p1_i-p0_i$|<<1+|$q0_i-q3_i$|)<(β>>3)

and |$p0_i-q0_i$|<((5*$t_c$+1)>>1) (71)

The first and second terms in the if clause of Expression (70) for inter-block boundary determination of the R2W2 case are different from the first and second terms in the if clause of Expression (68) for inter-block boundary determination of the HEVC scheme according to Expression (67) for padding. That is, the first and second terms "abs($p2_2-2*p1_2+p0_2$)+abs($p2_5-2*p1_5+p0_5$)" in the if clause of the HEVC scheme are changed to the first and second terms "abs($0-(p1_2-p0_2)$)+abs($0-(p1_5-p0_5)$)" in the if clause.

Moreover, an expression in the absolute value on the first row of Expression (71) for strong filtering determination of the R2W2 case is different from an expression in the absolute value on the first row of Expression (69) for strong filtering determination in the HEVC scheme according to Expression (67) for padding. That is, the expression "abs($p2_2-2*p1_2+p0_2$)+abs($p2_5-2*p1_5+p0_5$)" in the absolute value on the first row of Expression (69) is changed to the expression "abs($0-(p1_2-p0_2)$)+abs($0-(p1_5-p0_5)$)" in the absolute value on the first row of Expression (71).

Further, an expression appearing after the first "and" of Expression (71) for the strong filtering determination of the R2W2 case is different from an expression appearing after the first "and" of Expression (69) for the strong filtering determination in the HEVC scheme. That is, the expression "(|$p3_i-p0_i$|<<1+|$q0_i-q3_i$|)<(β>>3))" appearing after the first "and" of Expression (69) is changed to the expression "(|$p1_i-p0_i$|<<1+|$q0_i-q3_i$|)<(β>>3))" appearing after the first "and" of Expression (71).

Since the determination of this part is determination of the magnitudes of pixel values, Expression (49) for linear approximation and Expression (67) for padding are used. That is, the expression appearing after the first "and" of Expression (71) is generated in such a manner that "$p3_i$" in the expression appearing after the first "and" of Expression (69) is first approximated as "$p2_i$" by padding and "$p2_i$" is approximated as "$2*p1_i-p0_i$" by linear approximation.

[Filtering Process for R2W1 Case]

Next, the filtering process of luminance signals for the R2W1 case will be described. Here, R2 represents the number of pixels referred to and W1 represents the number of pixels to which the filtering process is applied. That is, R2W1 represents that the filtering process is applied to one pixel on the inter-LCU line boundary by referring to two pixels on the inter-LCU line boundary as illustrated in FIG. 19.

In the strong filtering of the luminance signal in the R2W1 case of the present technique, the luminance components of the respective pixels in the filter processing range are calculated by performing the operations of Expressions (72) to (75).

[Mathematical formula 24]

$$p0_i=\text{Clip}_{0\text{-}255}((4*p1_i+p0_i+2*q0_i+q1_i+4)>>3); i=0,7 \quad (72)$$

$$q0_i=\text{Clip}_{0\text{-}255}((p1_i+2*p0_i+2*q0_i+2*q1_i+q2_i+4)>>3); \\ i=0,7 \quad (73)$$

$$q1_i=\text{Clip}_{0\text{-}255}((p0_i+q0_i+q1_i+q2_i+2)>>2); i=0,7 \quad (74)$$

$$q2_i=\text{Clip}_{0\text{-}255}((p0_i+q0_i+q1_i+3*q2_i+2*q3_i+4)>>3); \\ i=0,7 \quad (75)$$

Here, Expression (72) of the strong filtering of the R2W1 case is different in that "$p2_i+2*p1_i+2*p0_i$" in Expression (50) of the strong filtering of the HEVC scheme is changed to "$4*p1_i+p0_i$" according to Expression (49) of linear approximation.

The strong filtering of the R2W1 case is different in that expressions corresponding to Expressions (52) and (54) of the strong filtering of the HEVC scheme are deleted.

That is, in the present technique, since the pixel "$p2_i$" on the third row from the line boundary BB of the block Bku is not referred to, Expression (49) of linear approximation is substituted and used instead.

Moreover, the filtering process is not applied to the pixels "$p1_0$" and "$p2_0$" on the second and third rows from the line boundary BB of the block Bku. Therefore, in the strong filtering of the R2W1 case, expressions corresponding to Expressions (52) and (54) of the strong filtering of the HEVC scheme is deleted.

Next, a weak filtering determination expression for luminance signals at a line boundary and weak filtering will be described.

In the weak filtering determination expression for luminance signals in the R2W1 case and the weak filtering, the luminance components of the respective pixels in the filter processing range are calculated by performing the operations of Expressions (76) and (77).

[Mathematical formula 25]

$$\text{if}(\text{abs}(\text{delta})<\text{iThrCut}), \text{delta}=(9*(q0_i-p0_i)-3*(q1_i-p1_i))$$

$$p0_i=\text{Clip}_{0\text{-}255}(p0_i+\text{Clip}_{(-tc)\text{-}tc}(\text{delta})); i=0,7$$

$$q0_i=\text{Clip}_{0\text{-}255}(q0_i-\text{Clip}_{(-tc)\text{-}tc}(\text{delta})); i=0,7 \quad (76)$$

$$\text{if}(\text{abs}((q2_2-2*q1_2+q0_2)+\text{abs}(q2_5-2*q1_5+q0_5)<\text{iSideThreshold}))$$

$$q1_i=\text{Clip}_{0\text{-}255}(q1_i+\text{Clip}_{(-tc)\text{-}tc}((((q2_i+q0_i+1)>>1)-q1_i-\text{delta})>>1)); i=0,7 \quad (77)$$

Here, in the R2W1 case, the filtering process is not applied to the pixel "$p1_0$" on the second row from the line boundary BB of the block Bku. Therefore, in the weak filtering determination expression for the R2W1 case and the weak filtering, an expression corresponding to Expression (62) of the HEVC scheme is deleted.

Next, an inter-block boundary determination expression and a strong filtering determination expression for luminance signals at a line boundary will be described.

An inter-block boundary determination expression in the R2W1 case is expressed by Expression (78) below and a strong filtering determination expression is expressed by Expression (79) below.

[Mathematical formula 26]

$$\text{if}(\text{abs}(0-(p1_2-p0_2))+\text{abs}(0-(p1_5-p0_5))+\text{abs}((q2_2-2*q1_2+q0_2)+\text{abs}(q2_5-2*q1_5+q_5)<\beta) \quad (78)$$

[Mathematical formula 27]

$$d<(\beta>>2), d=\text{abs}(0-(p1_2-p0_2))+\text{abs}(0-(p1_5-p0_5))+\text{abs} \\ ((q2_2-2*q1_2+q0_2)+\text{abs}(q2_5-2*q1_5+q0_5)$$

$$\text{and}(|p1_i-p0_i|<<1|+q0_i-q3_i|)<(\beta>>3)$$

$$\text{and } |p0_i-q0_i|<((5*t_c+1)>>1) \quad (79)$$

The first and second terms in the if clause of Expression (78) for inter-block boundary determination of the R2W1 case are different from the first and second terms in the if clause of Expression (68) for inter-block boundary determination of the HEVC scheme according to Expression (67) for padding. That is, the first and second terms "$\text{abs}(p2_2-2*p1_2+p0_2)+\text{abs}(p2_5-2*p1_5+p0_5)$" in the if clause of the HEVC scheme are changed to the first and second terms "$\text{abs}(0-(p1_2-p0_2))+\text{abs}(0-(p1_5-p0_5))$" in the if clause.

Moreover, an expression in the absolute value on the first row of Expression (79) for strong filtering determination of the R2W1 case is different from an expression in the absolute value on the first row of Expression (69) for strong filtering determination in the HEVC scheme according to Expression (67) for padding. That is, the expression "$\text{abs}(p2_2-2*p1_2+p0_2)+\text{abs}(p2_5-2*p1_5+p0_5)$" in the absolute value on the first row of Expression (69) is changed to the expression "$\text{abs}(0-(p1_2-p0_2))+\text{abs}(0-(p1_5-p0_5))$" in the absolute value on the first row of Expression (79).

Further, an expression appearing after the first "and" of Expression (79) for the strong filtering determination of the R2W1 case is different from an expression appearing after the first "and" of Expression (69) for the strong filtering determination in the HEVC scheme. That is, the expression "$(|p3_i-p0_i<<1|+q0_i-q3_i|)<(\beta>>3))$" appearing after the first "and" of Expression (69) is changed to the expression "$(|p1_i-p0_i<<|+q0_i-q3_i|)<(\beta>>3))$" appearing after the first "and" of Expression (79).

As described above in connection with the R2W2 case, since the determination of this part is determination of the magnitudes of pixel values, Expression (49) for linear approximation and Expression (67) for padding are used. That is, the expression appearing after the first "and" of Expression (79) is generated in such a manner that "$p3_i$" in the expression appearing after the first "and" of Expression (69) is first approximated as "$p2_i$" and "$p2_i$" is approximated as "$2*p1_i-p0_i$."

A configuration example and an operation for realizing the above determination process based on linear approximation will be described with reference to FIGS. 22 to 24 as sixth and seventh embodiments of the deblocking filtering unit.

As described above, in the present technique, the inter-block boundary determination at the line boundary and the strong filtering determination expression are changed using Expression (49) for linear approximation and Expression (67) for padding. Thus, a clipping process is added to a strong filtering process as a countermeasure to a case where the determination expression is erroneously ignored and the deblocking filtering process is erroneously performed.

[Description of Present Technique (Clipping Process in Strong Filtering)]

Next, a clipping process in strong filtering which is an eighth embodiment will be described. The strong filtering for luminance signals in the R2W2 case may also use Expressions (80) to (84) in which a clipping process is added.

[Mathematical formula 28]

$$p0_i = \text{Clip}_{0\text{-}255}(p0_0 + \text{Clip}_{(-tc)-tc}(((4*p1_i + p0_i + 2*q0_i + q1_i + 4) >> 3) - p0_0)); i=0,7 \quad (80)$$

$$q0_i = \text{Clip}_{0\text{-}255}(p0_0 + \text{Clip}_{(-tc)-tc}(((p1_i + 2*p0_i + 2*q0_i + 2*q1_i + q2_i + 4) >> 3) - p0_0)); i=0,7 \quad (81)$$

$$p1_i = \text{Clip}_{0\text{-}255}(p1_0 + \text{Clip}_{(-tc)-tc}(((3*p1_i + q0_i + 2) >> 2) - p1_0)); i=0,7 \quad (82)$$

$$q1_i = \text{Clip}_{0\text{-}255}(q1_0 + \text{Clip}_{(-tc)-tc}(((p0_i + q0_i + q1_i + q2_i + 2) >> 2) - q1_0)); i=0,7 \quad (83)$$

$$q2_i = \text{Clip}_{0\text{-}255}(q2_0 + \text{Clip}_{(-tc)-tc}(((p1_i + q0_i + q1_i + 3*q2_i + 2*q3_i + 4) >> 3) - q2_0)): i=0,7 \quad (84)$$

Expression (80) for strong filtering is a calculation expression for $p0_0$ after filtering. In Expression (80) for strong filtering, a clipping process of (−tc) to tc is applied to a difference between the expression in the clipping process of 0 to 255 in Expression (56) and $p0_0$ to obtain a value, the value is added to $p0_0$ to obtain another value, and the other value is subjected to a clipping process of 0 to 255.

Expression (81) for strong filtering is a calculation expression for $q0_0$ after filtering. In Expression (81) for strong filtering, a clipping process of (−tc) to tc is applied to a difference between the expression in the clipping process of 0 to 255 in Expression (57) and $q0_0$ to obtain a value, the value is added to $q0_0$ to obtain another value, and the other value is subjected to a clipping process of 0 to 255.

Expression (82) for strong filtering is a calculation expression for $p1_0$ after filtering. In Expression (82) for strong filtering, a clipping process of (−tc) to tc is applied to a difference between the expression in the clipping process of 0 to 255 in Expression (58) and $p1_0$ to obtain a value, the value is added to $p1_0$ to obtain another value, and the other value is subjected to a clipping process of 0 to 255.

Expression (83) for strong filtering is a calculation expression for $q1_0$ after filtering. In Expression (83) for strong filtering, a clipping process of (−tc) to tc is applied to a difference between the expression in the clipping process of 0 to 255 in Expression (59) and $q1_0$ to obtain a value, the value is added to $q1_0$ to obtain another value, and the other value is subjected to a clipping process of 0 to 255.

Expression (84) for strong filtering is a calculation expression for $q2_0$ after filtering. In Expression (84) for strong filtering, a clipping process of (−tc) to tc is applied to a difference between the expression in the clipping process of 0 to 255 in Expression (60) and $q2_0$ to obtain a value, the value is added to $q2_0$ to obtain another value, and the other value is subjected to a clipping process of 0 to 255.

By doing so, it is possible to suppress excessive application of the filtering process.

Here, Matthias Narroschke, Tomas Wedi, Semih Esenlik, "Results for modified decisions for deblocking," JCTVC-G590, Joint Collaborative Team on Video Coding (JCT-VC) of ITU-T SG16 WP3 and ISO/IEC JTC1/SC29/WG11 7th Meeting, Geneva, CH, 21-30 Nov. 2011 (hereinafter referred to as Non-Patent Document 2) is proposed.

In Non-Patent Document 2, it is described that a strong/weak filtering determination process is performed in respective block units. However, in the determination process described in Non-Patent Document 2, when determination results on a current line and a block unit to which the line belongs are different (for example, when weak filtering is determined for the current line whereas strong filtering is determined for a block that includes the line, article information is applied to the current line), an excessive filtering process is applied.

Moreover, in the Non-Patent Document 2, since the strong/weak filtering determination process is performed in units of four lines, a mismatch occurs between the determination and the filtering process. As an example of the mismatch, weak filtering is determined although it is necessary to determine strong filtering and strong filtering is determined although it is necessary to determine weak filtering.

In strong filtering of luminance signals in the HEVC scheme (HM-5.0), Expressions (85) to (89) below are employed.

[Mathematical formula 29]

$$p0_i = (p2_i + 2*p1_i + 2*p0_i + 2*q0_i + q1_i + 4) >> 3; i=0,7 \quad (85)$$

$$q0_i = (p1_i + 2*p0_i + 2*q0_i + 2*q1_i + q2_i + 4) >> 3; i=0,7 \quad (86)$$

$$p1_i = (3*p1_i + q0_i + 2) >> 2; i=0,7 \quad (87)$$

$$q1_i = (p0_i + q0_i + q1_i + q2_i + 2) >> 2; i=0,7 \quad (88)$$

$$q2_i = (p0_i + q0_i + q1_i + 3*q2_i + 2*q3_i + 4) >> 3; i=0,7 \quad (89)$$

In the present technique, in order to eliminate a mismatch of the determination process and an incompleteness in the determination process, the clipping process indicated in Expressions (90) to (94) below. In Expression (90), since a clipping process is to be performed on a partial Δ-value that changes with the filtering process, $p0_i$ is outside the clipping process. The same is applied to Expressions (91) to (94).

[Mathematical formula 30]

$$p0_i = p0_i + \text{Clip}_{(-pv)-(pv)}((p2_i + 2*p1_i - 6*p0_i + 2*q0_i + q1_i + 4) >> 3); i=0,7 \quad (90)$$

$$q0_i = q0_i + \text{Clip}_{(-pv)-(pv)}((p1_i + 2*p0_i - 6*q0_i + 2*q1_i + q2_i + 4) >> 3); i=0,7 \quad (91)$$

$$p1_i = p1_i + \text{Clip}_{(-pv)-(pv)}((-p1_i + q0_i + 2) >> 2); i=0,7 \quad (92)$$

$$q1_i = q1_i + \text{Clip}_{(-pv)-(pv)}((p0_i + q0_i - 3*q1_i + q2_i + 2) >> 2); i=0,7 \quad (93)$$

$$q2_i = q2_i + \text{Clip}_{(-pv)-(pv)}((p0_i + q0_i + q1_i - 5*q2_i + 2*q3_i + 4) >> 3); i=0,7 \quad (94)$$

Here, a clipping value "pv" is any one of 1 time, 2 times, 3 times, 4 times, 5 times, 6 times, 7 times, and 8 times of the parameter tc. That is, pv=tc, 2*tc, 3*tc, 4*tc, 5*tc, 6*tc, 7*tc, 8*tc. Although the clipping value "pv" is preferably 2 times of the parameter tc, the clipping value may be any one of 1 time to 8 times of the parameter. Moreover, the clipping value is not limited to 1 time to 8 times as long as the same effects are obtained.

Moreover, "tc" changes with the quantization parameter QP. Thus, the multiplication factor of the clipping value applied to "tc" may also be increased (that is, be changed with QP) as QP increases. The parameter (the clipping value or the value of a multiplication factor of the clipping value applied to "tc") applied to the clipping process may be set in advance and may be added to an encoded stream and transmission terminator to a decoding side.

Expressions (90) to (94) described above may be modified so that the clipping process is performed as in Expressions (95) to (99) below.

[Mathematical formula 31]

$$p0_i = \text{Clip}_{0-255}(p0_i + \text{Clip}_{(-pv)-(pv)}((p2_i + 2*p1_i - 6*p0_i + 2*q0_i + q1_i + 4) >> 3)); i = 0,7 \quad (95)$$

$$q0_i = \text{Clip}_{0-255}(q0_i + \text{Clip}_{(-pv)-(pv)}((p1_i + 2*p0_i - 6*q0_i + 2*q1_i + q2_i + 4) >> 3)); i = 0,7 \quad (96)$$

$$p1_i = \text{Clip}_{0-255}(p1_i + \text{Clip}_{(-pv)-(pv)}((-p1_i + q0_i + 2) >> 2)); i = 0,7 \quad (97)$$

$$q1_i = \text{Clip}_{0-255}(q1_i + \text{Clip}_{(-pv)-(pv)}((p0_i + q0_i - 3*q1_i + q2_i + 2) >> 2)); i = 0,7 \quad (98)$$

$$q2_i = \text{Clip}_{0-255}(q2 + \text{Clip}_{(-pv)-(pv)}((p0_i + q0_i + q1_i - 5*q2_i + 2*q3_i + 4) >> 3)); i = 0,7 \quad (99)$$

Here, Expressions (85) to (89) for the strong filtering of luminance signals of the HEVC scheme (HM-5.0) are expressions for strong filtering of luminance signals at a line boundary. That is, in the HEVC scheme (HM-5.0), the strong filtering of luminance signals is actually expressed by Expressions (100) to (105) below.

[Mathematical formula 32]

$$p0 = (p2_i + 2*p1_i + 2*p0_i + 2*q0_i + q1_i + 4) >> 3; i = 0,7 \quad (100)$$

$$q0_i = (p1_i + 2*p0_i + 2*q0_i + 2*q1_i + q2_i + 4) >> 3; i = 0,7 \quad (101)$$

$$p1_i = (p2_i + p1_i + p0_i + q0_i + 2) >> 2; i = 0,7 \quad (102)$$

$$q1_i = (p0_i + q0_i + q1_i + q2_i + 2) >> 2; i = 0,7 \quad (103)$$

$$p2_i = (2*p3_i + 3*p2_i + p1_i + p0_i + q0_i + 4) >> 3; i = 0,7 \quad (104)$$

$$q2_i = (p0_i + q0_i + p1_i + 3*q2_i + 2q3_i + 4) >> 3; i = 0,7 \quad (105)$$

In the present technique, in order to eliminate a mismatch of the determination process and an incompleteness of the determination process, a clipping process may be applied to the strong filtering for luminance signals as indicated in Expressions (106) to (111) so as to correspond to Expressions (100) to (105). In the first expression of Expression (106), similarly to Expressions (90) to (94) described above, since a clipping process is to be performed on the partial Δ-value that changes with the filtering process, "$p0_i$" is outside the clipping process. The same is applied to the first expressions of Expressions (107) to (111).

[Mathematical formula 33]

$$\begin{aligned} p0_i &= p0_i + \text{Clip}_{(-pv)-(pv)}((p2_i + 2*p1_i - 6*p0_i + \\ &\quad 2*q0_i + q1_i + 4) >> 3); \\ &= \text{Clip}_{(p0i-pv)+(p0i+pv)}((p2_i + 2*p1_i + 2*p0_i + \\ &\quad 2*q0_i + q1_i + 4) >> 3); \end{aligned} \quad (106)$$

$$i = 0, 7$$

$$\begin{aligned} q0_i &= q0_i + \text{Clip}_{(-pv)-(pv)}((p1_i + 2*p0_i - 6*q0_i + \\ &\quad 2*q1_i + q2_i + 4) >> 3); \\ &= \text{Clip}_{(q0i-pv)+(q0i+pv)}((p1_i + 2*p0_i + 2*q0_i + \\ &\quad 2*q1_i + q2_i + 4) >> 3); \end{aligned} \quad (107)$$

$$i = 0, 7$$

$$\begin{aligned} p1_i &= p1_i + \text{Clip}_{(-pv)-(pv)}((p2_i + 3*p1_i + \\ &\quad p0_i + q0_i + 2) >> 2); \\ &= \text{Clip}_{(p1i-pv)+(p1i+pv)}((p2_i + p1_i + p0_i + \\ &\quad q0_i + 2) >> 2); \end{aligned} \quad (108)$$

$$i = 0, 7$$

$$\begin{aligned} q1_i &= q1_i + \text{Clip}_{(-pv)-(pv)}((p01_i + q0_i - 3*q1_i + \\ &\quad q2_i + 2) >> 2); \\ &= \text{Clip}_{(q1i-pv)+(q1i+pv)}((p0_i + q0_i + q1_i + \\ &\quad q2_i + 2) >> 2); \end{aligned} \quad (109)$$

$$i = 0, 7$$

$$\begin{aligned} p2_i &= p2_i + \text{Clip}_{(-pv)-(pv)}((2*p2_i - 5*p2_i + p1_i + \\ &\quad p0_i + q0_i + 4) >> 3); \\ &= \text{Clip}_{(p2i-pv)+(p2i+pv)}((2*p3_i + 3*p2_i + p1_i + \\ &\quad p0_i + q0_i + 4) >> 3); \end{aligned} \quad (110)$$

$$i = 0, 7$$

$$\begin{aligned} q2_i &= q2_i + \text{Clip}_{(-pv)-(pv)}((p0_i + q0_i - q1_i - 5 * \\ &\quad q2_i + 2*q3_i + 4) >> 3); \\ &= \text{Clip}_{(q2i-pv)+(q2i+pv)}((p0_i + q0_i + q1_i + \\ &\quad 3*q2_i + 2*q3_i + 4) >> 3); \end{aligned} \quad (111)$$

$$i = 0, 7$$

Here, a clipping value "pv" is any one of 1 time, 2 times, 3 times, 4 times, 5 times, 6 times, 7 times, and 8 times of the parameter tc. That is, pv=tc, 2*tc, 3*tc, 4*tc, 5*tc, 6*tc, 7*tc, 8*tc. Although the clipping value "pv" is preferably 2 times of the parameter tc, the clipping value may be any one of 1 time to 8 times of the parameter. Moreover, the clipping value is not limited to 1 time to 8 times as long as the same effects are obtained.

Moreover, "tc" changes with the quantization parameter QP. Thus, the multiplication factor of the clipping value applied to "tc" may also be increased (that is, be changed with QP) as QP increases. The parameter (the clipping value or the value of a multiplication factor of the clipping value applied to "tc") applied to the clipping process may be set in advance and may be added to an encoded stream and transmission terminator to a decoding side.

FIG. 20 is a diagram illustrating the largest values of the pixel values that change with the strong filtering of luminance signals in the HEVC scheme (HM-5.0) of Expressions (100) to (105) described above, obtained through an experiment.

AI_HE, RA_HE, LB_HE, and LP_HE indicate conditions of this experiment. AI_HE indicates that the experiment was performed in ALL INTRA High Efficiency mode. RA_HE indicates that the experiment was performed in Random Access High Efficiency mode. LB_HE indicates that the experiment was performed in Low Delay B High Efficiency mode. LP_HE indicates that the experiment was performed in Low Delay P High Efficiency mode.

"22, 27, 32, and 37" appearing under AI_HE, RA_HE, LB_HE, and LP_HE are values of the quantization parameters used in the experiment. Moreover, Class A to Class F indicate the type of test sequence used in the experiment.

As illustrated in FIG. 20, a pixel value that changes with the strong filtering of luminance signals in the HEVC scheme (HM-5.0) (that is, a pixel value that changes with the strong filtering when the clipping process is not present) changes greatly by 100 or more in some cases.

Therefore, a clipping process is applied to the strong filtering of luminance signals. Due to this, as illustrated in FIG. 21, it is possible to suppress the influence of a mismatch of the determination process and an incompleteness of the determination process as much as possible.

Figure 21:
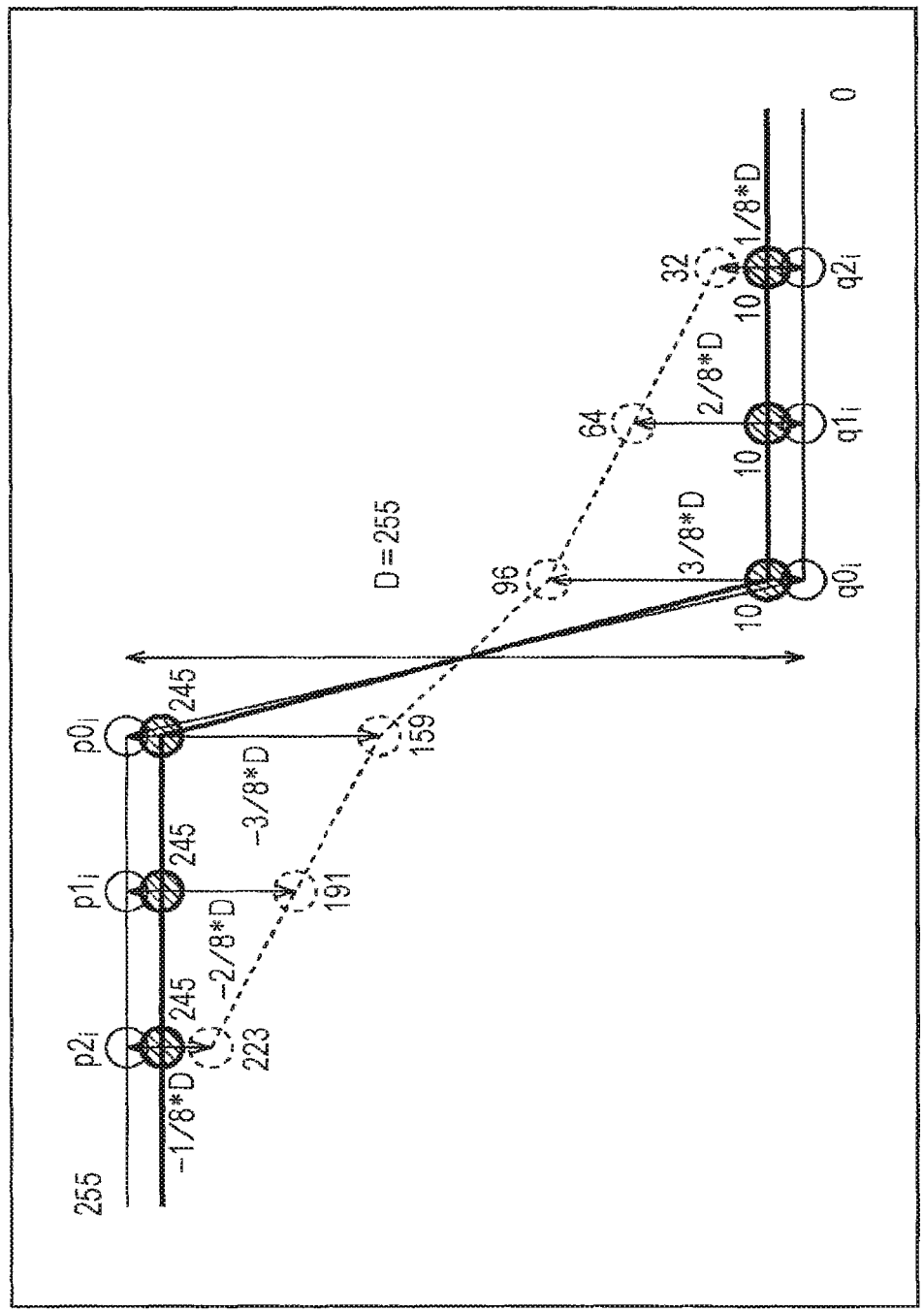
FIG. 21 is a diagram for describing the effects of clipping-based strong filtering.

In the example of FIG. 21, when there is an edge (that is not a block boundary) indicated by a solid line, although a deblocking process is not to be performed, if the deblocking process is performed according to the technique of Non-Patent Document 2, the pixel values are changed greatly as indicated by dot lines.

For example, as indicated by solid line, before the deblocking process is performed, the values of the pixels $p2_i$, $p1_i$, and $p0_i$ are 255, the values of the pixels $q0_i$, $q1_i$, and $q2_i$ are 0, and the difference D between the values of the pixels $p0_i$ and $q0_i$ is 255.

In contrast, as indicated by dot line, after the deblocking process is performed, the value of the pixel $p2_i$ is 223, the value of the pixel $p1_i$ is 191, and the value of the pixel $p0_i$ is 159. Thus, the pixel values of the pixels $p2_i$, $p1_i$, and $p0_i$ are changed greatly. Moreover, after the deblocking process is performed, the value of the pixel $q0_i$ is 96, the value of the pixel $q1_i$ is 64, and the value of the pixel $q2_i$ is 32. Thus, the pixel values of the pixels $q0_i$, $q1_i$, and $q2_i$ are changed greatly.

In such a case, in the strong filtering of Expressions (106) to (111) described above, a clipping process of which the clipping value is 10 is performed.

In contrast, as indicated by bold line, after the deblocking process is performed, the values of the pixels $p2_i$, $p1_i$, and $p0_i$ are 245, and the values of the pixels $q0_i$, $q1_i$, and $q2_i$ are 255. Thus, the change in the pixel values can be suppressed as much as possible.

Figure 26:
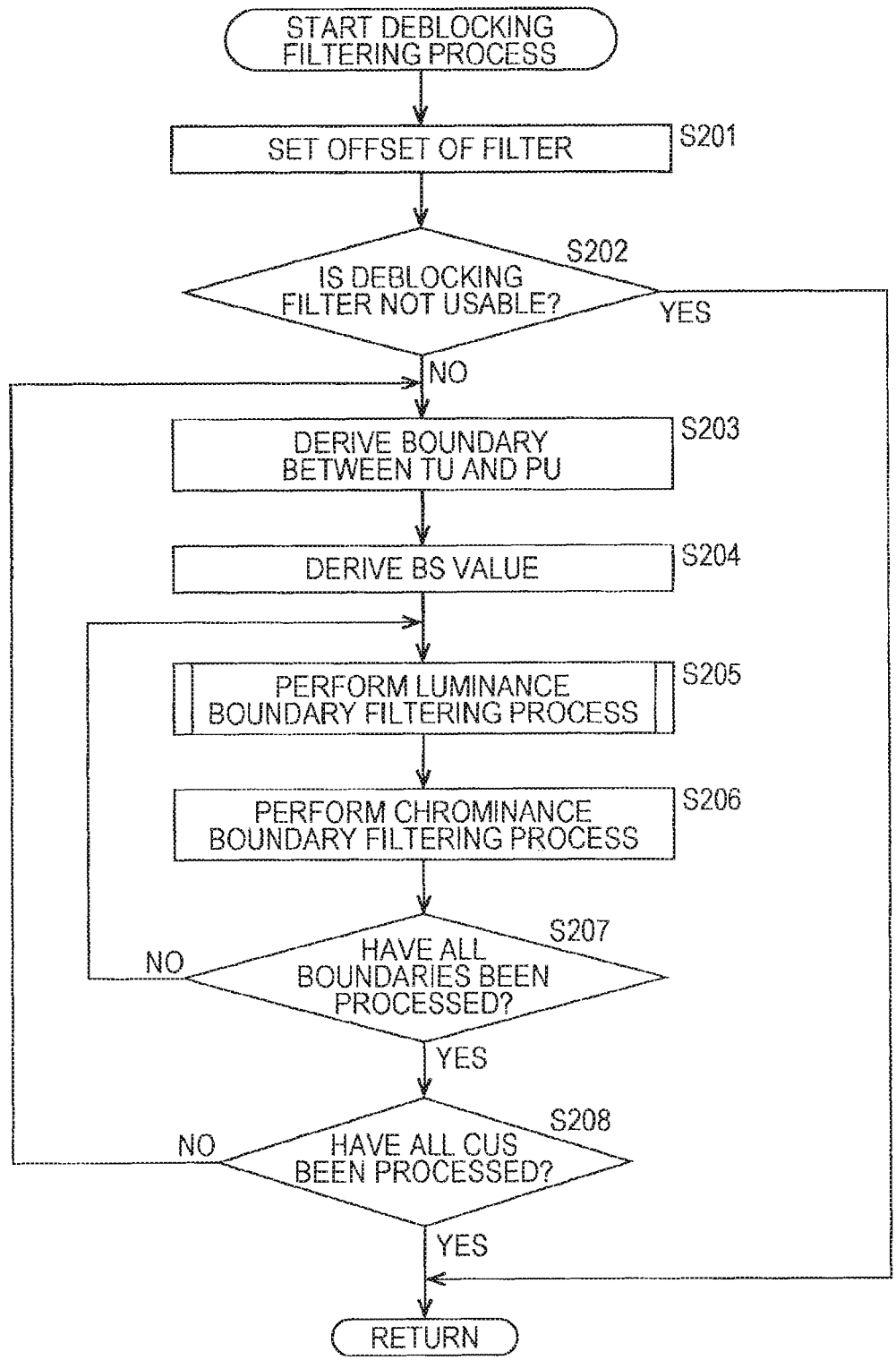
FIG. 26 is a flowchart illustrating the operation of the eighth embodiment of the deblocking filtering unit.
Figure 27:
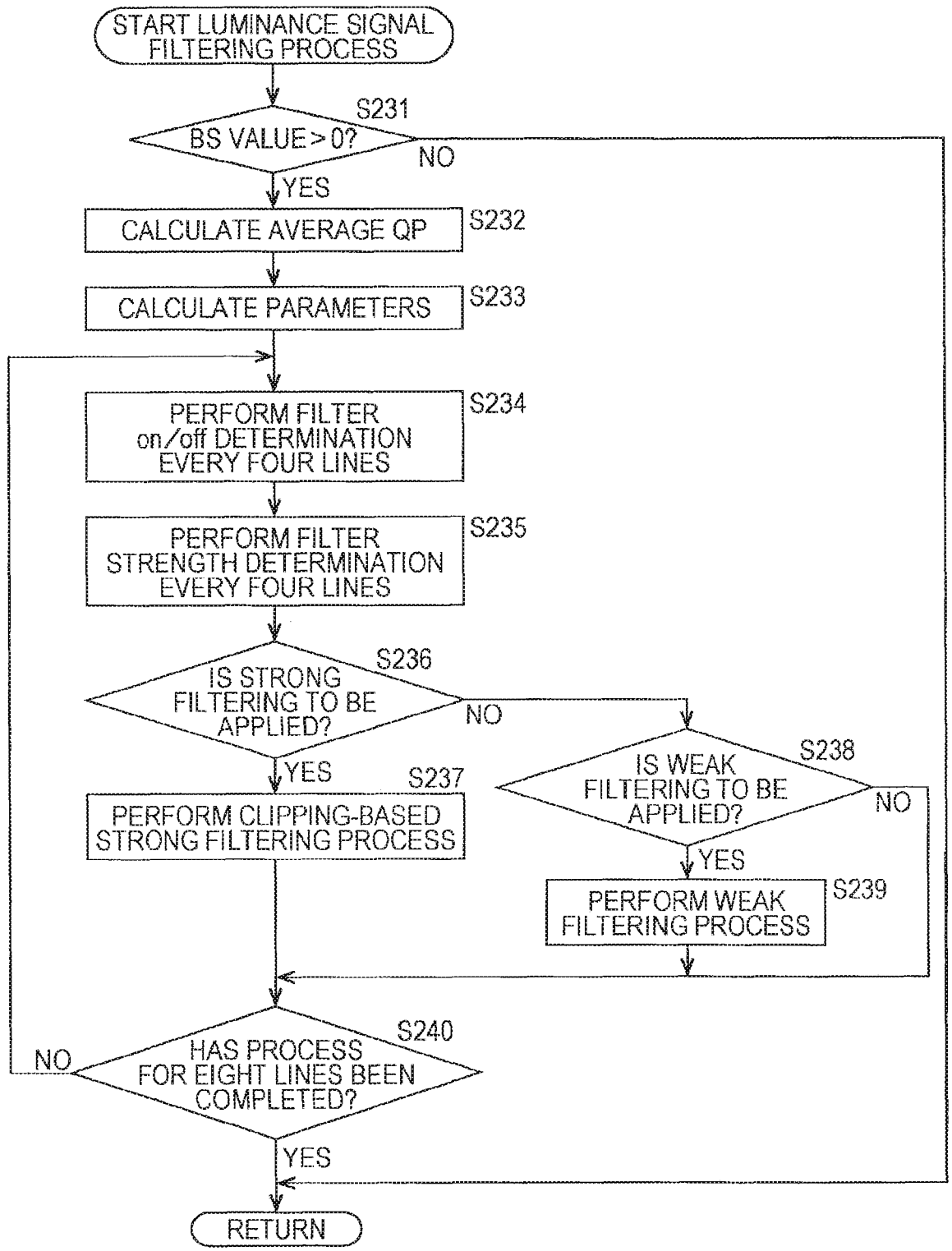
FIG. 27 is a flowchart for describing a luminance signal deblocking process.

A configuration example and an operation of the clipping process in the strong filtering will be described with reference to FIGS. 25 to 27 described later as an eighth embodiment of the deblocking filtering unit.

13. Sixth Embodiment of Deblocking Filtering Unit

[Configuration Example of Deblocking Filtering Unit]

Figure 22:
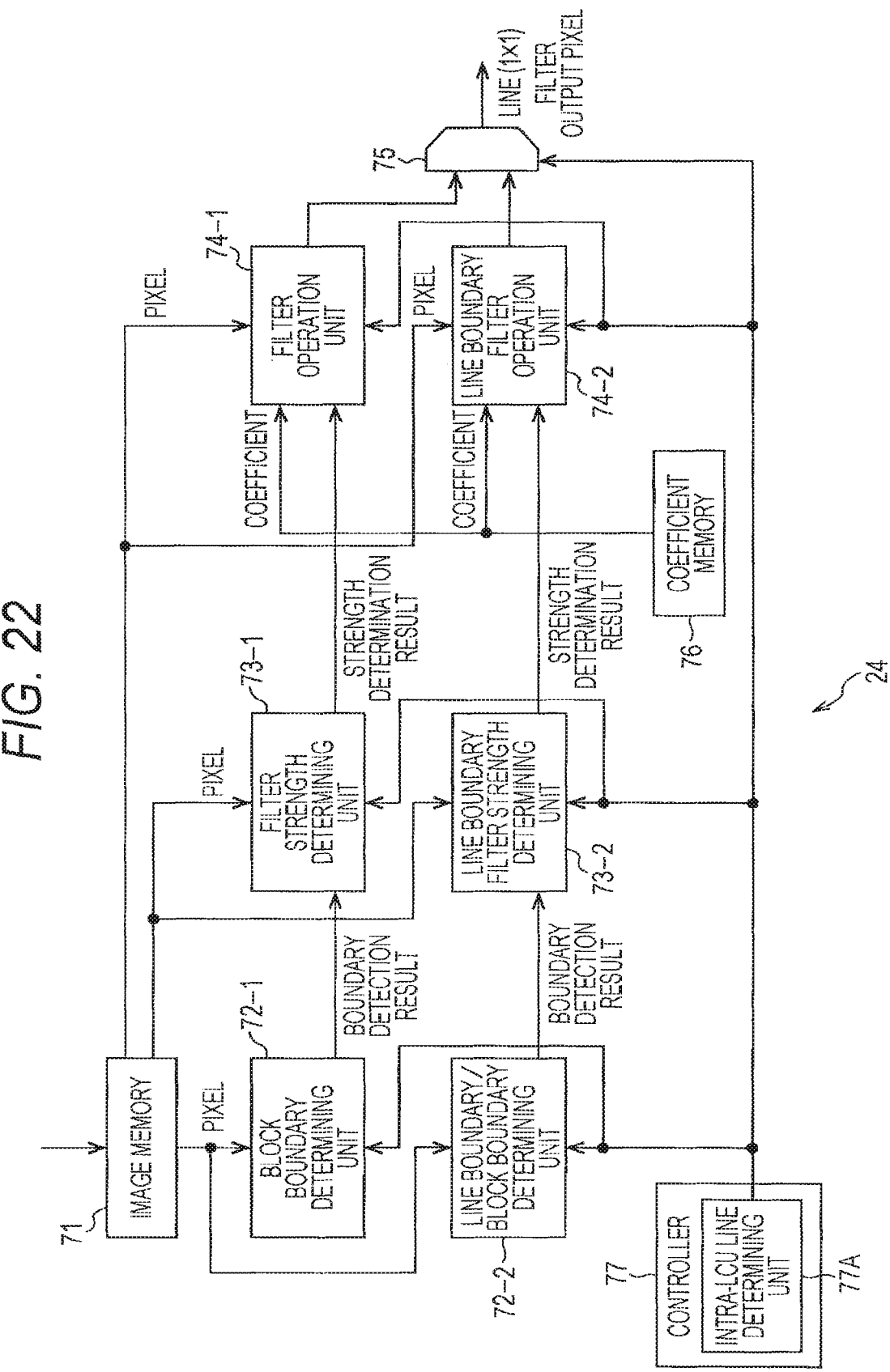
FIG. 22 is a diagram illustrating the configuration of a sixth embodiment of the deblocking filtering unit.
Figure 23:
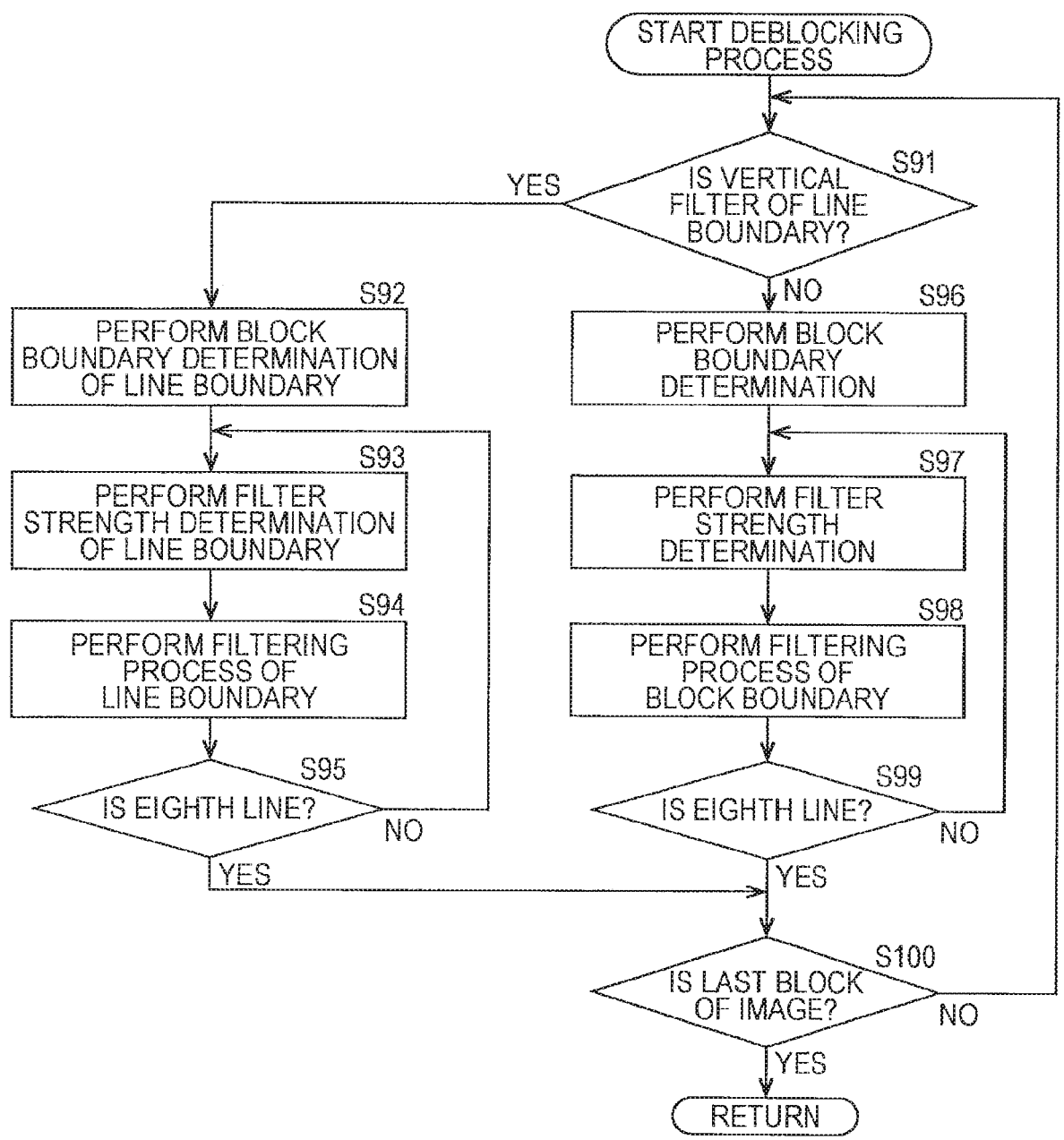
FIG. 23 is a flowchart illustrating the operation of the sixth embodiment of the deblocking filtering unit.

FIG. 22 illustrates the configuration of the sixth embodiment of the deblocking filtering unit. The deblocking filtering unit 24 is configured to include an image memory 71, a block boundary determining unit 72-1, a filter strength determining unit 73-1, a filter operation unit 74-1, a selector 75, a coefficient memory 76, and a filter controller 77. The deblocking filtering unit 24 is configured to further include a line boundary/block boundary determining unit 72-2, a line boundary filter strength determining unit 73-2, and a line boundary filter operation unit 74-2.

The image memory 71 is a unit that corresponds to the line memory 241 of FIG. 9 and is configured as a line memory. The image memory 71 stores image data supplied from the adder 23. The image memory 71 reads the image data stored therein and supplies the read image data to the block boundary determining unit 72-1, the filter strength determining unit 73-1, and the filter operation unit 74-1. Moreover, the image memory 71 reads the image data stored therein and supplies the read image data to the line boundary/block boundary determining unit 72-2, the line boundary filter strength determining unit 73-2, and the line boundary filter operation unit 74-2.

At positions other than the line boundary, the image data is not stored in the image memory 71, but there may be case where the image data supplied from the adder 23 is supplied to the respective units and processed. However, in the example of FIG. 22, for the sake of convenience, it is described that the image data having passed through the image memory 71 is processed.

The block boundary determining unit 72-1 performs inter-block boundary determination under the control of the controller 77. That is, the block boundary determining unit 72-1 performs the inter-block boundary determination process for each block using the image data read from the image memory 71 and detects an inter-block boundary in which the filtering process is performed. The block boundary determining unit 72-1 outputs the detection results to the filter strength determining unit 73-1.

The filter strength determining unit 73-1 determines the filter strength in the above-described manner under the control of the controller 77. That is, the filter strength determining unit 73-1 determines whether the filtering process will be performed in a strong filtering mode or a weak filtering mode for each line using the image data of two blocks with an inter-block boundary interposed, supplied from the image memory 71 and outputs the determination results to the filter operation unit 74-1.

The filter operation unit 74-1 performs a filtering operation with the filter strength determined by the filter strength determining unit 73-1 for each line under the control of the controller 77 using the image data stored in the image memory 71 and the filter coefficients read from the coefficient memory 76. The filter operation unit 74-1 outputs the image data having been subjected to the filtering process to the selector 75.

When the boundary is an inter-LCU line boundary, the line boundary/block boundary determining unit 72-2 performs inter-block boundary determination under the control of the controller 77. That is, the line boundary/block boundary determining unit 72-2 performs the inter-block boundary determination process for each block using the image data read from the image memory 71 and detects an inter-block boundary in which the filtering process is performed. The line boundary/block boundary determining unit 72-2 outputs the detection results to the line boundary filter strength determining unit 73-2.

When the boundary is an inter-LCU line boundary, the line boundary filter strength determining unit 73-2 determines the filter strength in the above-described manner under the control of the controller 77. That is, the line boundary filter strength determining unit 73-2 determines whether the filtering process will be performed in a strong filtering mode or a weak filtering mode for each line using the image data of two blocks adjacent with an inter-block boundary interposed, supplied from the image memory 71 and outputs the determination results to the line boundary filter operation unit 74-2.

The line boundary filter operation unit 74-2 performs the filtering operation with the filter strength determined by the line boundary filter strength determining unit 73-2 for each line under the control of the controller 77 using the image data stored in the image memory 71 and the filter coefficients read from the coefficient memory 76. The line boundary filter operation unit 74-2 outputs the image data having been subjected to the filtering process to the selector 75.

The selector 75 selects any one of the image data from the filter operation unit 74-1 and the image data from the line boundary filter operation unit 74-2 under the control of the controller 77 and outputs the selected image data to the frame memory 25.

The coefficient memory 76 stores filter coefficients used for the filtering operation of the deblocking filtering process. The coefficient memory 76 reads the filter coefficients stored therein and supplies the read filter coefficients to the filter operation unit 74-1 and the line boundary filter operation unit 74-2.

The controller 77 controls the respective units of the deblocking filtering unit 24. For example, the controller 77 controls the image memory 71 so as to store image data corresponding to a predetermined number of lines on the lower side in the block and reads the image data stored in the image memory 71. The controller 77 is configured to include an intra-LCU line determining unit 77A.

The intra-LCU line determining unit 77A determines whether a boundary is an inter-LCU line boundary in respective block units in which the process is sequentially performed in a raster scan direction, and supplies the determination results to the block boundary determining unit 72-1, the filter strength determining unit 73-1, and the filter operation unit 74-1 so that the units perform the process when the boundary is not the line boundary. Moreover, the intra-LCU line determining unit 77A also supplies the determination results to the line boundary/block boundary determining unit 72-2, the line boundary filter strength determining unit 73-2, and the line boundary filter operation unit 74-2 so that the units perform the process when the boundary is the line boundary. Further, the intra-LCU line determining unit 77A supplies the determination results to the selector 75 so that the selector 75 selects the image data from the line boundary filter operation unit 74-2 when the boundary is the line boundary and selects the image data from the filter operation unit 74-1 when the boundary is not the line boundary.

The deblocking filtering unit 24 illustrated in FIG. 22 may be configured in advance to perform the R2W2 process, for example, and may be configured so as to be able to control the filter processing range and the filtering operation range similarly to the example of FIG. 9.

[Operation of Deblocking Filtering Unit]

Next, the deblocking process of the deblocking filtering unit 24 of FIG. 22 will be described with reference to the flowchart of FIG. 23. In the example of FIG. 23, a case where the R2W2 process is performed will be described.

In step S91, the intra-LCU line determining unit 77A determines whether a filter applied is a vertical filter of a LCU boundary in respective block units in which the process is sequentially performed in a raster scan direction. That is, in step S91, it is determined whether a boundary is an inter-LCU line boundary and the filter applied is a vertical filter.

When it is determined in step S91 that the filter applied is a vertical filter of a LCU boundary, the flow proceeds to step S92. In step S92, the line boundary/block boundary determining unit 72-2 performs inter-block boundary determination of a line boundary under the control of the controller 77 when the boundary is an inter-LCU line boundary.

That is, the line boundary/block boundary determining unit 72-2 performs the inter-block boundary determination process for each block according to Expression (70) described above using the image data read from the image memory 71 and detects an inter-block boundary in which the filtering process is performed. The line boundary/block boundary determining unit 72-2 outputs the detection results to the line boundary filter strength determining unit 73-2.

In step S93, the line boundary filter strength determining unit 73-2 determines the filter strength of the line boundary as described above under the control of the controller 77 when the boundary is the inter-LCU line boundary.

That is, the line boundary filter strength determining unit 73-2 determines whether the filtering process will be performed in a strong filtering mode or a weak filtering mode using the image data of two blocks adjacent with the inter-block boundary, supplied from the image memory 71. A strong filtering mode is determined according to Expression (71) described above. Moreover, a weak filtering mode is determined according to the first terms of Expressions (64) to (66) described above. The line boundary filter strength determining unit 73-2 outputs the determination results to the line boundary filter operation unit 74-2.

In step S94, the line boundary filter operation unit 74-2 performs a filtering process of the line boundary under the control of the controller 77. That is, the line boundary filter operation unit 74-2 performs a filtering operation with the filter strength determined by the line boundary filter strength determining unit 73-2 using the image data stored in the image memory 71 and the filter coefficient read from the coefficient memory 76.

In the case of the strong filtering, the filtering operation is performed according to Expressions (56) to (60) described above. Moreover, in the case of the weak filtering, the filtering operation is performed according to the second and third terms of Expressions (64) to (66) described above. The line boundary filter operation unit 74-2 outputs the image data having been subjected to the filtering process to the selector 75.

In step S95, the intra-LCU line determining unit 77A determines whether a current line is the last eighth line of the LCU. When it is determined in step S95 that the current line is not the last eighth line of the LCU, the flow returns to step S93 and the subsequent processes are repeated.

Moreover, when it is determined in step S95 that the current line is the last eighth line of the LCU, the flow proceeds to step S100.

On the other hand, when it is determined in step S91 that the filter applied is not the vertical filter of the LCU boundary, the flow proceeds to step S96. In step S96, the block boundary determining unit 72-1 performs inter-block boundary determination under the control of the controller 77.

That is, the block boundary determining unit 72-1 performs the inter-block boundary determination process for each block according to Expression (68) described above using the image data read from the image memory 71 and detects an inter-block boundary in which the filtering process is performed. The block boundary determining unit 72-1 outputs the detection results to the filter strength determining unit 73-1.

In step S97, the filter strength determining unit 73-1 determines the filter strength in the above-described manner under the control of the controller 77. That is, the filter strength determining unit 73-1 determines whether the filtering process will be performs in a strong filtering mode or a weak filtering mode for each line using the image data of two blocks adjacent with the inter-block boundary interposed, supplied from the image memory 71. A strong filtering mode is determined according to Expression (69) described above. A weak filtering mode is determined according to the first terms of Expressions (61) to (63) described above. The filter strength determining unit 73-1 outputs the determination results to the filter operation unit 74-1.

In step S98, the filter operation unit 74-1 performs a filtering operation of the block boundary under the control of the controller 77. That is, the filter operation unit 74-1 performs the filtering operation with the filter strength determined by the filter strength determining unit 73-1 for each line using the image data stored in the image memory 71 and the filter coefficients read from the coefficient memory 76.

In the case of the strong filtering, the filtering operation is performed according to Expressions (50) to (55) described above. Moreover, in the case of the weak filtering, the filtering operation is performed according to the second and third terms of Expressions (61) to (63) described above. The filter operation unit 74-1 outputs the image data having been subjected to the filtering process to the selector 75.

In step S99, the intra-LCU line determining unit 77A determines whether a current line is the last eighth line of the LCU. When it is determined in step S99 that the current line is not the last eighth line of the LCU, the flow returns to step S97 and the subsequent processes are repeatedly performed.

Moreover, when it is determined in step S99 that the current line is the last eighth line of the LCU, the flow proceeds to step S100.

In step S100, the intra-LCU line determining unit 77A determines whether a current block is the last block of the image. That is, in step S100, it is determined whether the boundary is a line boundary of another block in the screen.

When it is determined in step S100 that the block is the last block of the image, the deblocking process ends. When it is determined in step S100 that the block is not the last block of the image, the flow returns to step S91, and the subsequent processes are repeatedly performed on the next LCU in the raster scan order.

In the example of FIG. 22, the intra-LCU line determining unit 77A selects whether the coefficients used for the case other than the line boundary in the filter operation unit 74-1 or the coefficients for the case of the line boundary in the line boundary filter operation unit 74-2 will be used. In this manner, the filtering process at the line boundary and the filtering process at the positions other than the line boundary are switched.

In contrast, only one type of coefficients may be used and the address of the pixel to be read may be controlled so that the filtering process at the line boundary and the filtering process at the positions other than the line boundary are switched.

For example, calculation of $P0_0$ in the R2W2-based strong filtering will be described as an example. In Expression (50) for the strong filtering of the HEVC scheme, a term relating to "p(block BKu)" is "$p2_i+2*P1_i+2*q0_i$."

On the other hand, in Expression (56) for the strong filtering of the HEVC scheme, a term relating to "p(block BKu)" is "$4*P1_i+q0_i$."

Here, $4*P1_i+q0_i=q0_i+2*P1_i+2*P1_i$.

That is, the term relating to "p" in Expression (50) and the term relating to "p" in Expression (56) also use coefficients 1, 2, and 2 in that order from the left side. Thus, by replacing (changing the read-out addresses of) the pixel values to be multiplied with the coefficients using the same coefficients, it is possible to switch between the filtering process at the line boundary and the filtering process at the positions other than the line boundary.

14. Seventh Embodiment of Deblocking Filtering Unit

[Configuration Example of Deblocking Filtering Unit]

Figure 24:
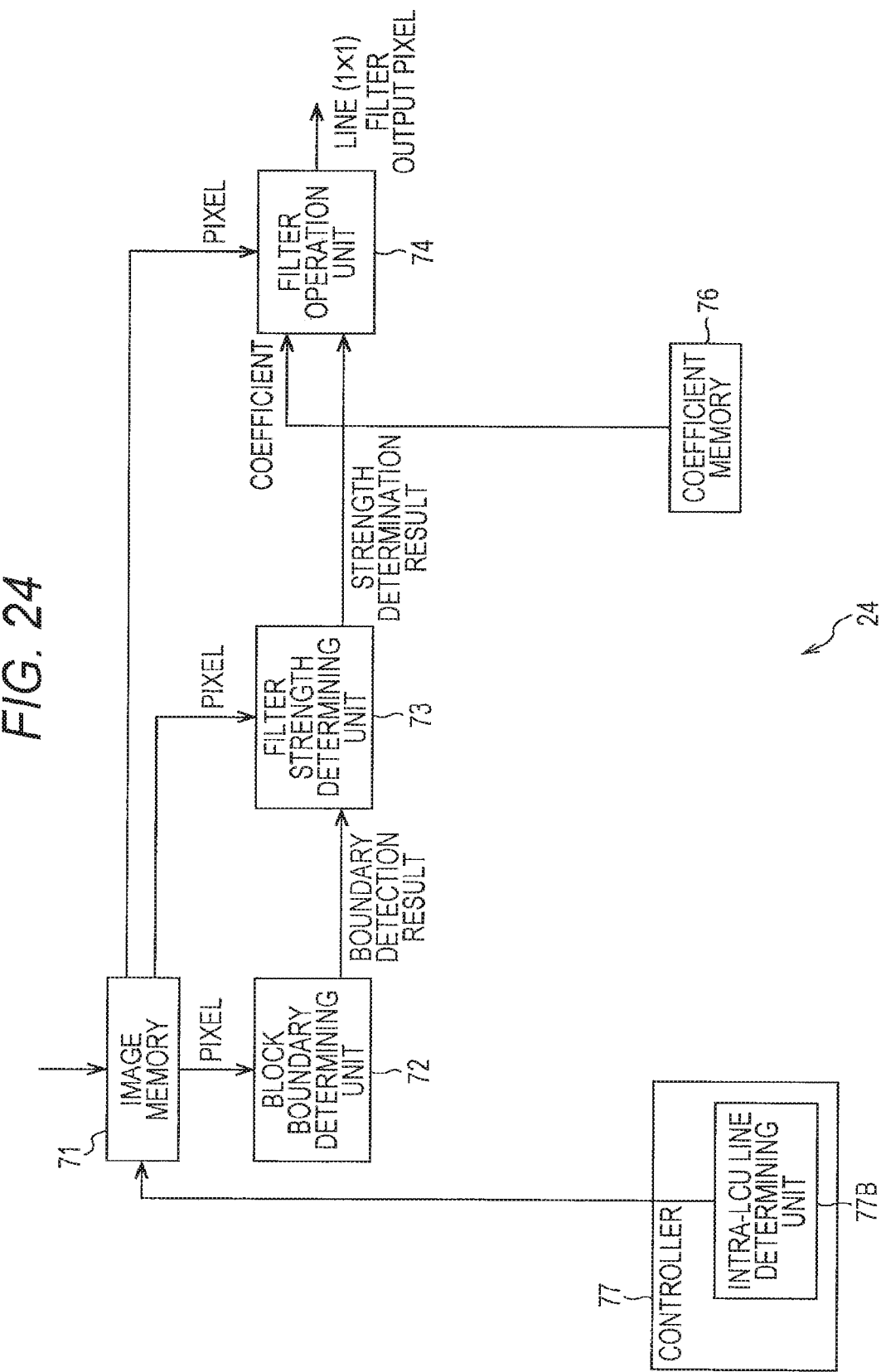
FIG. 24 is a diagram illustrating the configuration of a seventh embodiment of the deblocking filtering unit.

FIG. 24 illustrates the configuration of a seventh embodiment of the deblocking filtering unit.

In the example of FIG. 24, the deblocking filtering unit 24 is configured to include an image memory 71, a block boundary determining unit 72, a filter strength determining unit 73, a filter operation unit 74, a coefficient memory 76, and a controller 77.

In the deblocking filtering unit 24 of FIG. 24, the image memory 71, the coefficient memory 76, and the controller 77 are the same as those of the deblocking filtering unit 24 of FIG. 22.

The deblocking filtering unit 24 of FIG. 24 is different from the deblocking filtering unit 24 of FIG. 22 in that the block boundary determining unit 72-1 and the line boundary/block boundary determining unit 72-2 are collectively changed to the block boundary determining unit 72. The deblocking filtering unit 24 of FIG. 24 is different from the deblocking filtering unit 24 of FIG. 22 in that the filter strength determining unit 73-1 and the line boundary filter strength determining unit 73-2 are collectively changed to the filter strength determining unit 73. The deblocking filtering unit 24 of FIG. 24 is different from the deblocking filtering unit 24 of FIG. 22 in that the filter operation unit 74-1 and the line boundary filter operation unit 74-2 are collectively changed to the filter operation unit 74.

Further, the deblocking filtering unit 24 of FIG. 24 is different from the deblocking filtering unit 24 of FIG. 22 in that the intra-LCU line determining unit 77A of the controller 77 is changed to an intra-LCU line determining unit 77B.

That is, the intra-LCU line determining unit 77B controls the address of the pixel read from the image memory 71 as described above by way of an example of calculation of $P0_0$ in the R2W2-based strong filtering. Thus, the image memory 71 reads pixels based on the control of the intra-LCU line determining unit 77B and supplies the read pixels to the block boundary determining unit 72, the filter strength determining unit 73, and the filter operation unit 74.

The block boundary determining unit 72 performs inter-block boundary determination. That is, the block boundary determining unit 72 performs the inter-block boundary determination process described above for each block using the image data read from the image memory 71 and detects an inter-block boundary in which the filtering process is performed. The block boundary determining unit 72 outputs the detection results to the filter strength determining unit 73.

The filter strength determining unit 73 determines the filter strength in the above-described manner. That is, the filter strength determining unit 73 determines whether the filtering process will be performs in a strong filtering mode or a weak filtering mode for each line using the image data of two blocks adjacent with the inter-block boundary interposed, supplied from the image memory 71 and outputs the determination results to the filter operation unit 74.

The filter operation unit 74 performs the filtering operation with the filter strength determined by the filter strength determining unit 73 for each line using the image data stored in the image memory 71 and the filter coefficients read from the coefficient memory 76. The filter operation unit 74 outputs the image data having been subjected to the filtering process to the frame memory 25.

The deblocking filtering process of the deblocking filtering unit 24 of FIG. 24 is basically the same as the deblocking filtering process described above with reference to FIG. 23, and the description thereof will not be provided.

As above, pixels which could not be referred to due to the narrowed image range used for the filtering operation are interpolated using the inclination of the waveform used in the inter-block boundary determination. As a result, the deblocking process when the pixel values have an inclination can be performed even when the image range in the inter-LCU line boundary is narrowed.

Moreover, in inter-block boundary determination and strong/weak filtering determination, the pixels which could not be referred to due to the narrowed image range used for the filtering operation are interpolated using the inclination and padding of the waveform used in the inter-block boundary determination. As a result, the deblocking determination process when the pixel values have an inclination can be performed even when the image range in the inter-LCU line boundary is narrowed.

In this manner, in the inter-LCU line boundary, even when the image range is narrowed, it is possible to reduce the line memory while maintaining the function of the deblocking process.

15. Eighth Embodiment of Deblocking Filtering Unit

[Configuration Example of Deblocking Filtering Unit]

Figure 25:
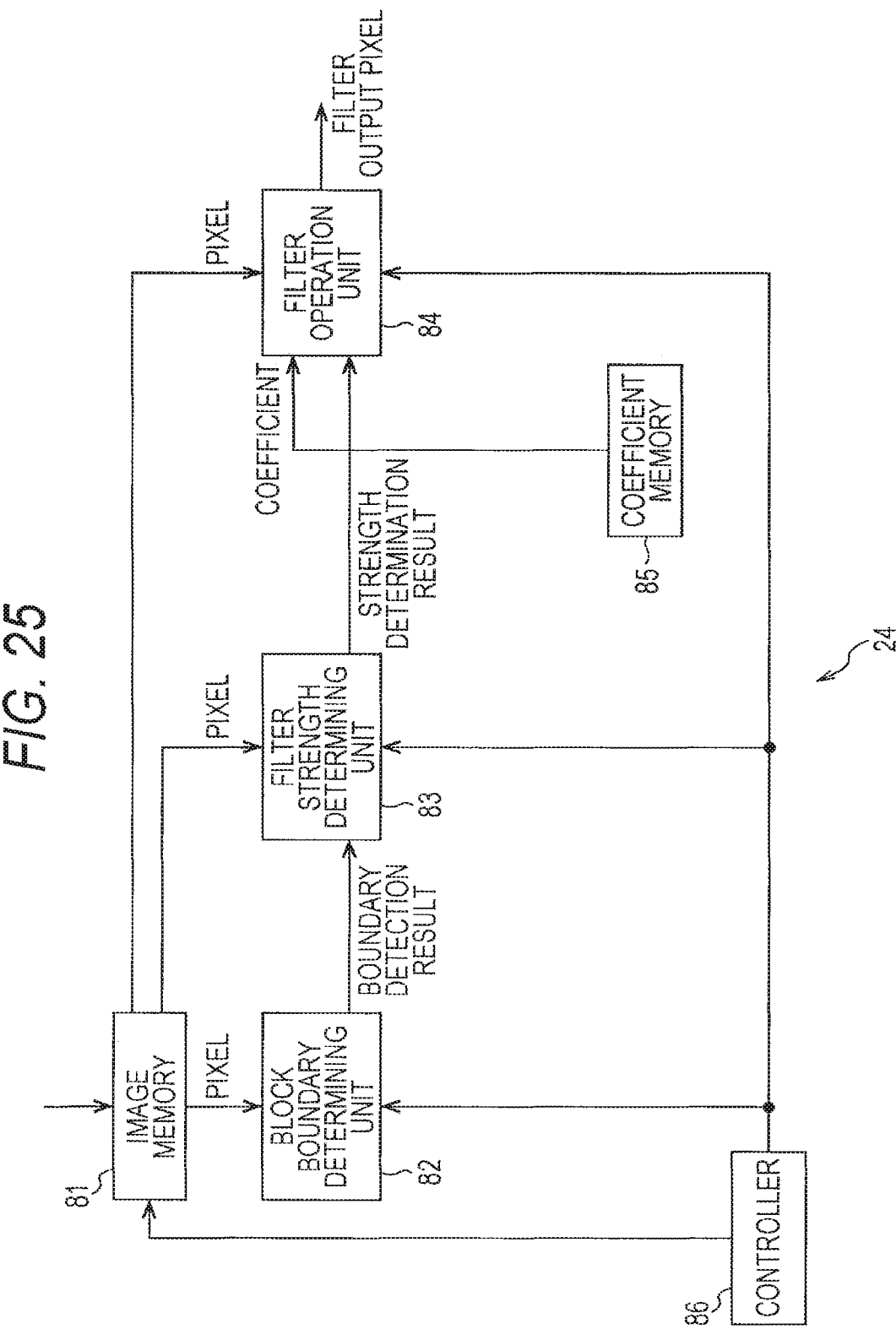
FIG. 25 is a diagram illustrating the configuration of an eighth embodiment of the deblocking filtering unit.

FIG. 25 illustrates the configuration of an eighth embodiment of the deblocking filtering unit.

In the example of FIG. 25, the deblocking filtering unit 24 is configured to include an image memory 81, a block boundary determining unit 82, a filter strength determining unit 83, a filter operation unit 84, a coefficient memory 85, and a controller 86.

The image memory 81 is a unit that corresponds to the image memory 71 of FIG. 22 and is configured as a line memory. The image memory 81 stores image data supplied from the adder 23. The image memory 81 reads the image data stored therein and supplies the read image data to the block boundary determining unit 82, the filter strength determining unit 83, and the filter operation unit 84.

At positions other than the line boundary, the image data is not stored in the image memory 81, but there may be case where the image data supplied from the adder 23 is supplied to the respective units and processed. However, in the example of FIG. 25, for the sake of convenience, it is described that the image data having passed through the image memory 81 is processed.

The block boundary determining unit 82 derives boundaries every eight lines under the control of the controller 86 to calculate parameters used for determination and performs inter-block boundary determination every four lines. That is, the block boundary determining unit 82 derives a boundary between TU and PU using the image data read from the image memory 81 and derives a BS value. Further, the block boundary determining unit 82 obtains an average of the quantization parameters QP of two regions adjacent with a current boundary interposed to calculate an average QP (quantization parameter) and calculates the parameters tc and β based on the calculated average QP.

Moreover, the block boundary determining unit 82 determines whether or not to perform filtering every four lines using the image data of two blocks adjacent with the inter-block boundary interposed, supplied from the image memory 81 and the calculated parameters. The block boundary determining unit 82 supplies the calculated parameters to the filter strength determining unit 83 together with the boundary determination results.

The filter strength determining unit 83 determines the filter strength every four lines under the control of the controller 86. That is, when the block boundary determining unit 82 determines that filtering is to be performed, the filter strength determining unit 83 determines whether the filtering process will be performed in a strong filtering mode or a weak filtering mode and outputs the determination results to the filter operation unit 84.

The filter operation unit 84 performs the filtering operation with the filter strength determined by the filter strength determining unit 83 every four lines using the image data stored in the image memory 81 and the filter coefficients read from the coefficient memory 85 under the control of the controller 86. In particular, when the filter strength determining unit 83 determines that strong filtering is to be performed, the filter operation unit 84 performs a clipping-based filtering process using Expressions (106) to (111) described above.

The filter operation unit 84 outputs the image data having been subjected to the filtering process to the frame memory 25 in the subsequent stage.

The coefficient memory 85 stores filter coefficients used in the filtering operation of the deblocking filtering process. The coefficient memory 85 reads the filter coefficients stored therein and supplies the filter coefficients to the filter operation unit 84.

The controller 86 receives information (ON/OFF information of deblocking filter, offset values of parameters β and tc, and clipping parameters) from an operation unit (not illustrated) (in the case of the decoding side, the lossless decoder 52). Moreover, the controller 86 is also supplied with prediction mode information and parameters necessary for deblocking filter such as quantization parameters.

For example, the controller 86 supplies the input information to the corresponding unit and controls the respective units of the deblocking filtering unit 24 based on the input ON/OFF information.

The controller 86 controls the image memory 81 so as to store image data corresponding to a predetermined number of lines on the lower side in the block and reads the image data stored in the image memory 81. Moreover, when strong filtering is performed, the controller 86 controls the filter operation unit 84 to perform a clipping-based strong filtering process. In this case, the controller 86 supplies parameters (for example, a clipping value pv and a multiplication value of tc of the clipping value) relating to the clipping process to the filter operation unit 84.

[Operation of Deblocking Filtering Unit]

Next, the deblocking process of the deblocking filtering unit 24 of FIG. 25 will be described with reference to the flowchart of FIG. 26.

For example, ON/OFF information, a β offset value, a Tc offset value, and parameters relating to the clipping process are input to the controller 86 via an operation unit (not illustrated) (in the case of the decoding side, the lossless decoder 52). Moreover, the controller 86 is also supplied with prediction mode information and parameters such necessary for the deblocking filter such as quantization parameters.

In step S201, the controller 86 sets filter offsets (β and Tc offsets) and supplies the set offset information to the filter strength determining unit 83.

In step S202, the controller 86 determines whether the deblocking filter can be used based on the ON/OFF information. When it is determined in step S202 that the deblocking filter cannot be used, the deblocking filtering process ends.

When it is determined in step S202 that the deblocking filter can be used, the controller 86 sends a notification thereof to the block boundary determining unit 82, the filter strength determining unit 83, and the filter operation unit 84, and the flow proceeds to step S203. In this case, the necessary parameters and the like are also supplied from the controller 86 to the respective units.

In step S203, the block boundary determining unit 82 derives a boundary between TU and PU every 8 lines. In step S204, the block boundary determining unit 82 derives a boundary strength (BS) value based on the information on the boundary between TU and PU derived in step S203 and the prediction mode information and the like supplied from the controller 86.

In step S205, the block boundary determining unit 82, the filter strength determining unit 83, and the filter operation unit 84 perform a luminance boundary filtering process. In the luminance boundary filtering process, the luminance boundary filtering is performed on the luminance signals by the process of step S205, which will be described with reference to FIG. 27.

In step S206, the block boundary determining unit 82, the filter strength determining unit 83, and the filter operation unit 84 perform a chrominance boundary filtering process. By the process of step S206, chrominance boundary filtering is performed on chrominance signals.

In step S207, the controller 86 determines whether all boundaries have been processed. When it is determined in step S207 that all boundaries have not been processed, the flow returns to step S205 and the subsequent processes are repeatedly performed. When it is determined in step S207 that all boundaries have been processed, the flow proceeds to step S208.

In step S208, the controller 86 determines whether all CUs have been processed. When it is determined in step S208 that all CUs have not been processed, the flow returns to step S203 and the subsequent processes are repeatedly performed.

When it is determined in step S208 that all CUs have been processed, the deblocking filtering process ends.

[Example of Luminance Boundary Filtering Process]

Next, the luminance boundary filtering process in step S205 of FIG. 26 will be described with reference to the flowchart of FIG. 27.

In step S231, the block boundary determining unit 82 determines whether the BS value is larger than 0 every eight lines. When it is determined in step S231 that the BS value is not larger than 0, the luminance boundary filtering process ends. That is, in this case, the filtering process of the filter operation unit 84 is not performed on the luminance boundary, and the pixel values before the filtering are output as they are.

When it is determined in step S231 that the BS value is larger than 0, the flow proceeds to step S232. In step S232, the block boundary determining unit 82 obtains an average of quantization parameters QP of two regions adjacent to a current boundary using the pixel values from the image memory 81 every eight lines to calculate an average QP (quantization parameter). In this case, the quantization parameters QP are supplied from the controller 86.

In step S233, the block boundary determining unit 82 calculates the parameters tc and f based on the average QP calculated in step S232 every eight lines.

In step S234, the block boundary determining unit 82 performs filter on/off determination every four lines. That is, the block boundary determining unit 82 performs filter on/off determination every four lines using the calculated parameters β and the like. This determination process uses Expression (68) described above, for example.

The on/off determination results in step S234 are supplied to the filter strength determining unit 83 together with the calculated parameters as the boundary determination results.

Moreover, in step S235, the filter strength determining unit 83 performs filter strength determination every four lines. That is, the filter strength determining unit 83 performs filter strength determination every four lines using the parameters 3, tc, and the like calculated by the block boundary determining unit 82. This determination process uses the first terms of Expressions (69) and (61) to (63) described above, for example.

The on/off determination results in step S234 and the filter strength determination results in step S235 are supplied to the filter operation unit 84. In this case, the parameter tc is also supplied to the filter operation unit 84.

In step S236, the filter operation unit 84 determines whether strong filtering is to be applied to the current four lines based on the determination results from the filter strength determining unit 83. When it is determined in step S236 that strong filtering is to be applied to the current four lines, the flow proceeds to step S237.

In step S237, the filter operation unit 84 performs a clipping-based strong filtering process using Expressions (106) to (111) described above under the control of the controller 86. The filter operation unit 84 outputs the pixel values after the filtering process to the subsequent stage.

When it is determined in step S236 that strong filtering is not to be applied, the filter operation unit 84 determines in step S238 whether weak filtering is to be applied to the current four lines based on the determination results from the filter strength determining unit 83. When it is determined in step S238 that weak filtering is to be applied, the flow proceeds to step 239.

In step S239, the filter operation unit 84 performs a weak filtering process. The filter operation unit 84 outputs the pixel values after the filtering process to the subsequent stage.

When it is determined in step S238 that weak filtering is not to be applied, the flow proceeds to step 240. In step S240, the filter operation unit 84 does not perform the process on the current four lines based on the determination results from the filter strength determining unit 83 but outputs the pixel values after the filtering process to the subsequent stage as they are.

In step S240, the filter operation unit 84 determines whether the process for eight lines has been completed, and ends the luminance signal deblocking process when it is determined that the process for eight lines has been completed. When it is determined in step S240 that the process for eight lines has not been completed, the flow returns to step S234 and the subsequent processes are repeatedly performed.

As above, since the clipping-based strong filtering process is performed when it is determined that strong filtering is to be applied, it is possible to suppress the influence of a mismatch of the determination process and an incompleteness of the determination process as much as possible. In this way, it is possible to allow the deblocking process to apply filtering appropriately.

In the above description, the linear approximation and clipping-based strong filtering process has been described. In the description of linear approximation, although the cases of R2W2 and R2W1 have been described, the linear approximation process for the R3W2 and R1W1 cases can be performed in the same manner.

16. Ninth Embodiment

[Example of R3W2]

Figure 28:
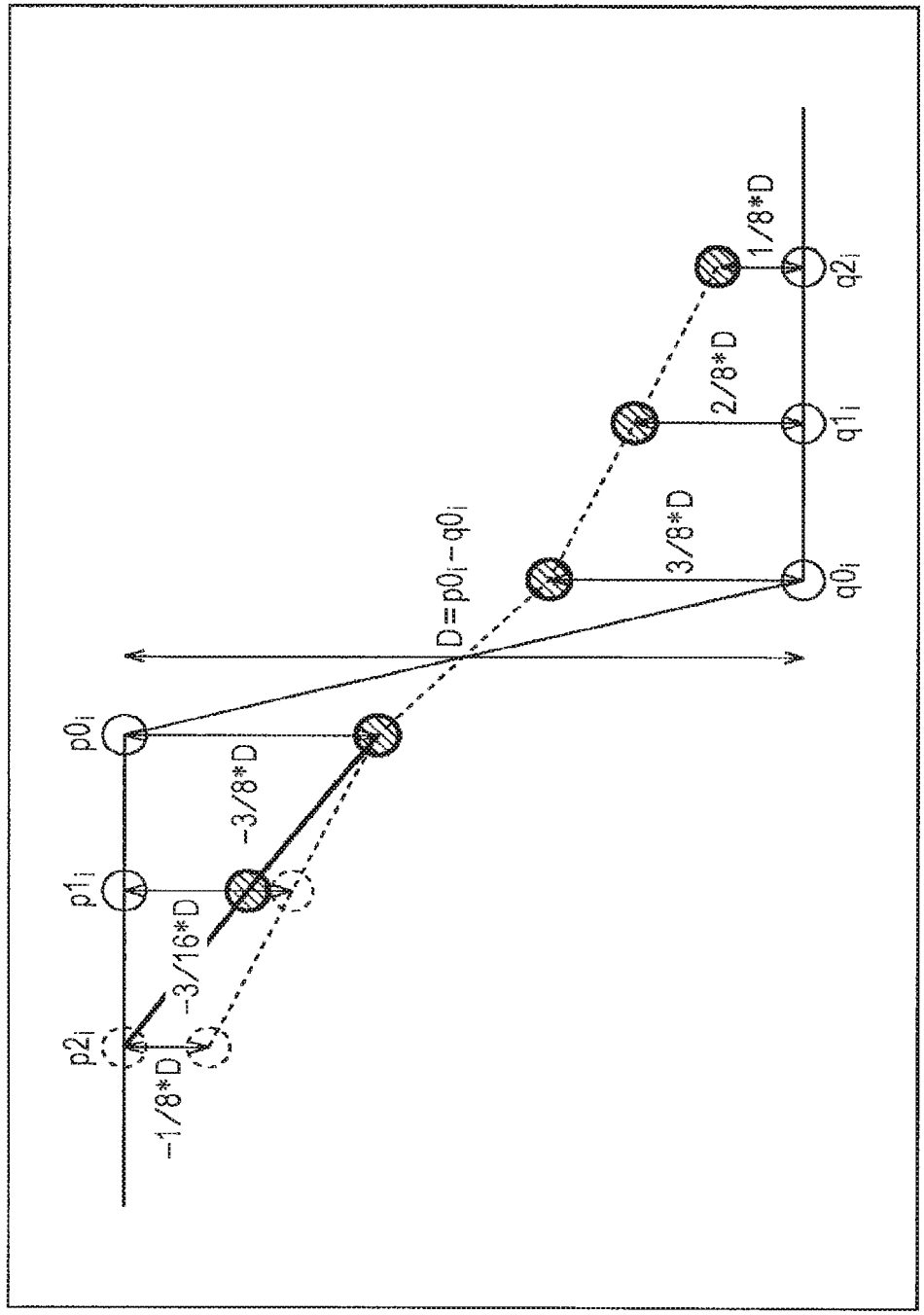
FIG. 28 is a diagram for describing an example of the R3W2 case.

Next, the R3W2 case will be described with reference to FIG. 28. In the example of FIG. 28, white circles on solid line indicate pixel values of the respective pixels $p2_i$, $p1_i$, $p0_i$, $q0_i$, $q1_i$, and $q2_i$ near the boundary BB illustrated in FIG. 16 before the deblocking filter. As illustrated in FIG. 28, a gap between the blocks BKu and BKl is $D=p0_i-q0_i$.

Moreover, circles on dot line indicate the respective pixel values after strong filtering of luminance signals in the HEVC scheme. That is, in this case, the difference between the pixel values before and after the strong filtering is $1/8*D$ for $q2_i$, $2/8*D$ for $q1_i$, and $3/8*D$ for $q0_i$. Similarly, the difference between the pixel values before and after the strong filtering is $3/8*D$ for $p0_i$, $2/8*D$ for $p1_i$, and $1/8*D$ for $p2_i$.

Here, considering the luminance signal filtering process for the R3W2 case, the pixel $p2_i$ is not subjected to filtering. That is, the pixel $p2_i$ has a pixel value indicated by a dot circle on the solid line, and a difference to the pixel value $p1_i$ indicated by the dot line increases. Thus, the pixel values have an abrupt slope only between the pixel values of $p2_i$ indicated by the dot circle on the solid line and $p1_i$ indicated by the dot line.

Thus, in the R3W2 case, in order to make this slope gentle, a difference $\Delta p1_i$ between the pixel value (white circle) of $p0_i$ before filtering and the pixel value (hatched circle) after strong filtering is expressed by Expression (112) below.

[Mathematical formula 34]

$$\Delta p1_i = 1/16*(-3*D+2*4) \quad (112)$$
$$= (-3*(p0_i+q0_i)+8) >> 4$$
$$= (13*p0_i+3*q0_i+8) >> 4 - p1_i$$
$$\approx (4*p2_i+5*p1_i+4*p0_i+3*q0_i+8) >> 4 - p1_i$$

That is, Expression (112) is derived so that $\Delta p1_i$ takes $3/16*D$ which is a half of the difference $\Delta p0_i$ between the pixel value (white circle) of $p0_i$ before filtering and the pixel value (hatched circle) after strong filtering.

Since the second term on the right side of the last approximation equation of Expression (112) is the pixel value (white circle) before filtering, the first term on the right side of the last approximation equation of Expression (112) represents the pixel value after strong filtering, of $p1_i$ indicated by the hatched circle.

That is, the coefficients multiplied to the respective pixel values in the first term on the right side of the last approximation equation of Expression (112) are used as the coefficients of the strong filtering for the R3W2 case. As a result, the results of the strong filtering for the R3W2 case can be made gentle as compared to the slope of the dot line of the conventional technique as indicated by the slope of the bold line in FIG. 28.

The determination expression for strong filtering of the R3W2 case is expressed by Expression (113) below.

[Mathematical formula 35]

$$d<(\beta>>2)$$

$$d=abs(q2_2-2*q1_2+q0_2)+abs(p2_5-2*p1_5+p0_5)+abs(q2_2-2*q1_2+q0_2)+abs(q2_5-2*q1_5+q0_5)$$

and $(|p2_i-p0_i|+|q0_i-q3_i|)<(\beta>>3)$ and $|p0_i-q0_i|<((5*t_c+1)>>1)$ \quad (113)

An expression appearing after the first "and" of Expression (113) for determining the strong filtering of the R3W2 case is different from an expression appearing after the first "and" of Expression (69) for determining the strong filtering of the HEVC scheme. In the case of R3W2, since $p3_i$ could not be referred, padding (that is, $p3_i=p2_i$) is not applied.

Thus, the two expressions are different only in that the expression "$(|p3_i-p0_i<<1|+q0_i-q3_i|)<(\beta>>3))$" appearing after the first "and" of Expression (69) is changed to the expression "$(|p2_i-p0_i<<1|+q0_i-q3_i|)<(\beta>>3))$" appearing after the first "and" of Expression (113).

Moreover, in the strong filtering of the R3W2 case, an expression relating to $p1_0$ is different from that of Expression (52) for the strong filtering of the HEVC scheme according to Expression (112) described above as illustrated in Expression (114).

[Mathematical formula 36]

$$p_1=\text{Clip}_{0-255}((4*p2_i+5*p1_i+4*p0_i+3*q0_i+8)>>4);$$
$$i=0,7 \quad (114)$$

In the strong filtering of the R3W2 case, Expression (54) relating to $P2_0$ of the strong filtering of the HEVC scheme is not necessary and is omitted.

In this manner, the strong filtering of the R3W2 case can be performed without deteriorating the accuracy.

Moreover, in the present specification, the size of the processing units of the deblocking filter may be the size of macroblocks of the H.264/AVC, the size of coding tree blocks of the HEVC coding units, and the like, for example. Moreover, in the present specification, the term block or macroblock also includes a coding unit (CU), a prediction unit (PU), and a transform unit (TU) in the context of HEVC.

A series of processes described in this specification can be performed by hardware, software, or a combination thereof. When the processes are performed by software, a program including the process sequence can be installed in and executed by a memory of a computer assembled into exclusive hardware. Alternatively, the program can be installed in and executed by a general-purpose computer performing various processes.

For example, the program may be recorded in advance in a hard disk or a read only memory (ROM) as a recording medium. Alternatively, the program may be recorded temporarily or permanently on a magnetic disk (such as a flexible disk), an optical disk (such as a CD-ROM (compact disc read only memory), a MO (magneto optical) disc, or a DVD (digital versatile disc)), and a removable storage medium (not shown) (such as a semiconductor memory), for example. Such a removable storage medium may be provided as so-called package software.

The program may be wirelessly transferred from a download site to the computer or may be transferred through wires to the computer via a network such as a local area network (LAN) or the Internet in addition to installing the program in the computer from the removable recording medium described above. The computer can receive the program transferred in this manner and install the same in a recording medium such as a built-in hard disk.

19. Tenth Embodiment

[Application to Multi-View Image Encoding and Decoding]

Figure 29:
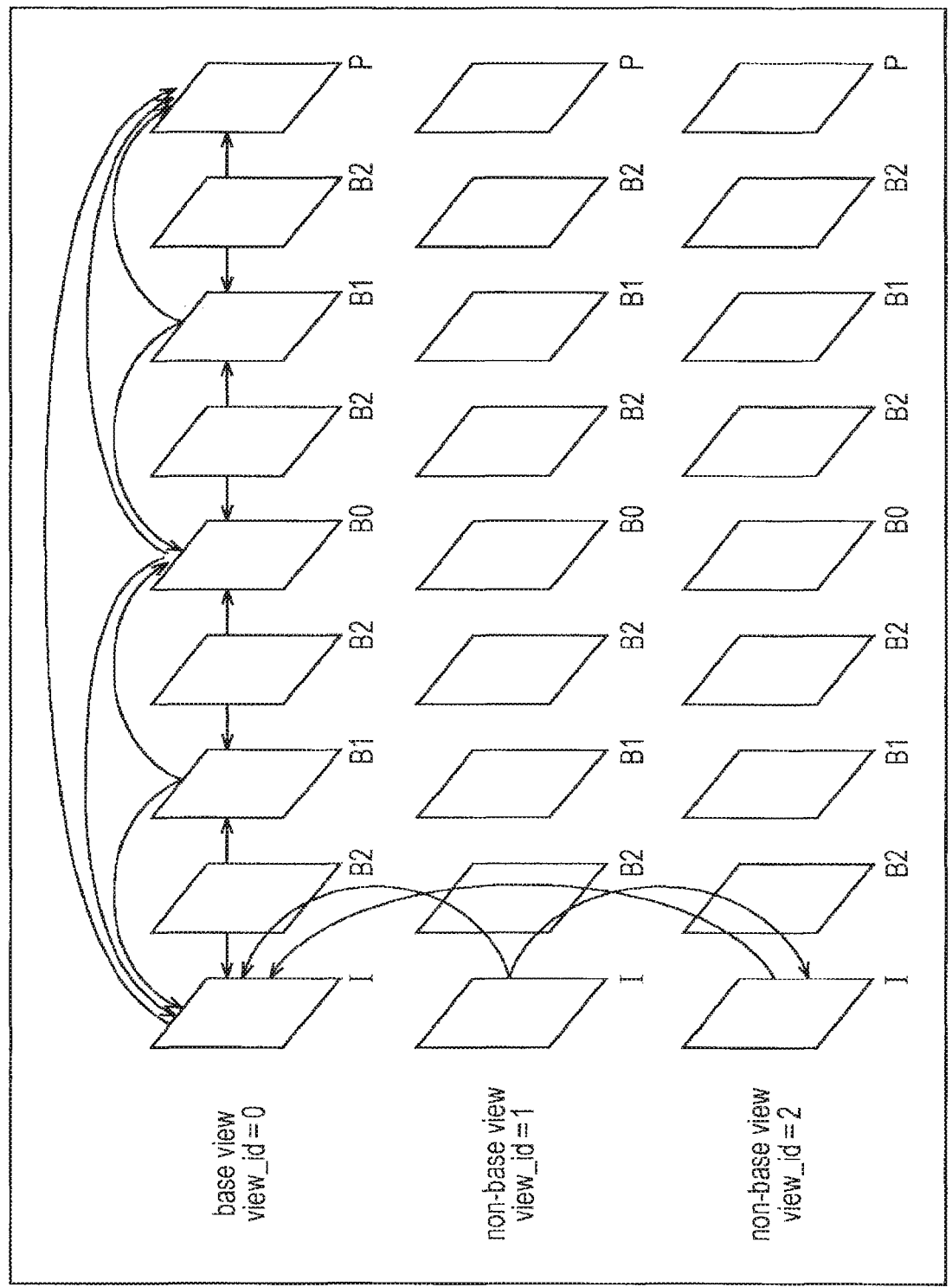
FIG. 29 is a diagram illustrating an example of a multi-view image encoding scheme.

The series of processes can be applied to multi-view image encoding and decoding. FIG. 29 illustrates an example of a multi-view image encoding scheme.

As illustrated in FIG. 29, a multi-view image includes images of a plurality of views, and an image of a predetermined single view among the plurality of views is designated as a base view image. The respective view images other than the base view image are treated as non-base view images.

When the multi-view image as illustrated in FIG. 29 is encoded, in the respective views (same views), the parameters (for example, a clipping value and a multiplication factor relating to tc of the clipping value) relating to the clipping process for strong filtering can be set. Moreover, in the respective views (different views), the parameters relating the clipping process for strong filtering set to the other views can be shared.

In this case, the parameters relating to the clipping process set to a base view are used in at least one non-base view. Alternatively, for example, the parameters relating to the clipping process set to a non-base view (view_id=0) are used in at least one of the base view and a non-base view (view_id=1).

Further, in the respective views (same views), the parameters relating to the clipping process for strong filtering can be set. Moreover, in the respective views (different views), the parameters relating the clipping process for strong filtering set to the other views can be shared.

In this case, the parameters relating to the clipping process set to a base view are used in at least one non-base view. Alternatively, for example, the parameters relating to the clipping process set to a non-base view (view_id=0) are used in at least one of the base view and a non-base view (view_id=1).

In this manner, it is possible to allow the deblocking process to apply filtering appropriately.

[Multi-View Image Encoding Device]

Figure 30:
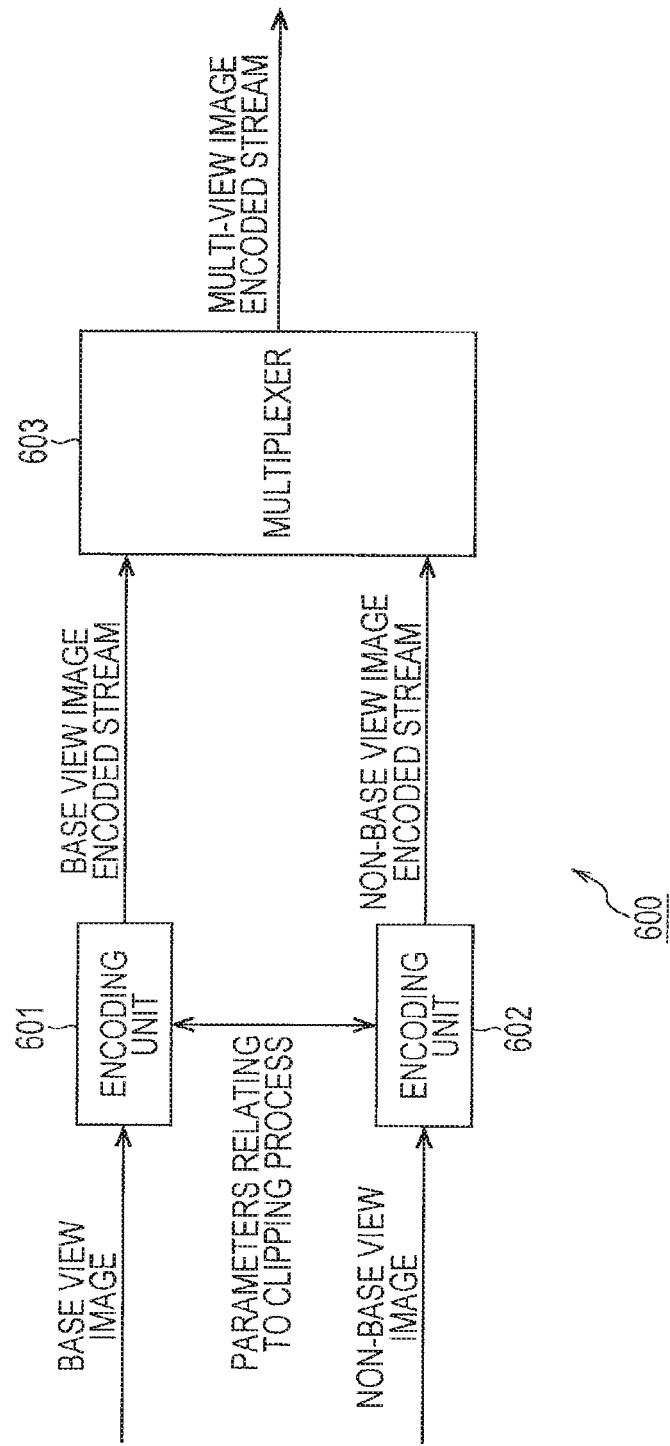
FIG. 30 is a diagram illustrating an example of main components of a multi-view image encoding device to which the present technique is applied.

FIG. 30 is a diagram illustrating a multi-view image encoding device that performs the multi-view image encoding described above. As illustrated in FIG. 30, a multi-view image encoding device 600 includes an encoding unit 601, an encoding unit 602, and a multiplexer 603.

The encoding unit 601 encodes a base view image to generate a base view image encoded stream. The encoding unit 602 encodes a non-base view image to generate a non-base view image encoded stream. The multiplexer 603 multiplexes the base view image encoded stream generated by the encoding unit 601 and the non-base view image encoded stream generated by the encoding unit 602 to generate a multi-view image encoded stream.

The image encoding device 10 (FIG. 1) can be applied to the encoding units 601 and 602 of the multi-view image encoding device 600. In this case, the multi-view image encoding device 600 sets the parameters relating to the clipping process for strong filtering set by the encoding unit 601 and the parameters relating to the clipping process for strong filtering set by the encoding unit 602 and transfers the parameters.

As described above, the parameters relating to the clipping process for strong filtering set by the encoding unit 601 may be transferred so as to be shared by the encoding units 601 and 602. Conversely, the parameters relating to the clipping process for strong filtering set by the encoding unit 602 may be transferred so as to be shared by the encoding units 601 and 602.

[Multi-View Image Decoding Device]

Figure 31:
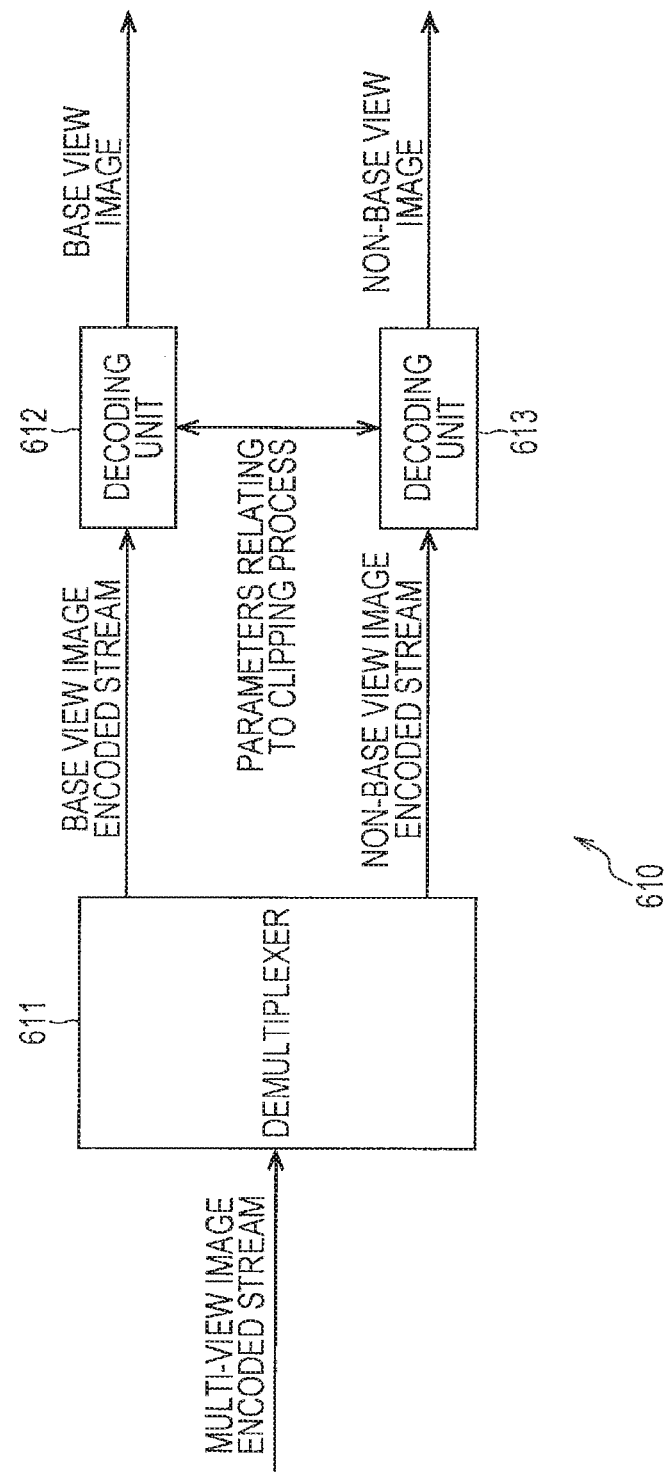
FIG. 31 is a diagram illustrating an example of main components of a multi-view image decoding device to which the present technique is applied.

FIG. 31 is a diagram illustrating a multi-view image decoding device that performs the multi-view image decoding described above. As illustrated in FIG. 31, a multi-view image decoding device 610 includes a demultiplexer 611, a decoding unit 612, and a decoding unit 613.

The demultiplexer 611 demultiplexes the multi-view image encoded stream in which the base view image encoded stream and the non-base view image encoded stream are multiplexed to extract the base view image encoded stream and the non-base view image encoded stream. The decoding unit 612 decodes the base view image encoded stream extracted by the demultiplexer 611 to obtain a base view image. The decoding unit 613 decodes the non-base view image encoded stream extracted by the demultiplexer 611 to obtain a non-base view image.

The image decoding device 50 (FIG. 6) can be applied to the decoding units 612 and 613 of the multi-view image decoding device 610. In this case, the multi-view image decoding device 610 performs the process using the parameters relating to the clipping process for strong filtering, that are set by the encoding unit 601 and decoded by the decoding unit 612 and the parameters relating to the clipping process for strong filtering, that are set by the encoding unit 602 and decoded by the decoding unit 613.

As described above, there is a case where the parameters relating to the clipping process for strong filtering set by the encoding unit 601 (or the encoding 602) are transferred so as to be shared by the encoding units 601 and 602. In this case, the multi-view image decoding device 610 performs the process using the parameters relating to the clipping process for strong filtering, that are set by the encoding unit 601 (or the encoding 602) and decoded by the decoding unit 612 (or the decoding unit 613).

18. Eleventh Embodiment

[Application to Layer Image Encoding and Decoding]

Figure 32:
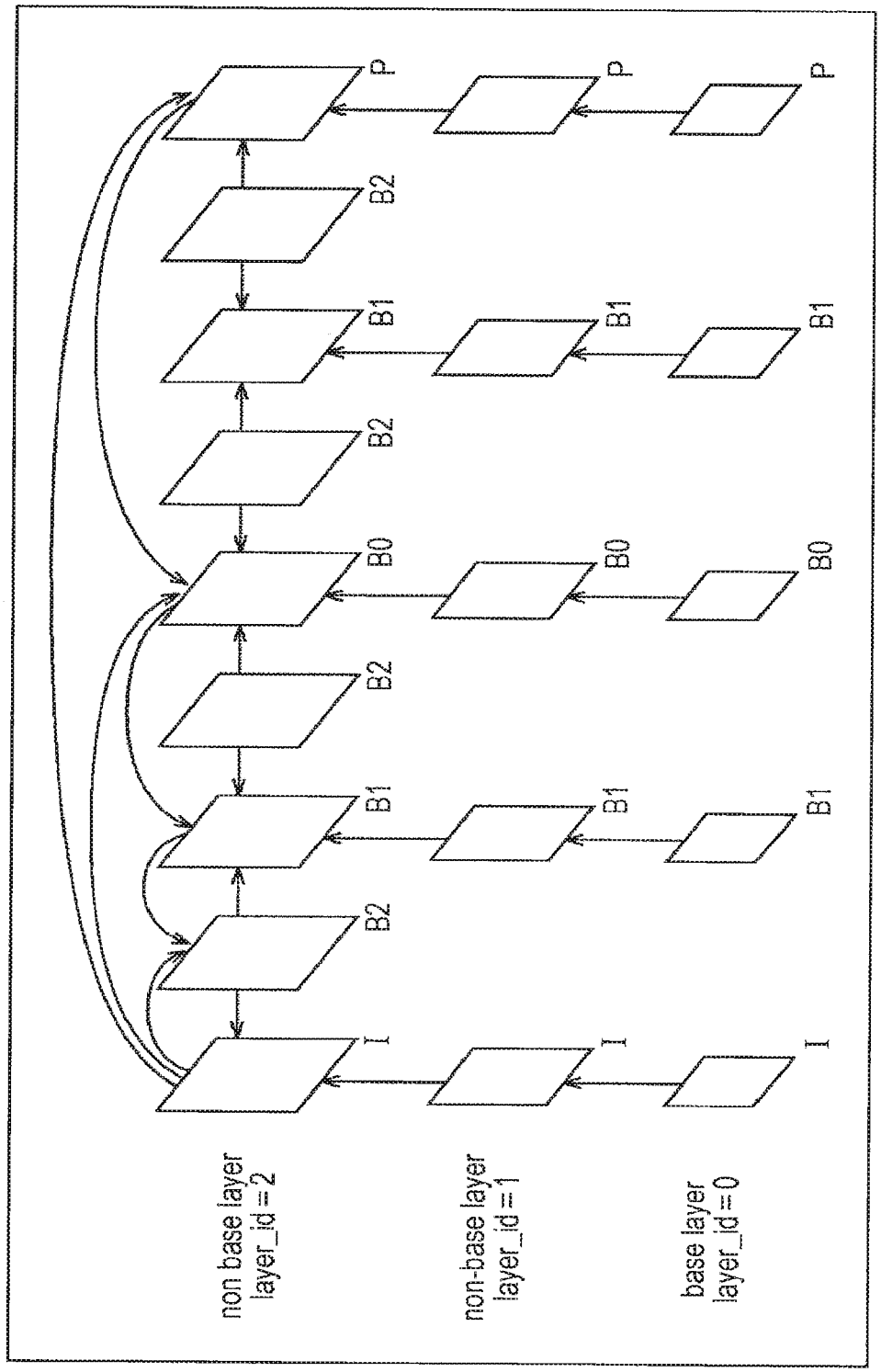
FIG. 32 is a diagram illustrating an example of a layer image encoding scheme.

The above series of processes can be applied to layer image encoding and decoding. FIG. 32 illustrates an example of a multi-view image encoding scheme.

As illustrated in FIG. 32, a layer image includes images of a plurality of layers (resolutions), and an image of a predetermined single layer among the plurality of resolutions is designated as a base layer image. The respective layer images other than the base layer image are treated as non-base layer images.

When the layer image encoding (space scalability) as illustrated in FIG. 32 is performed, in the respective layers (same layers), the parameters relating to the clipping process for strong filtering can be set. Moreover, in the respective layers (different layers), the parameters relating to the clipping process for strong filtering set to the other layers can be shared.

In this case, the parameters relating to the clipping process for strong filtering set to a base layer are used in at least one non-base layer. Alternatively, for example, the parameters relating to the clipping process for strong filtering set to a non-base layer (layer_id=0) are used in at least one of the base layer and a non-base layer (layer_id=1).

Further, in the respective layers (same layers), the parameters relating to the clipping process for strong filtering can be set. Moreover, in the respective layers (different layers), the parameters relating to the clipping process for strong filtering set to the other views can be shared.

In this case, the parameters relating to the clipping process for strong filtering set to a base layer are used in at least one non-base layer. Alternatively, for example, the parameters relating to the clipping process for strong filtering set to a non-base layer (layer_id=0) are used in at least one of the base layer and a non-base layer (layer_id=1).

In this manner, it is possible to allow the deblocking process to apply filtering appropriately.

[Layer Image Encoding Device]

Figure 33:
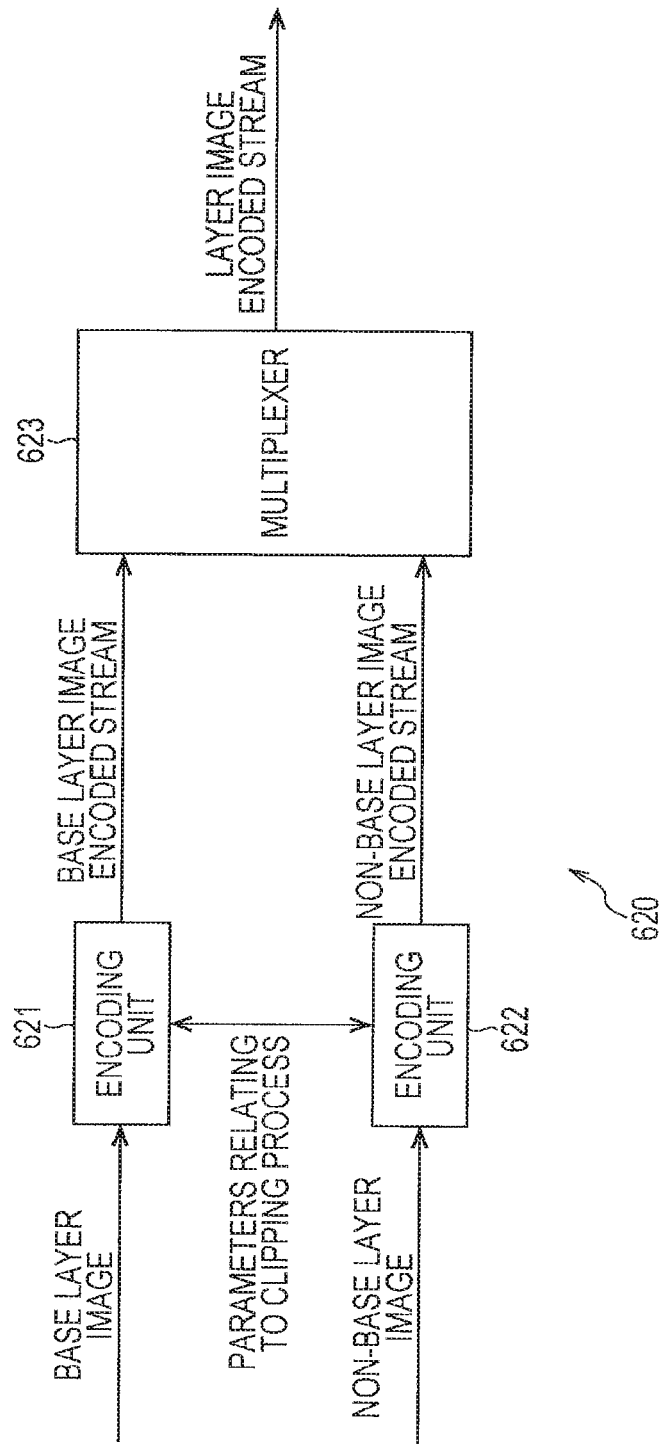
FIG. 33 is a diagram illustrating an example of main components of a layer image encoding device to which the present technique is applied.

FIG. 33 is a diagram illustrating a layer image encoding device that performs the layer image encoding described above. As illustrated in FIG. 33, a layer image encoding device 620 includes an encoding unit 621, an encoding unit 622, and a multiplexer 623.

The encoding unit 621 encodes a base layer image to generate a base layer image encoded stream. The encoding unit 622 encodes a non-base layer image to generate a non-base layer image encoded stream. The multiplexer 623 multiplexes the base layer image encoded stream generated by the encoding unit 621 and the non-base layer image encoded stream generated by the encoding unit 622 to generate a layer image encoded stream.

The image encoding device 10 (FIG. 1) can be applied to the encoding units 621 and 622 of the layer image encoding device 620. In this case, the layer image encoding device 620 sets the parameters relating to the clipping process for strong filtering set by the encoding unit 621 and the parameters relating to the clipping process for strong filtering set by the encoding unit 602 and transfers the parameters.

As described above, the parameters relating to the clipping process for strong filtering set by the encoding unit 621 may be transferred so as to be shared by the encoding units 621 and 622. Conversely, the parameters relating to the clipping process for strong filtering set by the encoding unit 622 may be transferred so as to be shared by the encoding units 621 and 622.

[Layer Image Decoding Device]

Figure 34:
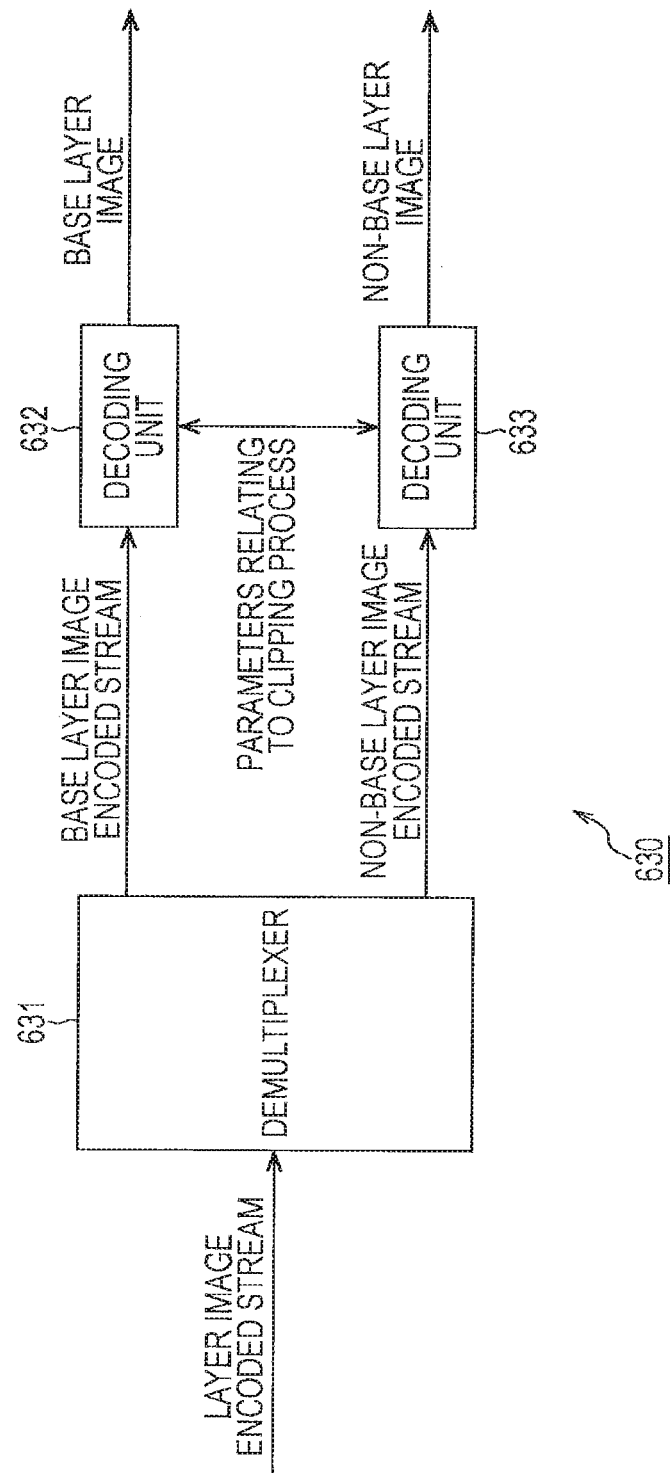
FIG. 34 is a diagram illustrating an example of main components of a layer image decoding device to which the present technique is applied.

FIG. 34 is a diagram illustrating a layer image decoding device that performs the layer image decoding described above. As illustrated in FIG. 34, a layer image decoding device 630 includes a demultiplexer 631, a decoding unit 632, and a decoding unit 633.

The demultiplexer 631 demultiplexes the layer image encoded stream in which the base layer image encoded stream and the non-base layer image encoded stream are multiplexed to extract the base layer image encoded stream and the non-base layer image encoded stream. The decoding unit 632 decodes the base layer image encoded stream extracted by the demultiplexer 631 to obtain a base layer image. The decoding unit 633 decodes the non-base layer image encoded stream extracted by the demultiplexer 631 to obtain a non-base layer image.

The image decoding device 50 (FIG. 6) can be applied to the decoding units 632 and 633 of the multi-view image decoding device 630. In this case, the multi-view image decoding device 630 performs the process using the parameter relating to the clipping process for strong filtering, that are set by the encoding unit 621 and decoded by the decoding unit 632 and the parameters relating to the clipping process for strong filtering, that are set by the encoding unit 622 and decoded by the decoding unit 633.

As described above, there is a case where the parameters relating to the clipping process for strong filtering set by the encoding unit 621 (or the encoding 622) are transferred so as to be shared by the encoding units 621 and 622. In this case, the multi-view image decoding device 630 performs the process using the parameters relating to the clipping process for strong filtering, that are set by the encoding unit 621 (or the encoding 622) and decoded by the decoding unit 632 (or the decoding unit 633).

19. Application Example

The image encoding device 10 and the image decoding device 50 according to the above-described embodiments can be applied to various electronic apparatuses such as a transmitter or a receiver that distributes signals on cable broadcasting (such as satellite broadcasting or a cable TV) or on the Internet and distributes signals to a terminal by cellular communication, a recording device that records images on a medium such as an optical disc, a magnetic disk, or a flash memory, or a reproducing device that reproduces images from these storage media. Four application examples will be described below.

First Application Example

Figure 35:
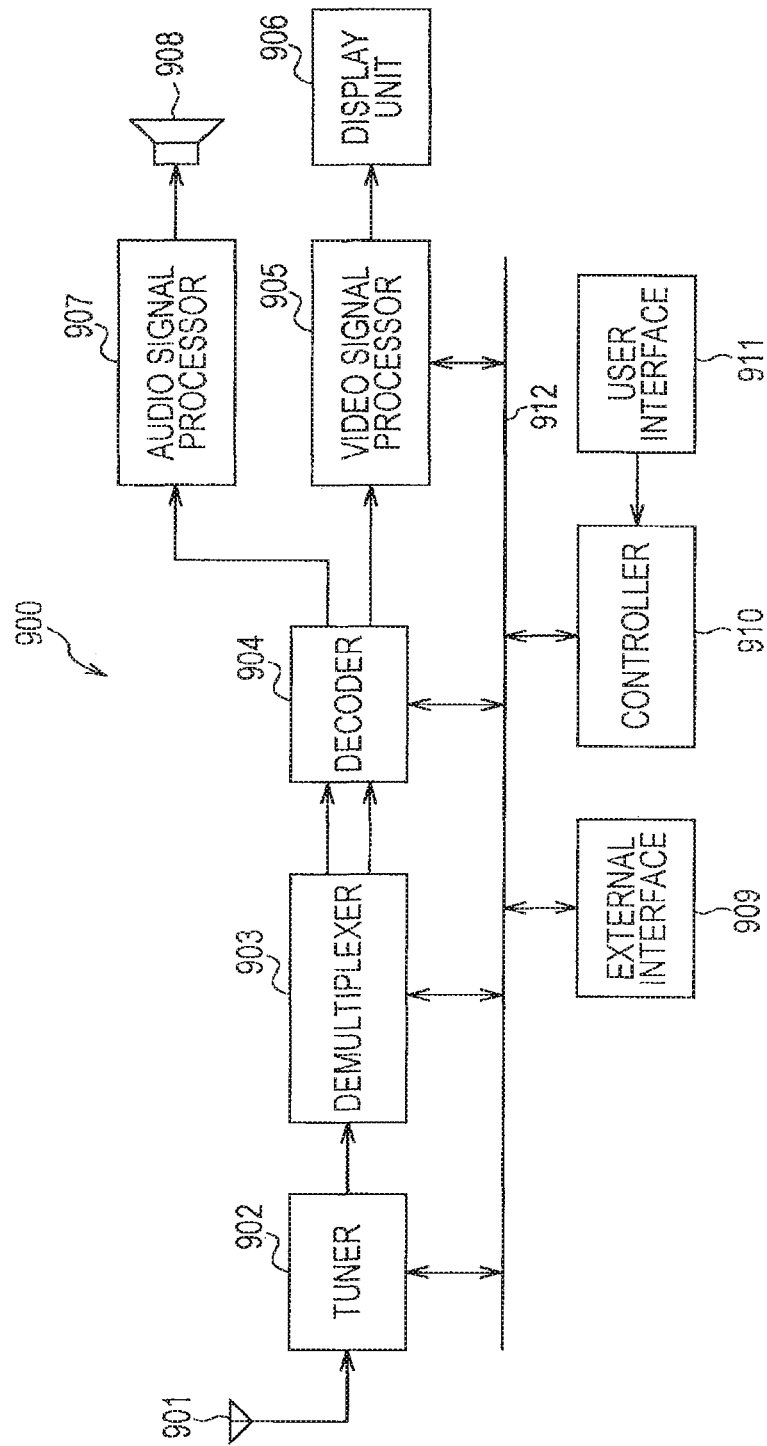
FIG. 35 is a diagram illustrating an example of a schematic configuration of a television apparatus.

FIG. 35 illustrates an example of a schematic configuration of a television apparatus to which the above-described embodiment is applied. A television apparatus 900 includes an antenna 901, a tuner 902, a demultiplexer 903, a decoder 904, a video signal processor 905, a display unit 906, an audio signal processor 907, a speaker 908, and an external interface 909. The television apparatus 900 further includes a controller 910, a user interface 911, and the like.

The tuner 902 extracts a signal of a desired channel from a broadcast signal received through the antenna 901 and demodulates the extracted signal. Then, the tuner 902 outputs an encoded bit stream obtained by demodulation to the demultiplexer 903. That is, the tuner 902 serves as transmitting means in the television apparatus 900, which receives the encoded stream in which the image is encoded.

The demultiplexer 903 separates a video stream and an audio stream of a program to be watched from the encoded bit stream and outputs each separated stream to the decoder 904. Moreover, the demultiplexer 903 extracts auxiliary data such as EPG (Electronic Program Guide) from the encoded bit stream and supplies the extracted data to the controller 910. The demultiplexer 903 may descramble when the encoded bit stream is scrambled.

The decoder 904 decodes the video stream and the audio stream input from the demultiplexer 903. Then, the decoder 904 outputs video data generated by a decoding process to the video signal processor 905. Moreover, the decoder 904 outputs audio data generated by the decoding process to the audio signal processor 907.

The video signal processor 905 reproduces the video data input from the decoder 904 and allows the display unit 906 to display video. The video signal processor 905 may also allow the display unit 906 to display an application screen supplied through the network. The video signal processor 905 may also perform an additional process such as noise removal, for example, to the video data according to setting. Further, the video signal processor 905 may generate a GUI (Graphical User Interface) image such as a menu, a button, and a cursor, for example, and superimpose the generated image on an output image.

The display unit 906 is driven by a drive signal supplied from the video signal processor 905 to display the video or image on a video screen of a display device (for example, a liquid crystal display, a plasma display, an OLED, and the like).

The audio signal processor 907 performs a reproducing process such as D/A conversion and amplification to the audio data input from the decoder 904 and allows the speaker 908 to output the audio. The audio signal processor 907 may also perform an additional process such as the noise removal to the audio data. The external interface 909 is the interface for connecting the television apparatus 900 and an external device or the network. For example, the video stream or the audio stream received through the external interface 909 may be decoded by the decoder 904. That is, the external interface 909 also serves as the transmitting means in the television apparatus 900, which receives the encoded stream in which the image is encoded.

The controller 910 includes a processor such as a central processing unit (CPU) and a memory such as a random access memory (RAM) and a read only memory (ROM). The memory stores the program executed by the CPU, program data, the EPG data, data obtained through the network and the like. The program stored in the memory is read by the CPU at startup of the television apparatus 900 to be executed, for example. The CPU controls operation of the television apparatus 900 according to an operation signal input from the user interface 911, for example, by executing the program.

The user interface 911 is connected to the controller 910. The user interface 911 includes a button and a switch for the user to operate the television apparatus 900, a receiver of a remote control signal and the like, for example. The user interface 911 detects operation by the user through the components to generate the operation signal and outputs the generated operation signal to the controller 910.

The bus 912 connects the tuner 902, the demultiplexer 903, the decoder 904, the video signal processor 905, the audio signal processor 907, the external interface 909, and the controller 910 to one another.

In the television apparatus 900 configured in this manner, the decoder 904 has the functions of the image decoding device 50 according to the above-described embodiment. Therefore, when images are decoded in the television apparatus 900, the deblocking filtering process can apply filtering appropriately.

Second Application Example

Figure 36:
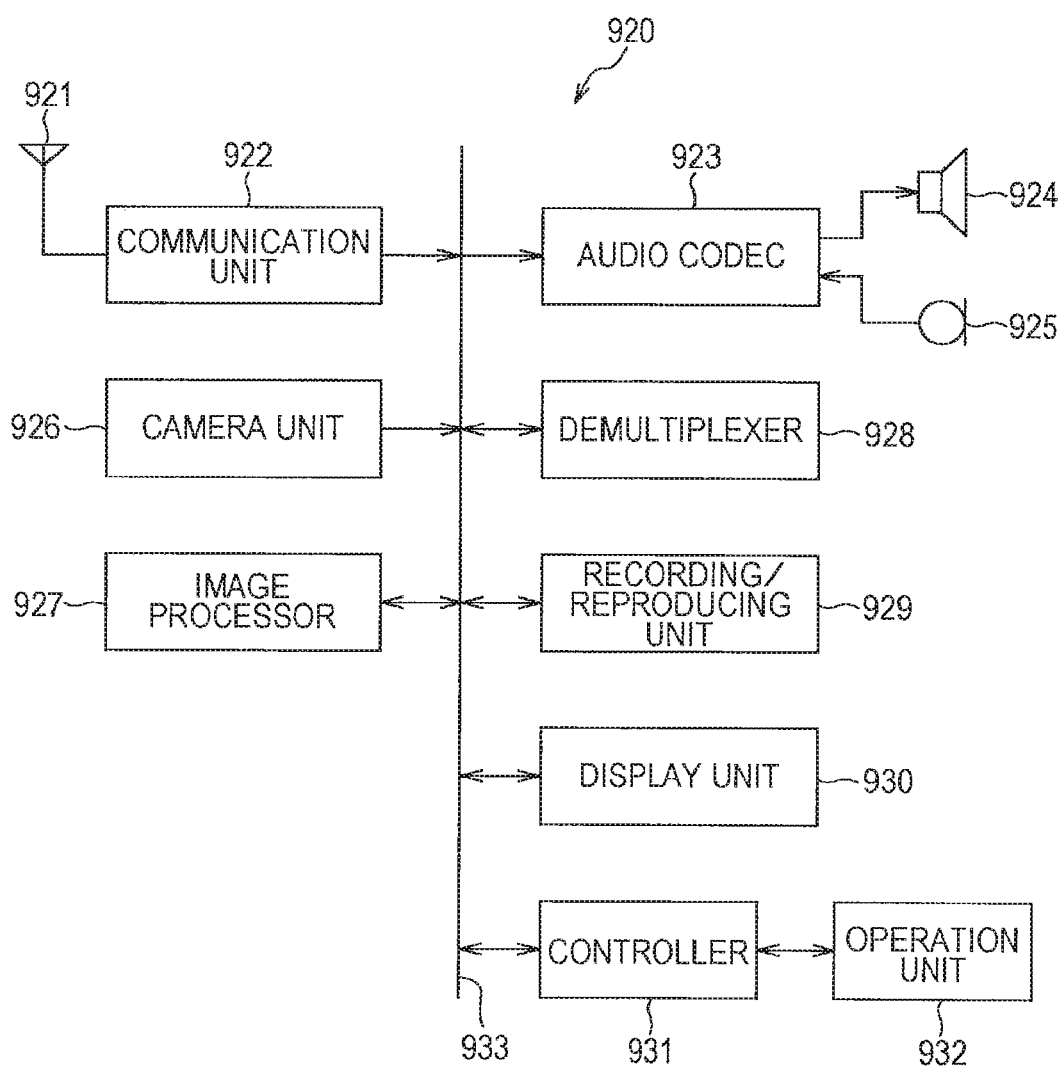
FIG. 36 is a diagram illustrating an example of a schematic configuration of a mobile phone.

FIG. 36 illustrates an example of a schematic configuration of a mobile phone to which the above-described embodiment is applied. A mobile phone 920 includes an antenna 921, a communication unit 922, an audio codec 923, a speaker 924, a microphone 925, a camera unit 926, an image processor 927, a demultiplexer 928, a recording/reproducing unit 929, a display unit 930, a controller 931, an operation unit 932, and a bus 933.

The antenna 921 is connected to the communication unit 922. The speaker 924 and the microphone 925 are connected to the audio codec 923. The operation unit 932 is connected to the controller 931. The bus 933 connects the communication unit 922, the audio codec 923, the camera unit 926, the image processor 927, the demultiplexer 928, the recording/reproducing unit 929, the display unit 930, and the controller 931 to one another.

The mobile phone 920 performs operation such as transmission/reception of an audio signal, transmission/reception of an e-mail or image data, image taking, and recording of data in various operation modes including an audio communication mode, a data communication mode, an imaging mode, and a television-phone mode.

In the audio communication mode, an analog audio signal generated by the microphone 925 is supplied to the audio codec 923. The audio codec 923 converts the analog audio signal to the audio data and A/D converts the converted audio data to compress. Then, the audio codec 923 outputs the compressed audio data to the communication unit 922. The communication unit 922 encodes and modulates the audio data to generate a transmission signal. Then, the communication unit 922 transmits the generated transmission signal to a base station (not illustrated) through the antenna 921. Moreover, the communication unit 922 amplifies a wireless signal received through the antenna 921 and applies frequency conversion to the same to obtain a reception signal. Then, the communication unit 922 generates the audio data by demodulating and decoding the reception signal and outputs the generated audio data to the audio codec 923. The audio codec 923 expands the audio data and D/A converts the same to generate the analog audio signal. Then, the audio codec 923 supplies the generated audio signal to the speaker 924 to allow the same to output the audio.

In the data communication mode, for example, the controller 931 generates character data composing the e-mail according to the operation by the user through the operation unit 932. Moreover, the controller 931 allows the display unit 930 to display characters. The controller 931 generates e-mail data according to a transmission instruction from the user through the operation unit 932 to output the generated e-mail data to the communication unit 922. The communication unit 922 encodes and modulates the e-mail data to generate the transmission signal. Then, the communication unit 922 transmits the generated transmission signal to the base station (not illustrated) through the antenna 921. Moreover, the communication unit 922 amplifies the wireless signal received through the antenna 921 and applies the frequency conversion to the same to obtain the reception signal. Then, the communication unit 922 demodulates and decodes the reception signal to restore the e-mail data and outputs the restored e-mail data to the controller 931. The controller 931 allows the display unit 930 to display contents of the e-mail data and allows the storage medium of the recording/reproducing unit 929 to store the e-mail data.

The recording/reproducing unit 929 includes an arbitrary readable/writable storage medium. For example, the storage medium may be a built-in storage medium such as the RAM and the flash memory and may be an externally-mounted storage medium such as the hard disc, the magnetic disc, the magneto-optical disc, the optical disc, a USB memory, and a memory card.

In the imaging mode, for example, the camera unit 926 takes an image of an object to generate the image data and outputs the generated image data to the image processor 927. The image processor 927 encodes the image data input from the camera unit 926 and stores the encoded stream in the storage medium of the recording/reproducing unit 929.

Moreover, in the television-phone mode, for example, the demultiplexer 928 multiplexes the video stream encoded by the image processor 927 and the audio stream input from the audio codec 923 and outputs the multiplexed stream to the communication unit 922. The communication unit 922 encodes and modulates the stream to generate the transmission signal. Then, the communication unit 922 transmits the generated transmission signal to the base station (not illustrated) through the antenna 921. Moreover, the communication unit 922 amplifies the wireless signal received through the antenna 921 and applies the frequency conversion to the same to obtain the reception signal. The transmission signal and the reception signal may include the encoded bit stream. Then, the communication unit 922 restores the stream by demodulating and decoding the reception signal and outputs the restored stream to the demultiplexer 928. The demultiplexer 928 separates the video stream and the audio stream from the input stream and outputs the video stream and the audio stream to the image processor 927 and the audio codec 923, respectively. The image processor 927 decodes the video stream to generate the video data. The video data is supplied to the display unit 930 and a series of images is displayed by the display unit 930. The audio codec 923 expands the audio stream and D/A converts the same to generate the analog audio signal. Then, the audio codec 923 supplies the generated audio signal to the speaker 924 to output the audio.

In the mobile phone 920 configured in this manner, the image processor 927 has the functions of the image encoding device 10 and the image decoding device 50 according to the above-described embodiment. Therefore, when images are encoded and decoded in the mobile phone 920, the deblocking filtering process can apply filtering appropriately.

Third Application Example

Figure 37:
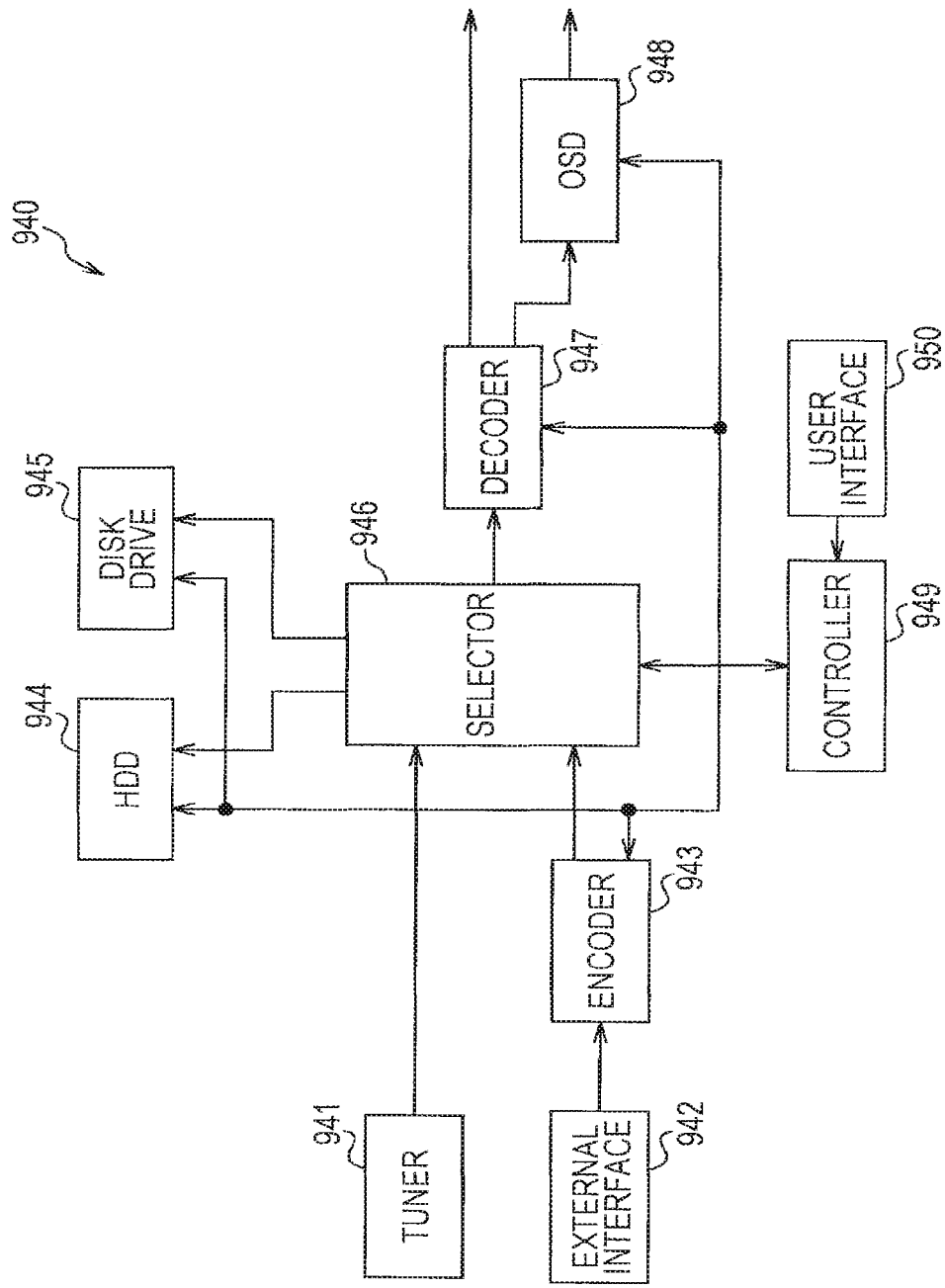
FIG. 37 is a diagram illustrating an example of a schematic configuration of a recording/reproducing device.

FIG. 37 illustrates an example of a schematic configuration of the recording/reproducing device to which the above-described embodiment is applied. The recording/reproducing device 940 encodes the audio data and the video data of a received broadcast program to record on the recording medium, for example. Moreover, the recording/reproducing device 940 may encode the audio data and the video data obtained from another apparatus to record on the recording medium, for example. Moreover, the recording/reproducing device 940 reproduces the data recorded on the recording medium by a monitor and the speaker according to the instruction of the user. In this case, the recording/reproducing device 940 decodes the audio data and the video data.

The recording/reproducing device 940 includes a tuner 941, an external interface 942, an encoder 943, a HDD (Hard Disk Drive) 944, a disk drive 945, a selector 946, a decoder 947, an OSD (On-Screen Display) 948, a controller 949, and a user interface 950.

The tuner 941 extracts a signal of a desired channel from the broadcast signal received through an antenna (not illustrated) and demodulates the extracted signal. Then, the tuner 941 outputs the encoded bit stream obtained by the demodulation to the selector 946. That is, the tuner 941 serves as the transmitting means in the recording/reproducing device 940.

The external interface 942 is the interface for connecting the recording/reproducing device 940 and the external device or the network. The external interface 942 may be an IEEE1394 interface, a network interface, a USB interface, a flash memory interface and the like, for example. For example, the video data and the audio data received through the external interface 942 are input to the encoder 943. That is, the external interface 942 serves as the transmitting means in the recording/reproducing device 940.

The encoder 943 encodes the video data and the audio data when the video data and the audio data input from the external interface 942 are not encoded. Then, the encoder 943 outputs the encoded bit stream to the selector 946.

The HDD 944 records the encoded bit stream in which content data such as the video and the audio are compressed, various programs and other data on an internal hard disc. The HDD 944 reads the data from the hard disc when reproducing the video and the audio.

The disk drive 945 records and reads the data on and from the mounted recording medium. The recording medium mounted on the disk drive 945 may be the DVD disc (DVD-Video, DVD-RAM, DVD-R, DVD-RW, DVD+R, DVD+RW and the like), a Blu-ray (registered trademark) disc and the like, for example. The selector 946 selects the encoded bit stream input from the tuner 941 or the encoder 943 and outputs the selected encoded bit stream to the HDD 944 or the disk drive 945 when recording the video and the audio. Moreover, the selector 946 outputs the encoded bit stream input from the HDD 944 or the disk drive 945 to the decoder 947 when reproducing the video and the audio.

The decoder 947 decodes the encoded bit stream to generate the video data and the audio data. Then, the decoder 947 outputs the generated video data to the OSD 948. Moreover, the decoder 904 outputs the generated audio data to an external speaker. The OSD 948 reproduces the video data input from the decoder 947 to display the video. The OSD 948 may also superimpose the GUI image such as the menu, the button, and the cursor, for example, on the displayed video.

The controller 949 includes the processor such as the CPU and the memory such as the RAM and ROM. The memory stores the program executed by the CPU, the program data and the like. The program stored in the memory is read by the CPU to be executed on activation of the recording/reproducing device 940, for example. The CPU controls operation of the recording/reproducing device 940 according to an operation signal input from the user interface 950, for example, by executing the program.

The user interface 950 is connected to the controller 949. The user interface 950 includes a button and a switch for the user to operate the recording/reproducing device 940 and a receiver of a remote control signal, for example. The user interface 950 detects operation by the user through the components to generate the operation signal and outputs the generated operation signal to the controller 949.

In the recording/reproducing device 940 configured in this manner, the encoder 943 has the functions of the image encoding device 10 according to the above-described embodiment. Moreover, the decoder 947 has the functions of the image decoding device 50 according to the above-described embodiment. Therefore, when images are encoded and decoded in the recording/reproducing device 940, the deblocking filtering process can apply filtering appropriately.

Fourth Application Example

Figure 38:
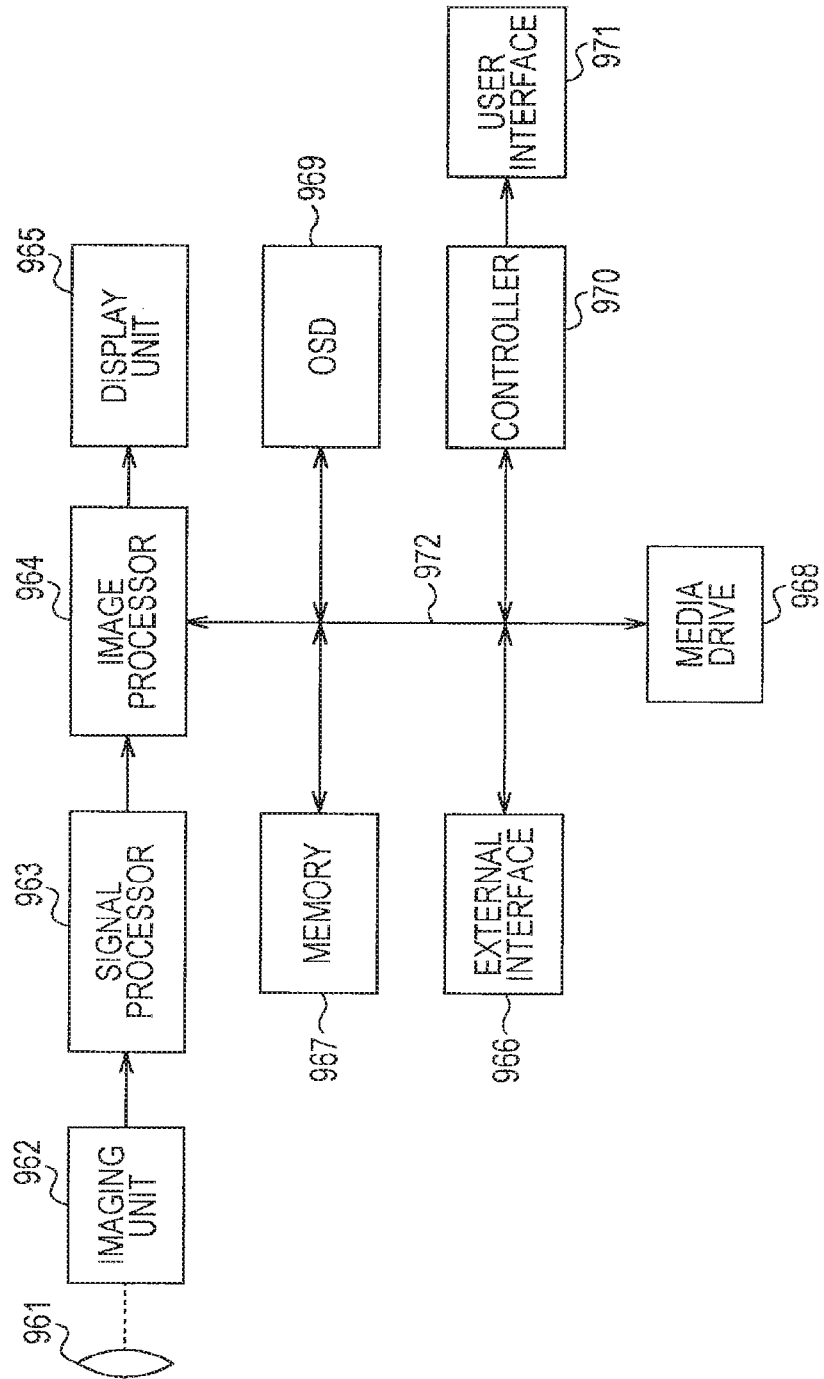
FIG. 38 is a diagram illustrating an example of a schematic configuration of an imaging device.

FIG. 38 illustrates an example of a schematic configuration of an imaging device to which the above-described embodiment is applied. An imaging device 960 images an object to generate the image, encodes the image data, and records the same on a recording medium.

The imaging device 960 includes an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 includes a focus lens, a diaphragm mechanism, and the like. The optical block 961 forms an optical image of the object on an imaging surface of the imaging unit 962. The imaging unit 962 includes an image sensor such as a CCD and a CMOS and converts the optical image formed on the imaging surface to an image signal as an electric signal by photoelectric conversion. Then, the imaging unit 962 outputs the image signal to the signal processor 963.

The signal processor 963 performs various camera signal processes such as knee correction, gamma correction, or color correction to the image signal input from the imaging unit 962. The signal processor 963 outputs the image data after the camera signal process to the image processor 964.

The image processor 964 encodes the image data input from the signal processor 963 to generate the encoded data. Then, the image processor 964 outputs the generated encoded data to the external interface 966 or the media drive 968. Moreover, the image processor 964 decodes the encoded data input from the external interface 966 or the media drive 968 to generate the image data. Then, the image processor 964 outputs the generated image data to the display unit 965. The image processor 964 may also output the image data input from the signal processor 963 to the display unit 965 to display the image. The image processor 964 may also superimpose data for display obtained from the OSD 969 on the image output to the display unit 965.

The OSD 969 generates the GUI image such as the menu, the button, and the cursor, for example, and outputs the generated image to the image processor 964.

The external interface 966 is configured as an USB input/output terminal, for example. The external interface 966 connects the imaging device 960 and a printer when printing the image, for example. Moreover, a drive is connected to the external interface 966 as necessary. The removable medium such as the magnetic disc and the optical disc is mounted on the drive, for example, and the program read from the removable medium may be installed on the imaging device 960. Further, the external interface 966 may be configured as a network interface connected to the network such as a LAN and the Internet. That is, the external interface 966 serves as the transmitting means in the imaging device 960.

The recording medium mounted on the media drive 968 may be an arbitrary readable/writable removable medium such as the magnetic disc, the magneto-optical disc, the optical disc, and the semiconductor memory, for example. Moreover, the recording medium may be fixedly mounted on the media drive 968 to form a non-portable storage unit such as a built-in hard disk drive or SSD (Solid State Drive), for example.

The controller 970 includes the processor such as the CPU and the memory such as the RAM and the ROM. The memory stores the program executed by the CPU and the program data. The program stored in the memory is read by the CPU at startup of the imaging device 960 to be executed, for example. The CPU controls operation of the imaging device 960 according to the operation signal input from the user interface 971, for example, by executing the program.

The user interface 971 is connected to the controller 970. The user interface 971 includes a button, a switch and the like for the user to operate the imaging device 960, for example. The user interface 971 detects the operation by the user through the components to generate the operation signal and outputs the generated operation signal to the controller 970.

The bus 972 connects the image processor 964, the external interface 966, the memory 967, the media drive 968, the OSD 969, and the controller 970 to one another.

In the imaging device 960 configured in this manner, the image processor 964 has the functions of the image encoding device 10 and the image decoding device 50 according to the above-described embodiment. Therefore, when images are encoded and decoded in the imaging device 960, the deblocking filtering process can apply filtering appropriately.

In the present specification, an example in which various types of information such as the parameters relating to the clipping process for strong filtering are multiplexed into encoded streams and are transmitted from the encoding side to the decoding side has been described. However, a method of transmitting these items of information is not limited to this example. For example, these items of information may be transmitted or recorded as separate data associated with the encoded bit stream rather than being multiplexed into the encoded bit stream. Here, the term "associate" means that the image (or part of the image such as a slice and a block) included in the bit stream and information corresponding to the image can be linked with each other at the time of decoding. That is, the information may be transmitted on a transmission line other than that of the image (or bit stream). Moreover, the information may be recorded on another recording medium (or another recording area of the same recording medium) other than that of the image (or bit stream). Further, the information and the image (or bit stream) may be associated with each other in optional units such as a plurality of frames, one frame, or a part of the frame, for example.

Furthermore, the present technique is not to be interpreted as being limited to the above-described embodiments. The embodiments disclose the present technique in an exemplary and illustrative form, and it is obvious that modifications and substitutions may occur to those skilled in the art without departing from the spirit of the present technique. In other words, the spirit of the present technique should be determined in consideration of the claims.

Note that the image processing device of this technique may include the following constitutions.

(1) An image processing device including:

a decoding unit that decodes an encoded stream encoded in units each having a layer structure to generate an image;

a filtering unit that applies a deblocking filter to a block boundary according to a strength of the deblocking filter applied to the block boundary which is a boundary between a block of the image generated by the decoding unit and an adjacent block adjacent to the block; and a controller that controls the filtering unit so that, when strong filtering is applied as the strength of the deblocking filter, a clipping process is applied to the deblocking filter with respect to luminance components of the image generated by the decoding unit.

(2) The image processing device according to (1), wherein the controller applies the clipping process to values of parts that change when the deblocking filter is applied.

(3) The image processing device according to (2), wherein the controller applies the clipping process according to the following expressions:

$$p0_i = p0_i + \text{Clip}_{(-pv)-(pv)}((p2_i + 2*p1_i - 6*p0_i + 2*q0_i + q1_i + 4) \gg 3);$$

$$q0_i = q0_i + \text{Clip}_{(-pv)-(pv)}((p1_i + 2*p0_i - 6*q0_i + 2*q1_i + q2_i + 4) \gg 3);$$

$$p1_i = p1_i + \text{Clip}_{(-pv)-(pv)}((p2_i - 3*p1_i + p0_i + q0_i + 2) \gg 2);$$

$$q1_i = q1_i + \text{Clip}_{(-pv)-(pv)}((p0_i + q0_i - 3*q1_i + q2_i + 2) \gg 2)$$

$$p2_i = p2 + \text{Clip}_{(-pv)-(pv)}((2*p2_i - 5*p2_i + p1_i + p0_i + q0_i + 4) >> 3);$$

$$q2_i = q2_i + \text{Clip}_{(-pv)-(pv)}((p0_i + q0_i + p1_i - 5*q2_i + 2*q3_i + 4) >> 3);$$ [Mathematical formula 37]

where i=0, 7 and pv is a clipping value.

(4) The image processing device according to (3), wherein
the controller sets a value that is integer multiples of parameters of the deblocking filter as the clipping value used when the clipping process is performed.

(5) The image processing device according to (4), wherein
the controller sets a value that is twice the parameters of the deblocking filter as the clipping value used when the clipping process is performed.

(6) The image processing device according to any of (1) to (5), further including:
a filter strength determining unit that determines the strength of the deblocking filter applied to the block boundary, wherein
the filtering unit applies the deblocking filter to the block boundary according to the strength determined by the filter strength determining unit, and
the controller controls the filtering unit so that, when the filter strength determining unit determines that strong filtering is to be applied, a clipping process is applied to the deblocking filter with respect to the luminance components of the image generated by the decoding unit.

(7) The image processing device according to (6), wherein
the filter strength determining unit determines the strength of the deblocking filter using a plurality of lines as processing units.

(8) The image processing device according to (7), wherein
the filter strength determining unit determines the strength of the deblocking filter using four lines as the processing units.

(9) The image processing device according to (7), further including:
a filtering necessity determining unit that determines whether the deblocking filter is to be applied to the block boundary using a plurality of lines as processing units, wherein
the filter strength determining unit determines the strength of the deblocking filter when the filtering necessity determining unit determines that the deblocking filter is to be applied.

(10) An image processing method for allowing an image processing device to execute:
decoding an encoded stream encoded in units each having a layer structure to generate an image;
applying a deblocking filter to a block boundary according to a strength of the deblocking filter applied to the block boundary which is a boundary between a block of the generated image and an adjacent block adjacent to the block; and
controlling so that, when strong filtering is applied as the strength of the deblocking filter, a clipping process is applied to the deblocking filter with respect to luminance components of the generated image.

(11) An image processing device including:
a filtering unit that applies a deblocking filter to a block boundary according to a strength of the deblocking filter applied to the block boundary which is a boundary between a block of an image locally decoded when an image is encoded and an adjacent block adjacent to the block;
a controller that controls the filtering unit so that, when strong filtering is applied as the strength of the deblocking filter, a clipping process is applied to the deblocking filter with respect to luminance components of the locally decoded image; and
an encoding unit that encodes the image in units each having a layer structure using an image to which the deblocking filter is applied.

(12) The image processing device according to (11), wherein
the controller applies the clipping process to values of parts that change when the deblocking filter is applied.

(13) The image processing device according to (12), wherein
the controller applies the clipping process according to the following expressions:

$$p0_i = p0_i + \text{Clip}_{(-pv)-(pv)}((p2_i + 2*p1_i - 6*p0_i + 2*q0_i + q0_i + 4) >> 3);$$

$$q0_i = q0_i + \text{Clip}_{(-pv)-(pv)}((p1_i + 2*p0_i - 6*q0_i + 2*q1_i + q2_i + 4) >> 3)$$

$$p1_i = p1_i + \text{Clip}_{(-pv)-(pv)}((p2_i - 3*p1_i + p0_i + q0_i + 2) >> 2);$$

$$q1_i = q1_i + \text{Clip}_{(-pv)-(pv)}((p0_i + q0_i - 3*q1_i + q2_i + 2) >> 2);$$

$$p2_i = p2_i + \text{Clip}_{(-pv)-(pv)}((2*p2_i - 5*p2_i + p1_i + p0_i + q0_i + 4) >> 3);$$

$$q2_i = q2_i + \text{Clip}_{(-pv)-(pv)}((p0_i + q0_i + p1_i - 5*q2_i + 2*q3_i + 4) >> 3);$$ [Mathematical formula 38]

where i=0, 7 and pv is a clipping value.

(14) The image processing device according to (13), wherein
the controller sets a value that is integer multiples of parameters of the deblocking filter as the clipping value used when the clipping process is performed.

(15) The image processing device according to (14), wherein
the controller sets a value that is twice the parameters of the deblocking filter as the clipping value used when the clipping process is performed.

(16) The image processing device according to any of (11) to (15), further including:
a filter strength determining unit that determines the strength of the deblocking filter applied to the block boundary, wherein
the filtering unit applies the deblocking filter to the block boundary according to the strength determined by the filter strength determining unit, and
the controller controls the filtering unit so that, when the filter strength determining unit determines that strong filtering is to be applied, a clipping process is applied to the deblocking filter with respect to the luminance components of the image generated by the decoding unit.

(17) The image processing device according to (16), wherein
the filter strength determining unit determines the strength of the deblocking filter using a plurality of lines as processing units.

(18) The image processing device according to (17), wherein
the filter strength determining unit determines the strength of the deblocking filter using four lines as the processing units.

(19) The image processing device according to (17), further including:
a filtering necessity determining unit that determines whether the deblocking filter is to be applied to the block boundary using a plurality of lines as processing units, wherein
the filter strength determining unit determines the strength of the deblocking filter when the filtering necessity determining unit determines that the deblocking filter is to be applied.

(20) An image processing method for allowing an image processing device to execute:

applying a deblocking filter to a block boundary according to a strength of the deblocking filter applied to the block boundary which is a boundary between a block of an image locally decoded when an image is encoded and an adjacent block adjacent to the block;

controlling so that, when strong filtering is applied as the strength of the deblocking filter, a clipping process is applied to the deblocking filter with respect to luminance components of the locally decoded image; and encoding the image in units each having a layer structure using an image to which the deblocking filter is applied.

REFERENCE SIGNS LIST

10: Image encoding device
11: A/D converter
12, 57: Frame reordering buffer
13: Subtractor
14: Orthogonal transformer
15: Quantizer
16: Lossless encoder
17: Accumulation buffer
18: Rate controller
21, 53: Inverse quantizer
22, 54: Inverse orthogonal transformer
23, 55: Adder
24, 56: Deblocking filtering unit
25, 61: Frame memory
26, 62, 65: Selector
31, 63: Intra predictor
32: Motion estimator/compensator
33: Predicted image/optimal mode selecting unit
50: Image decoding device
51: Accumulation buffer
52: Lossless decoder
61: Frame memory
64: Motion compensation unit
71: Image memory
72, 72-1: Block boundary determining unit
72-2: Line boundary/block boundary determining unit
73, 73-1: Filter strength determining unit
73-2: Line boundary filter strength determining unit
74, 74-1: Filter operation unit
74-2: Line boundary filter operation unit
75: Selector
76: Coefficient memory
77: Controller
77A, 77B: Intra-LCU line determining unit
241: Line memory
242: Line boundary detecting unit
243: Filter strength determining unit
244: Coefficient memory
245: Filter operation unit
246: Filter controller
2451: Data storage unit
2452: Data selecting unit
2453, 2455, 2456: Arithmetic processing unit
2457: Data selecting unit
2461: Line boundary determining unit

The invention claimed is:

1. An image processing device comprising:
a filtering unit configured to apply a deblocking filter to pixels neighboring a block boundary within a locally decoded image in an encoding process, the deblocking filter including a first deblocking filter and a second deblocking filter having a stronger filter strength than the first deblocking filter; and a controller configured to control, in a case that only the second deblocking filter is applied to the pixels neighboring the block boundary by the filtering unit, the second deblocking filter so as to apply a second clipping process different from a first clipping process to a difference value changed by the second deblocking filter, by using a second clipping value which is larger than a first clipping value, the first clipping value being a parameter based on a quantization parameter and used in case that the first clipping process is applied to a difference value changed by the first deblocking filter, and the second clipping value being integer multiples of the parameter.

2. The image processing device according to claim 1, wherein
the controller is configured to apply, as the condition that the second deblocking filter is applied, the second clipping process to the difference value changed by the second deblocking filter, using the second clipping value according to the following expressions:

$$
\begin{aligned}
p0' &= p0 + Clip_{(-pv)-(pv)}((p2 + 2*p1 - 6*p0 + \\
&\quad 2*q0 + q1 + 4) >> 3); \\
&= Clip_{(p0-pv)-(p0+pv)}((p2 + 2*p1 + 2*p0 + 2* \\
&\quad q0 + q1 + 4) >> 3) \\
&= Clip3(p0 - pv, p0 + pv, (p2 + 2*p1 + \\
&\quad 2*p0 + 2*q0 + q1 + 4) >> 3);
\end{aligned}
$$

$$
\begin{aligned}
p1' &= p1 + Clip_{(-pv)-(pv)}((p2 - 3*p1 + p0 + \\
&\quad q0 + 2) >> 2); \\
&= Clip_{(p1-pv)-(p1+pv)}((p2 + p1 + p0 + \\
&\quad q0 + 2) >> 2); \\
&= Clip3(p1 - pv, p1 + pv, (p2 + p1 + \\
&\quad p0 + q0 + 2) >> 2);
\end{aligned}
$$

$$
\begin{aligned}
p2' &= p2 + Clip_{(-pv)-(pv)}((2*p3 - 5*p2 + p1 + \\
&\quad p0 + q0 + 4) >> 3); \\
&= Clip_{(p2-pv)-(p2+pv)}((2*p3 + 3*p2 + p1 + \\
&\quad p0 + q0 + 4) >> 3); \\
&= Clip3(p2 - pv, p2 + pv, (2*p3 + 3*p2 + \\
&\quad p1 + p0 + q0 + 4) >> 3);
\end{aligned}
$$

$$
\begin{aligned}
q0' &= q0 + Clip_{(-pv)-(pv)}((p1 + 2*p0 - 6*q0 + \\
&\quad 2*q1 + q2 + 4) >> 3); \\
&= Clip_{(q0-pv)-(q0+pv)}((p1 + 2*p0 + 2*q0 + 2* \\
&\quad q1 + q2 + 4) >> 3); \\
&= Clip3(q0 - pv, q0 + pv, (p1 + 2*p0 + 2* \\
&\quad q0 + 2*q1 + q2 + 4) >> 3);
\end{aligned}
$$

$$
\begin{aligned}
q1' &= q1 + Clip_{(-pv)-(pv)}((p0 + q0 - 3*q1 + q2 + \\
&\quad 2) >> 2); \\
&= Clip_{(q1-pv)-(q1+pv)}((p0 + q0 + q1 + \\
&\quad q2 + 2) >> 2); \\
&= Clip3(q1 - pv, q1 + pv, (p0 + q0 + \\
&\quad q1 + q2 + 2) >> 2);
\end{aligned}
$$

$$q2' = q2 + Clip_{(-pv)-(pv)}((p0+q0+q1-5*q2+2* \\ q3+4)>>3);$$
$$= Clip_{(q2-pv)-(q2+pv)}((p0+q0+q1+3*q2+2 \\ q3+4)>>3);$$
$$= Clip3(q2-pv, q2+pv, (p0+q0+ \\ q1+3*q2+2*q3+4)>>3);$$

wherein the pv is the second clipping value,
p0', p1', p2', q0', q1', q2' are the pixel values after applying the second deblocking filter, and
p0, p1, p2, q0, q1, q2 are the pixel values before applying the second deblocking filter.

3. The image processing device according to claim 1, wherein
the controller is configured to apply the second clipping process to the difference value changed by the second deblocking filter using, as the second clipping value, the parameter used in case that a strength of the deblocking filter is selected.

4. The image processing device according to claim 3, wherein
the controller is configured to apply the second clipping process to the difference value changed by the second deblocking filter using a value that is twice the parameter as the second clipping value.

5. The image processing device according to claim 4, wherein
the controller is configured to apply, as the condition that the second deblocking filter is applied, the second clipping process to the difference value change by the second deblocking filter using the second clipping value according to the following expressions:

$$p0' = p0 + Clip_{(-2*tc)-(2*tc)}((p2+2*p1-6*p0+2*q0+q1+4)>>3);$$
$$= Clip_{(p0-2*tc)-(p0+2*tc)}((p2+2*p1+2*p0+2*q0+q1+4)>>3);$$
$$= Clip3(p0-2*tc, p0+2*tc, (p2+2*p1+2*p0+2*q0+q1+4)>>3);$$

$$p1' = p1 + Clip_{(-2*tc)-(2*tc)}((p2-3*p1+p0+q0+2)>>2);$$
$$= Clip_{(p1-2*tc)-(p1+2*tc)}((p2+p1+p0+q0+2)>>2);$$
$$= Clip3(p1-2*tc, p1+2*tc, (p2+p1+p0+q0+2)>>2)$$

$$p2' = p2 + Clip_{(-2*tc)-(2*tc)}((2*p3-5*p2+p1+p0+q0+4)>>3);$$
$$= Clip_{(p2-2*tc)-(p2+2*tc)}((2*p3+3*p2+p1+p0+q0+4)>>3);$$
$$= Clip3(p2-2*tc, p2+2*tc, (2*p3+3*p2+p1+p0+q0+4)>>3);$$

$$q0' = q0 + Clip_{(-2*tc)-(2*tc)}((p1+2*p0-6*q0+2*q1+q2+4)>>3);$$
$$= Clip_{(q0-2*tc)-(q0+2*tc)}((p1+2*p0+2*q0+2*q1+q2+4)>>3);$$
$$= Clip3(q0-2*tc, q0+2*tc, (p1+2*p0+2*q0+2*q1+q2+4)>>3);$$

$$q1' = q1 + Clip_{(-2*tc)-(2*tc)}((p0+q0-3*q1+q2+2)>>2);$$
$$= Clip_{(q1-2*tc)-(q1+2*tc)}((p0+q0+q1+q2+2)>>2);$$
$$= Clip3(q1-2*tc, q1+2*tc, (p0+q0+q1+q2+2)>>2)$$

$$q2' = q2 + Clip_{(-2*tc)-(2*tc)}((p0+q0+q1-5*q2+2*q3+4)>>3);$$
$$= Clip_{(q2-2*tc)-(q2+2*tc)}((p0+q0+q1+3*q2+2*q3+4)>>3);$$
$$= Clip3(q2-2*tc, q2+2*tc, (p0+q0+q1+3*q2+2*q3+4)>>3);$$

wherein tc is the parameter used in case that the strength of the deblocking filter is selected, p0', p1', p2', q0', q1', q2' are the pixel values after applying the second deblocking filter, and
p0, p1, p2, q0, q1, q2 are the pixel values before applying the second deblocking filter.

6. The image processing device according to claim 5, wherein
the filtering unit is configured to apply the second deblocking filter to the luminance components of the pixels neighboring the block boundary within the locally decoded image.

7. The image processing device according to claim 6, wherein
the first deblocking filter is a weak filter applied to four pixels neighboring the block boundary; and
the second deblocking filter is a strong filter applied to six pixels neighboring the block boundary.

8. The image processing device according to claim 6, wherein
wherein the block boundary is a boundary of a transform unit as a unit of orthogonal transformation or a boundary of a prediction unit as a unit of prediction process.

9. An image processing method comprising:
applying a deblocking filter to pixels neighboring a block boundary within a locally decoded image in an encoding process, the deblocking filter including a first deblocking filter and a second deblocking filter having a stronger filter strength than the first deblocking filter; and
controlling, in a case that only the second deblocking filter is applied t the pixels neighboring the block boundary, the second deblocking filter so as to apply a second clipping process different from a first clipping process to a difference value changed by the second deblocking filter, by using a second clipping value which is larger than a first clipping value, the first clipping value being a parameter based on a quantization parameter and used in case that the first clipping process is applied to a difference value changed by the first deblocking filter, and the second clipping value being integer multiples of the parameter.

10. The image processing method according to claim 9, wherein
applying, as the condition that the second deblocking filter is applied, the second clipping process to the difference value changed by the second deblocking filter, using the second clipping value according to the following expressions:

$$p0' = p0 + Clip_{(-pv)-(pv)}((p2+2*p1-6*p0+ \\ 2*q0+q1+4)>>3);$$
$$= Clip_{(p0-pv)-(p0+pv)}((p2+2*p1+2*p0+2* \\ q0+q1+4)>>3)$$
$$= Clip3(p0-pv, p0+pv, (p2+2*p1+2* \\ p0+2*q0+q1+4)>>3);$$

-continued $$p1' = p1 + Clip_{(-pv)-(pv)}((p2 - 3*p1 + p0 + q0 + 2) >> 2);$$
$$= Clip_{(p1-pv)-(p1+pv)}((p2 + p1 + p0 + q0 + 2) >> 2);$$
$$= Clip3(p1 - pv, p1 + pv, (p2 + p1 + p0 + q0 + 2) >> 2);$$

$$p2' = p2 + Clip_{(-pv)-(pv)}((2*p3 - 5*p2 + p1 + p0 + q0 + 4) >> 3);$$
$$= Clip_{(p2-pv)-(p2+pv)}((2*p3 + 3*p2 + p1 + p0 + q0 + 4) >> 3);$$
$$= Clip3(p2 - pv, p2 + pv, (2*p3 + 3*p2 + p1 + p0 + q0 + 4) >> 3);$$

$$q0' = q0 + Clip_{(-pv)-(pv)}((p1 + 2*p0 - 6*q0 + 2*q1 + q2 + 4) >> 3);$$
$$= Clip_{(q0-pv)-(q0+pv)}((p1 + 2*p0 + 2*q0 + 2*q1 + q2 + 4) >> 3);$$
$$= Clip3(q0 - pv, q0 + pv, (p1 + 2*p0 + 2*q0 + 2*q1 + q2 + 4) >> 3);$$

$$q1' = q1 + Clip_{(-pv)-(pv)}((p0 + q0 - 3*q1 + q2 + 2) >> 2);$$
$$= Clip_{(q1-pv)-(q1+pv)}((p0 + q0 + q1 + q2 + 2) >> 2);$$
$$= Clip3(q1 - pv, q1 + pv, (p0 + q0 + q1 + q2 + 2) >> 2);$$

$$q2' = q2 + Clip_{(-pv)-(pv)}((p0 + q0 + q1 - 5*q2 + 2*q3 + 4) >> 3);$$
$$= Clip_{(q2-pv)-(q2+pv)}((p0 + q0 + q1 + 3*q2 + 2*q3 + 4) >> 3);$$
$$= Clip3(q2 - pv, q2 + pv, (p0 + q0 + q1 + 3*q2 + 2*q3 + 4) >> 3);$$

wherein the pv is the second clipping value,
p0', p1', p2', q0', q1', q2' are the pixel values after applying the second deblocking filter, and
p0, p1, p2, q0, q1, q2 are the pixel values before applying the second deblocking filter.

11. The image processing method according to claim 9, wherein
applying the second clipping process to the difference value changed by the second deblocking filter using, as the second clipping value, the parameter used in case that a strength of the deblocking filter is selected.

12. The image processing method according to claim 11, wherein
applying the second clipping process to the difference value changed by the second deblocking filter using a value that is plus or minus twice the parameter as the second clipping value.

13. The image processing method according to claim 12, wherein
applying, as the condition that the second deblocking filter is applied, the second clipping process to the difference value change by the second deblocking filter using the second clipping value according to the following expressions:

$$p0' = p0 + Clip_{(-2*tc)-(2*tc)}((p2 + 2*p1 - 6*p0 + 2*q0 + q1 + 4) >> 3);$$
$$= Clip_{(p0-2*tc)-(p0+2*tc)}((p2 + 2*p1 + 2*p0 + 2*q0 + q1 + 4) >> 3);$$
$$= Clip3(p0 - 2*tc, p0 + 2*tc, (p2 + 2*p1 + 2*p0 + 2*q0 + q1 + 4) >> 3);$$

$$p1' = p1 + Clip_{(-2*tc)-(2*tc)}((p2 - 3*p1 + p0 + q0 + 2) >> 2);$$
$$= Clip_{(p1-2*tc)-(p1+2*tc)}((p2 + p1 + p0 + q0 + 2) >> 2);$$
$$= Clip3(p1 - 2*tc, p1 + 2*tc, (p2 + p1 + p0 + q0 + 2) >> 2)$$

$$p2' = p2 + Clip_{(-2*tc)-(2*tc)}((2*p3 - 5*p2 + p1 + p0 + q0 + 4) >> 3);$$
$$= Clip_{(p2-2*tc)-(p2+2*tc)}((2*p3 + 3*p2 + p1 + p0 + q0 + 4) >> 3);$$
$$= Clip3(p2 - 2*tc, p2 + 2*tc, (2*p3 + 3*p2 + p1 + p0 + q0 + 4) >> 3);$$

$$q0' = q0 + Clip_{(-2*tc)-(2*tc)}((p1 + 2*p0 - 6*q0 + 2*q1 + q2 + 4) >> 3);$$
$$= Clip_{(q0-2*tc)-(q0+2*tc)}((p1 + 2*p0 + 2*q0 + 2*q1 + q2 + 4) >> 3);$$
$$= Clip3(q0 - 2*tc, q0 + 2*tc, (p1 + 2*p0 + 2*q0 + 2*q1 + q2 + 4) >> 3);$$

$$q1' = q1 + Clip_{(-2*tc)-(2*tc)}((p0 + q0 - 3*q1 + q2 + 2) >> 2);$$
$$= Clip_{(q1-2*tc)-(q1+2*tc)}((p0 + q0 + q1 + q2 + 2) >> 2);$$
$$= Clip3(q1 - 2*tc, q1 + 2*tc, (p0 + q0 + q1 + q2 + 2) >> 2)$$

$$q2' = q2 + Clip_{(-2*tc)-(2*tc)}((p0 + q0 + q1 - 5*q2 + 2*q3 + 4) >> 3);$$
$$= Clip_{(q2-2*tc)-(q2+2*tc)}((p0 + q0 + q1 + 3*q2 + 2*q3 + 4) >> 3);$$
$$= Clip3(q2 - 2*tc, q2 + 2*tc, (p0 + q0 + q1 + 3*q2 + 2*q3 + 4) >> 3);$$

wherein tc is the parameter used in case that the strength of the deblocking filter is selected, p0', p1', p2', q0', q1', q2' are the pixel values after applying the second deblocking filter, and
p0, p1, p2, q0, q1, q2 are the pixel values before applying the second deblocking filter.

14. The image processing method according to claim 13, wherein
applying the second deblocking filter to the luminance components of the pixels neighboring the block boundary within the locally decoded image.

15. The image processing method according to claim 14, wherein
the first deblocking filter is a weak filter applied to four pixels neighboring the block boundary; and
the second deblocking filter is a strong filter applied to six pixels neighboring the block boundary.

16. The image processing method according to claim 14, wherein
wherein the block boundary is a boundary of a transform unit as a unit of orthogonal transformation or a boundary of a prediction unit as a unit of prediction process.

17. An image processing device comprising:
circuitry configured to
apply a deblocking filter to pixels neighboring a block boundary within a locally decoded image in an encoding process, the deblocking filter including a first deblocking filter and a second deblocking filter having a stronger filter strength than the first deblocking filter; and control, in a case that only the second deblocking filter is applied to the pixels neighboring the block boundary, the second deblocking filter so as to apply a second clipping process different from a first clipping process to a difference value changed by the second deblocking filter, by using a second clipping value which is larger than a first clipping value, the first clipping value being a parameter based on a quantization parameter and used in case that the first clipping process is applied to a difference value changed by the first deblocking filter, and the second clipping value being integer multiples of the parameter.

18. The image processing device according to claim 17, wherein the circuitry is configured to apply, as the condition that the second deblocking filter is applied, the second clipping process to the difference value changed by the second deblocking filter, using the second clipping value according to the following expressions:

$$\begin{aligned}
p0' &= p0 + Clip_{(-pv)-(pv)}((p2 + 2*p1 - 6*p0 + \\
&\quad 2*q0 + q1 + 4) >> 3); \\
&= Clip_{(p0-pv)-(p0+pv)}((p2 + 2*p1 + 2*p0 + 2* \\
&\quad q0 + q1 + 4) >> 3) \\
&= Clip3(p0 - pv, p0 + pv, (p2 + 2*p1 + 2* \\
&\quad p0 + 2*q0 + q1 + 4) >> 3);
\end{aligned}$$

$$\begin{aligned}
p1' &= p1 + Clip_{(-pv)-(pv)}((p2 - 3*p1 + p0 + \\
&\quad q0 + 2) >> 2); \\
&= Clip_{(p1-pv)-(p1+pv)}((p2 + p1 + p0 + \\
&\quad q0 + 2) >> 2); \\
&= Clip3(p1 - pv, p1 + pv, (p2 + p1 + \\
&\quad p0 + q0 + 2) >> 2);
\end{aligned}$$

$$\begin{aligned}
p2' &= p2 + Clip_{(-pv)-(pv)}((2*p3 - 5*p2 + p1 + \\
&\quad p0 + q0 + 4) >> 3); \\
&= Clip_{(p2-pv)-(p2+pv)}((2*p3 + 3*p2 + p1 + \\
&\quad p0 + q0 + 4) >> 3); \\
&= Clip3(p2 - pv, p2 + pv, (2*p3 + 3*p2 + \\
&\quad p1 + p0 + q0 + 4) >> 3);
\end{aligned}$$

-continued $$\begin{aligned}
q0' &= q0 + Clip_{(-pv)-(pv)}((p1 + 2*p0 - 6*q0 + \\
&\quad 2*q1 + q2 + 4) >> 3); \\
&= Clip_{(q0-pv)-(q0+pv)}((p1 + 2*p0 + 2*q0 + 2* \\
&\quad q1 + q2 + 4) >> 3); \\
&= Clip3(q0 - pv, q0 + pv, (p1 + 2*p0 + 2* \\
&\quad q0 + 2*q1 + q2 + 4) >> 3);
\end{aligned}$$

$$\begin{aligned}
q1' &= q1 + Clip_{(-pv)-(pv)}((p0 + q0 - 3*q1 + q2 + \\
&\quad 2) >> 2); \\
&= Clip_{(q1-pv)-(q1+pv)}((p0 + q0 + q1 + \\
&\quad q2 + 2) >> 2); \\
&= Clip3(q1 - pv, q1 + pv, (p0 + q0 + \\
&\quad q1 + q2 + 2) >> 2);
\end{aligned}$$

$$\begin{aligned}
q2' &= q2 + Clip_{(-pv)-(pv)}((p0 + q0 + q1 - 5*q2 + 2* \\
&\quad q3 + 4) >> 3); \\
&= Clip_{(q2-pv)-(q2+pv)}((p0 + q0 + q1 + 3*q2 + 2 \\
&\quad q3 + 4) >> 3); \\
&= Clip3(q2 - pv, q2 + pv, (p0 + q0 + \\
&\quad q1 + 3*q2 + 2*q3 + 4) >> 3);
\end{aligned}$$

wherein the pv is the second clipping value, p0', p1', p2', q0', q1', q2' are the pixel values after applying the second deblocking filter, and p0, p1, p2, q0, q1, q2 are the pixel values before applying the second deblocking filter.

19. The image processing device according to claim 17, wherein the circuitry is configured to apply the second clipping process to the difference value changed by the second deblocking filter using, as the second clipping value, the parameter used in case that a strength of the deblocking filter is selected.

20. The image processing device according to claim 19, wherein the circuitry is configured to apply the second clipping process to the difference value changed by the second deblocking filter using a value that is plus or minus twice the parameter as the second clipping value.

* * * * *